US012733058B2

(12) United States Patent
Zhu et al.

(10) Patent No.: US 12,733,058 B2
(45) Date of Patent: Sep. 8, 2026

(54) METHOD AND APPARATUS OF BEAM MANAGEMENT AND FAILURE RECOVERY UNDER UNIFIED TCI FRAMEWORK

(71) Applicant: Samsung Electronics Co., Ltd., Suwon-si (KR)

(72) Inventors: Dalin Zhu, Allen, TX (US); Emad N. Farag, Flanders, NJ (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 773 days.

(21) Appl. No.: 18/145,783

(22) Filed: Dec. 22, 2022

(65) Prior Publication Data

US 2023/0224995 A1 Jul. 13, 2023

Related U.S. Application Data

(60) Provisional application No. 63/300,448, filed on Jan. 18, 2022, provisional application No. 63/299,748, (Continued)

(51) Int. Cl.
*H04W 76/19* (2018.01)
*H04L 5/00* (2006.01)

(52) U.S. Cl.
CPC ........... *H04W 76/19* (2018.02); *H04L 5/0048* (2013.01); *H04L 5/0053* (2013.01)

(58) Field of Classification Search
CPC ..... H04W 76/19; H04L 5/0048; H04L 5/0053
See application file for complete search history.

(56) References Cited

U.S. PATENT DOCUMENTS

2020/0266876 A1* 8/2020 Yu ...................... H04B 7/06964
2021/0144569 A1 5/2021 Zhou et al.

(Continued)

FOREIGN PATENT DOCUMENTS

EP 3982582 A1 4/2022
WO 2020246819 A1 12/2020

(Continued)

OTHER PUBLICATIONS

Extended European Search Report issued Apr. 11, 2025 regarding Application No. 23737443.4, 9 pages.

(Continued)

*Primary Examiner* — Jackie Zuniga Abad

(57) ABSTRACT

Methods and apparatuses for beam failure recovery with cross-carrier beam management. A method for operating a user equipment (UE) includes receiving a carrier indicator field in a configuration for a first control resource set (CORESET) in a serving carrier of the UE and receiving first information indicating beam failure detection (BFD) reference signals (RSs) for the serving carrier. The carrier indicator field indicates another carrier that is different from the serving carrier. The first CORESET is with a transmission configuration indication (TCI) state associated with both the serving carrier and the other carrier. The method further includes determining, based on the carrier indicator field and the first information, one or more BFD RSs from the BFD RSs for the serving carrier to monitor the other carrier and determining, based on monitoring the one or more BFD RSs for the other carrier, whether to declare a beam failure for the other carrier.

20 Claims, 11 Drawing Sheets

Related U.S. Application Data filed on Jan. 14, 2022, provisional application No. 63/299,220, filed on Jan. 13, 2022, provisional application No. 63/297,526, filed on Jan. 7, 2022.

(56) References Cited

U.S. PATENT DOCUMENTS

| | | | | |
|---|---|---|---|---|
| 2021/0392671 | A1 | 12/2021 | Liu et al. | |
| 2022/0239440 | A1* | 7/2022 | Go | H04L 5/0044 |
| 2022/0295589 | A1* | 9/2022 | Tsai | H04B 7/024 |
| 2024/0178959 | A1* | 5/2024 | Xu | H04B 7/088 |

FOREIGN PATENT DOCUMENTS

| | | | |
|---|---|---|---|
| WO | 2020264134 | A1 | 12/2020 |
| WO | 2021034672 | A1 | 2/2021 |

OTHER PUBLICATIONS

Vivo, "Remaining issues on multi beam enhancement", 3GPP TSG RAN WGI #107-e, R1-2110990, Nov. 2021, 27 pages.

International Search Report and Written Opinion issued Apr. 5, 2023 regarding International Application No. PCT/KR2023/000303, 7 pages.

ZTE, "Further details on Multi-beam and Multi-TRP operation", 3GPP TSG RAN WG1 Meeting #107-e, R1-2110955, Nov. 2021, 16 pages.

NTT Docomo, Inc., "Discussion on beam management for MTRP", 3GPP TSG RAN WG1 Meeting #107-e, R1-2112092, Nov. 2021, 10 pages.

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)", 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

* cited by examiner

METHOD AND APPARATUS OF BEAM MANAGEMENT AND FAILURE RECOVERY UNDER UNIFIED TCI FRAMEWORK

CROSS-REFERENCE TO RELATED APPLICATIONS AND CLAIM OF PRIORITY

The present application claims priority to:
- U.S. Provisional Patent Application No. 63/297,526, filed on Jan. 7, 2022;
- U.S. Provisional Patent Application No. 63/299,220, filed on Jan. 13, 2022;
- U.S. Provisional Patent Application No. 63/299,748, filed on Jan. 14, 2022; and
- U.S. Provisional Patent Application No. 63/300,448, filed on Jan. 18, 2022. The contents of the above-identified patent documents are incorporated herein by reference.

TECHNICAL FIELD

The present disclosure relates generally to wireless communication systems and, more specifically, the present disclosure relates to beam management and failure recovery under unified transmission configuration indication (TCI) framework in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to beam management and failure recovery under unified TCI framework in a wireless communication system.

In one embodiment, a user equipment (UE) is provided. The UE includes a transceiver configured to receive a carrier indicator field in a configuration for a first control resource set (CORESET) in a serving carrier of the UE and first information indicating beam failure detection (BFD) reference signals (RSs) for the serving carrier. The carrier indicator field indicates another carrier that is different from the serving carrier. The first CORESET is with a transmission configuration indication (TCI) state associated with both the serving carrier and the other carrier. The UE further includes a processor operably coupled with the transceiver. The processor is configured to determine, based on the carrier indicator field and the first information, one or more BFD RSs from the BFD RSs for the serving carrier to monitor the other carrier and determine, based on monitoring the one or more BFD RSs for the other carrier, whether to declare a beam failure for the other carrier.

In another embodiment, a base station (BS) is provided. The BS includes a processor and a transceiver operably coupled with the processor. The transceiver is configured to transmit a carrier indicator field in a configuration for a first CORESET in a serving carrier of the UE and first information indicating BFD RSs for the serving carrier. The carrier indicator field indicates another carrier that is different from the serving carrier. The first CORESET is with a TCI state associated with both the serving carrier and the other carrier. The carrier indicator field and the first information indicate one or more BFD RSs from the BFD RSs for the serving carrier to monitor the other carrier. A beam failure for the other carrier is based on the one or more BFD RSs for the other carrier.

In yet another embodiment, a method for operating a UE is provided The method includes receiving a carrier indicator field in a configuration for a first CORESET in a serving carrier of the UE and receiving first information indicating BFD RSs for the serving carrier. The carrier indicator field indicates another carrier that is different from the serving carrier. The first CORESET is with a TCI state associated with both the serving carrier and the other carrier. The method further includes determining, based on the carrier indicator field and the first information, one or more BFD RSs from the BFD RSs for the serving carrier to monitor the other carrier and determining, based on monitoring the one or more BFD RSs for the other carrier, whether to declare a beam failure for the other carrier.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
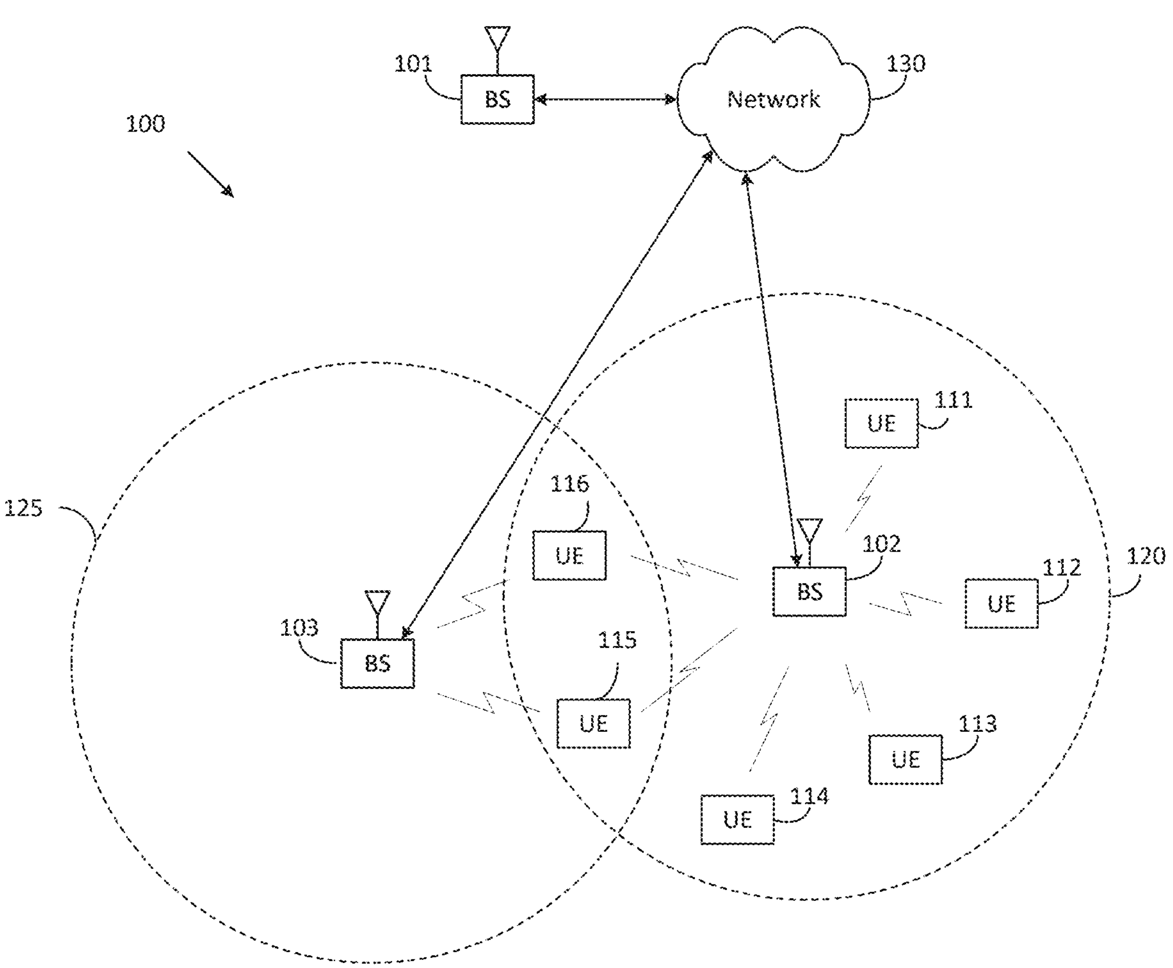
FIG. 1 illustrates an example of wireless network according to embodiments of the present disclosure.
Figure 2:
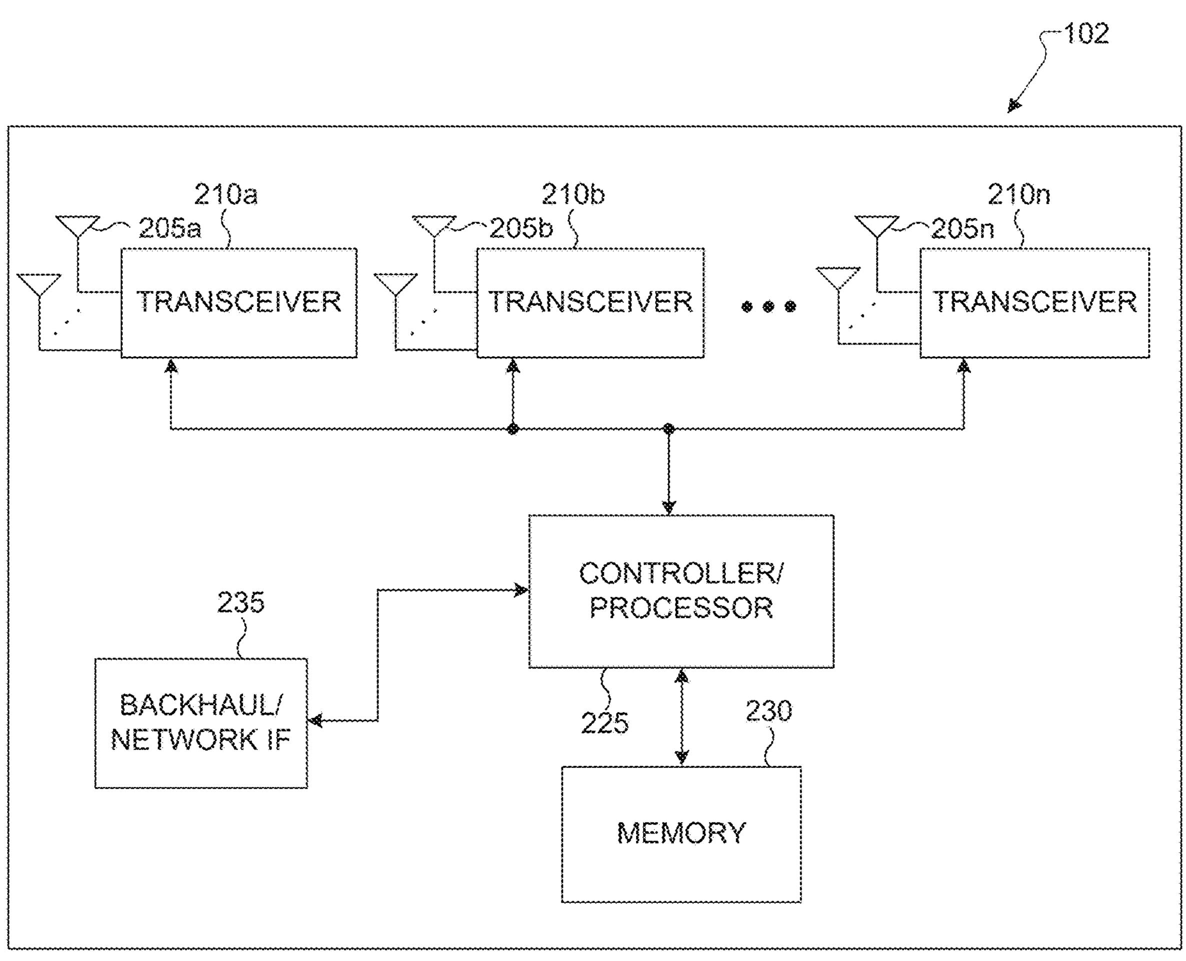
FIG. 2 illustrates an example of gNB according to embodiments of the present disclosure.
Figure 3:
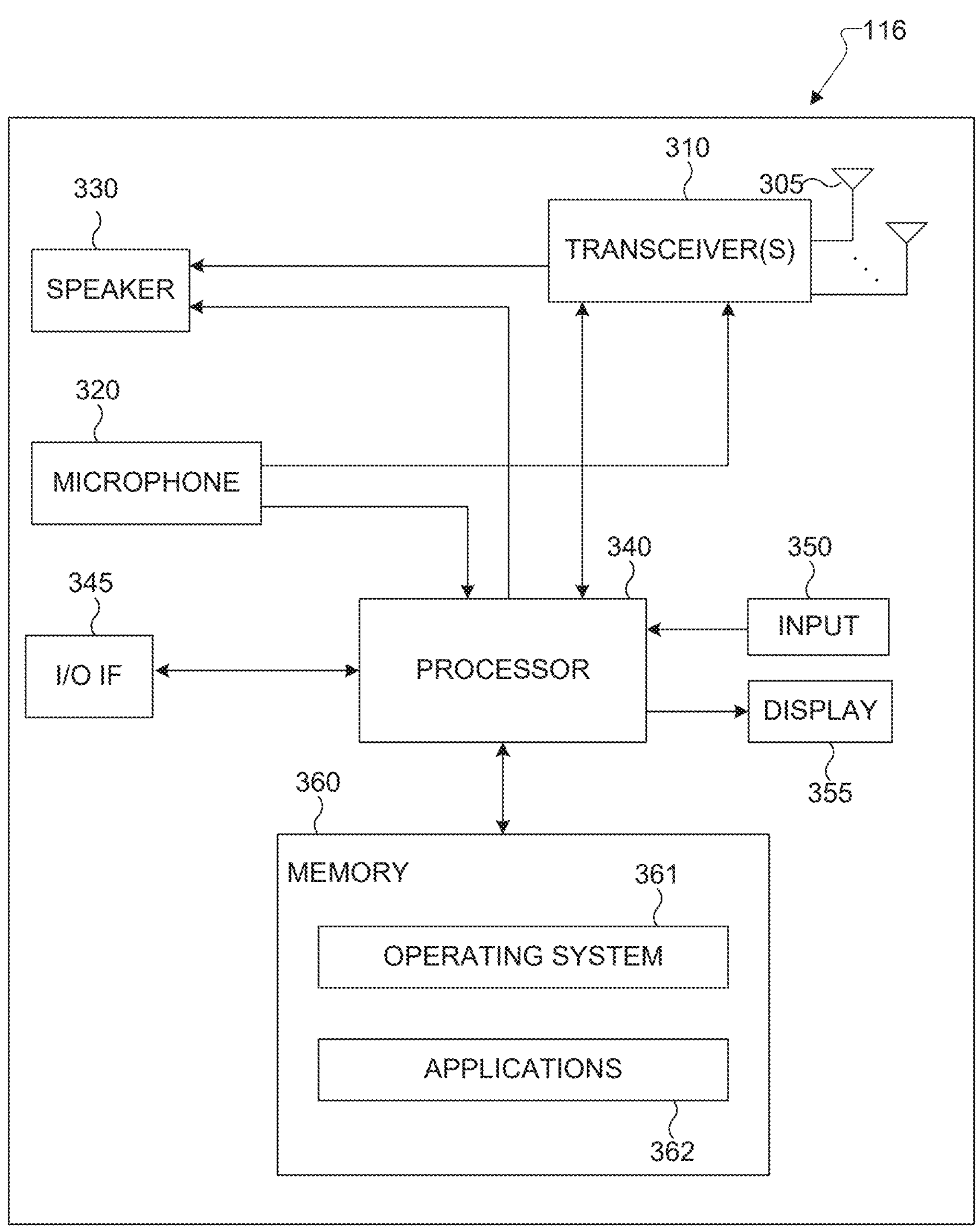
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a cross-carrier beam failure recovery under unified TCI framework in a wireless communication system. In certain embodiments, and one or more of the gNBs 101-103 includes circuitry, programing, or a combination thereof, for a cross-carrier beam failure recovery under unified TCI framework in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas **205*a*-205*n*, multiple transceivers 210*a*-210*n*, a controller/processor 225, a memory 230, and a backhaul or network interface 235**.

The transceivers **210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225** may further process the baseband signals.

Transmit (TX) processing circuitry in the transceivers **210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n***.

The controller/processor 225 can include one or more processors or other processing devices that control the overall operation of the gNB 102. For example, the controller/processor 225 could control the reception of UL channel signals and the transmission of DL channel signals by the transceivers **210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225**.

The controller/processor 225 is also capable of executing programs and other processes resident in the memory 230, such as processes for a cross-carrier beam failure recovery under unified TCI framework in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a cross-carrier beam failure recovery under unified TCI framework in a wireless communication system.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355*m* which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
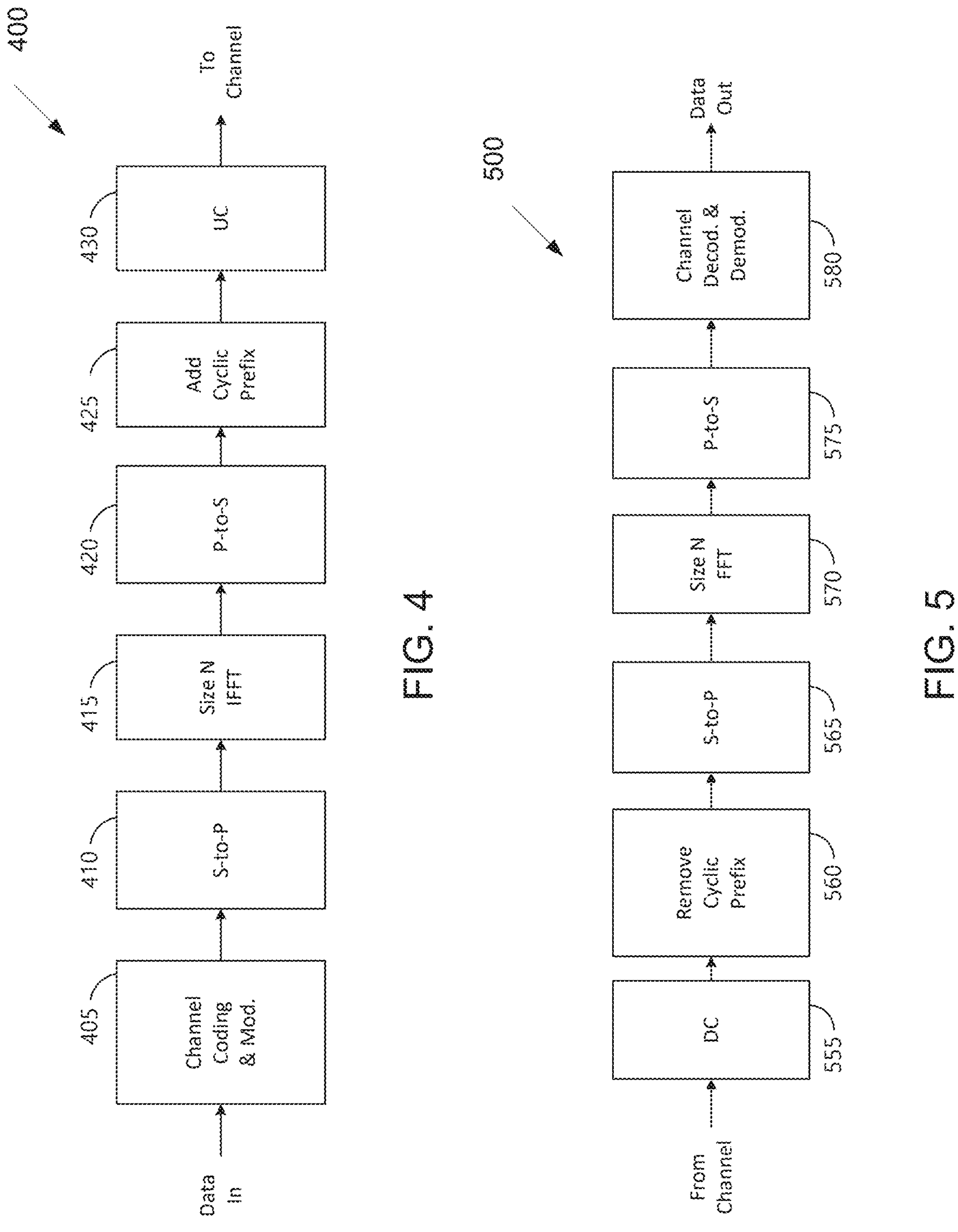
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the down-link from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Figure 6A:
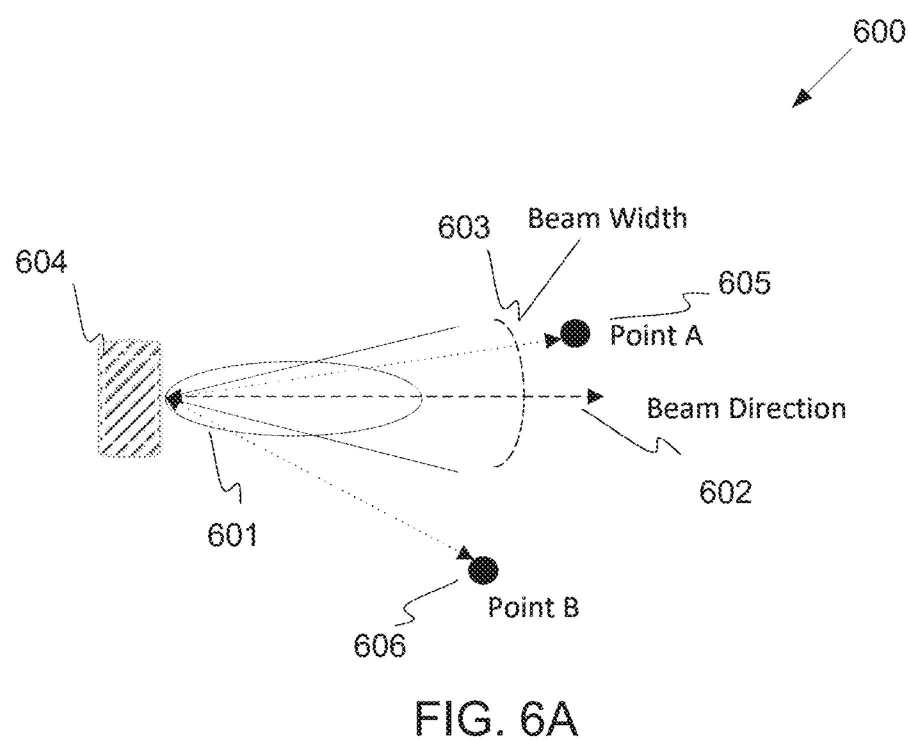
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
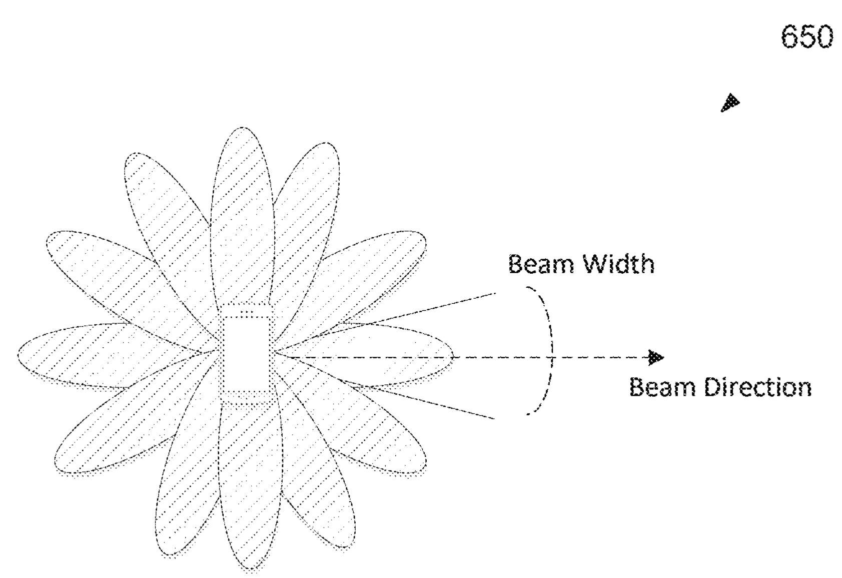
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
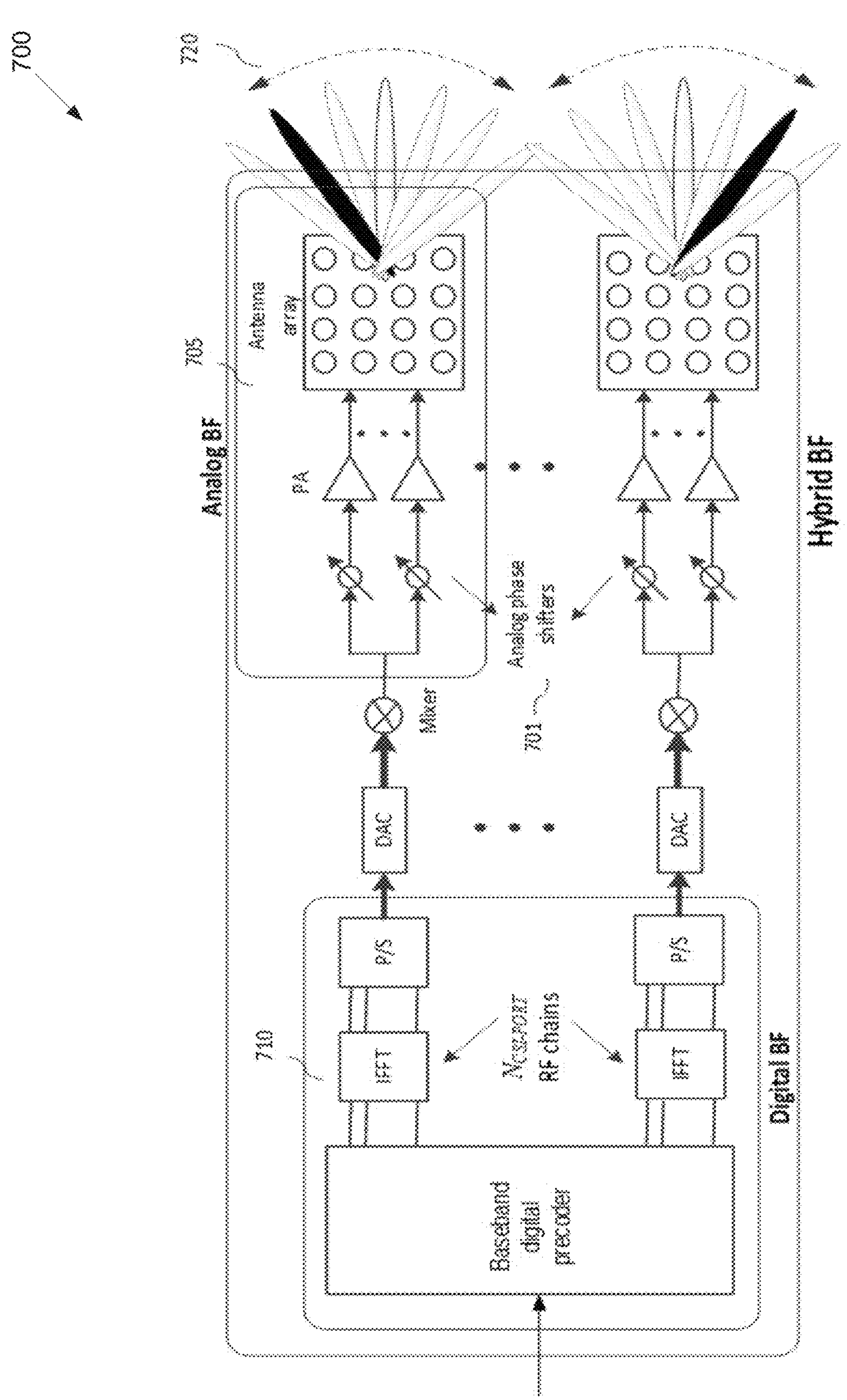
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI\text{-}PORT}$. A digital beamforming unit 710 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss@100 m distance), larger number of and sharper analog beams (hence larger number of radiators in the array) may be needed to compensate for the additional path loss.

In a wireless communications system, a radio link failure (RLF) could occur if a significant/sudden link quality drop is observed at the UE side. If a RLF occurs, fast RLF recovery mechanisms, therefore, become essential to promptly re-establish the communication link(s) and avoid severe service interruption. At higher frequencies, e.g., millimeter-wave (mmWave) frequencies or FR2 in the 3GPP NR, both the transmitter and receiver could use directional (analog) beams to transmit and receive various RSs/channels such as SSBs, CSI-RSs, PDCCHs or PDSCHs. Hence, prior to declaring a full RLF, the UE could first detect and recover a potential beam failure if the signal qualities/strengths of certain beam pair links (BPLs) are below a certain threshold for a certain period of time.

In a wireless communications system, an RLF could occur if a significant/sudden link quality drop is observed at the UE side. If a RLF occurs, fast RLF recovery mechanisms, therefore, become essential to promptly re-establish the communication link(s) and avoid severe service interruption. At higher frequencies, e.g., millimeter-wave (mmWave) frequencies or FR2 in the 3GPP NR, both the transmitter and receiver could use directional (analog) beams to transmit and receive various RSs/channels such as SSBs, CSI-RSs, PDCCHs or PDSCHs. Hence, prior to declaring a full RLF, the UE could first detect and recover a potential beam failure if the signal qualities/strengths of certain beam pair links (BPLs) are below a certain threshold for a certain period of time.

Figures 8, 9:
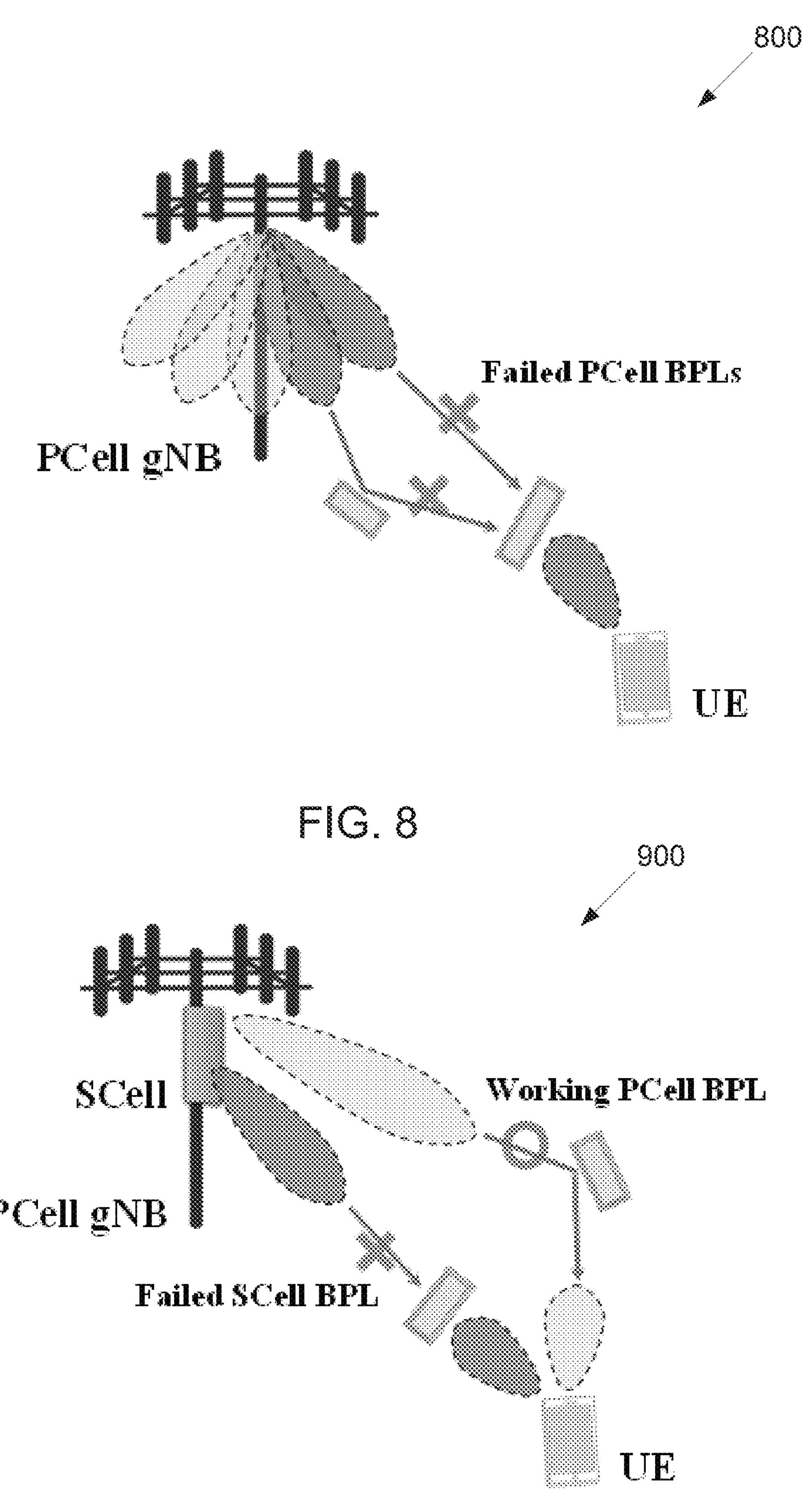
FIG. 8 illustrates an example of BFR procedure for a PCell or a PSCell under CA framework according to embodiments of the present disclosure.
FIG. 9 illustrates an example of SCell beam failure according to embodiments of the present disclosure.

FIG. 8 illustrates an example of BFR procedure for a PCell or a PSCell under CA framework 800 according to embodiments of the present disclosure. The embodiment of the BFR procedure for a PCell or a PSCell under CA framework 800 illustrated in FIG. 8 is for illustration only.

The 3GPP Rel. 15 beam failure recovery (BFR) procedure mainly targets for a primary cell (PCell or PSCell) under the carrier aggregation (CA) framework as illustrated in FIG. 8. The BFR procedure in the 3GPP Rel. 15 comprises the following key components: (1) beam failure detection (BFD); (2) new beam identification (NBI); (3) BFR request (BFRQ); and (4) BFRQ response (BFRR).

The UE is first configured by the gNB a set of BFD RS resources to monitor the link qualities between the gNB and the UE. One BFD RS resource could correspond to one (periodic) CSI-RS/SSB RS resource, which could be a quasi-co-located (QCL) source RS with typeD in a TCI state for a CORESET. If the received signal qualities of all the BFD RS resources are below a given threshold (implying that the hypothetical BLERs of the corresponding CORESETs/PDCCHs are above a given threshold), the UE could declare a beam failure instance (BFI). Furthermore, if the UE has declared N_BFI consecutive BFIs within a given time period, the UE may declare a beam failure.

After declaring/detecting the beam failure, the UE may transmit the BFRQ to the gNB via a contention-free (CF) PRACH (CF BFR-PRACH) resource, whose index is associated with a new beam identified by the UE. Specifically, to determine a potential new beam, the UE could be first configured by the network a set of SSB and/or CSI-RS resources (NBI RS resources) via a higher layer parameter candidateBeamRSList. The UE may then measure the NBI RSs and calculate their L1-RSRPs. If at least one of the measured L1-RSRPs of the NBI RSs is beyond a given threshold, the UE may select the beam that corresponds to the NBI RS with the highest L1-RSRP as the new beam q_new.

To determine a CF BFR-PRACH resource to convey the BFRQ, the UE could be first configured by the network a set of PRACH resources, each associated with a NBI RS resource. The UE could then select the PRACH resource that has the one-to-one correspondence to the selected NBI RS resource (and therefore, the new beam index q_new) to send the BFRQ to the gNB. From the index of the selected CF PRACH resource, the gNB could also know which beam is selected by the UE as the new beam.

Four slots after the UE has transmitted the BFRQ, the UE could start to monitor a dedicated CORESET/search space for BFRQ response. The dedicated CORESET is addressed to the UE-specific C-RNTI, and may be transmitted by the gNB using the newly identified beam. If the UE detects a valid UE-specific DCI in the dedicated CORESET for BFRR, the UE may assume that the beam failure recovery request has been successfully received by the network, and the UE may complete the BFR process. Otherwise, if the UE does not receive the BFRR within a configured time window, the UE may initiate a contention based (CB) random access (RA) process to reconnect to the network.

FIG. 9 illustrates an example of SCell beam failure 900 according to embodiments of the present disclosure. The embodiment of the SCell beam failure 900 illustrated in FIG. 9 is for illustration only.

In the 3GPP Rel. 16, the BFR procedures were customized for the secondary cell (SCell) under the CA framework, in which the BPL(s) between the PCell and the UE is assumed to be always working. An illustrative example of the SCell beam failure is given in FIG. 9.

After declaring/detecting the beam failure for the SCell, the UE may transmit the BFRQ in form of a scheduling request (SR) over a PUCCH for the working PCell. Furthermore, the UE could only transmit the BFRQ at this stage without indicating any new beam index, failed SCell index or other information to the network. This is different from the Rel. 15 PCell/PSCell procedure, in which the UE may indicate both the BFRQ and the identified new beam index to the network at the same time. Allowing the gNB to quickly know the beam failure status of the SCell without waiting for the UE to identify a new beam could be beneficial. For instance, the gNB could deactivate the failed SCell and allocate the resources to other working SCells.

The UE could be indicated by the network an uplink grant in response to the BFRQ SR, which may allocate necessary resources for the MAC CE to carry new beam index q_new (if identified), failed SCell index and etc. over the PUSCH for the working PCell. After transmitting the MAC CE for BFR to the working PCell, the UE may start to monitor the BFRR. The BFRR could be a TCI state indication for a CORESET for the corresponding SCell. The BFRR to the MAC CE for BFR could also be a normal uplink grant for scheduling a new transmission for the same HARQ process as the PUSCH carrying the MAC CE for BFR. If the UE could not receive the BFRR within a configured time window, the UE could transmit BFR-PUCCH again, or fall back to CBRA process.

As mentioned in the present disclosure, in the current 3GPP Rel. 15/16 based BFR designs, the UE could be explicitly configured by the network (via higher layer RRC signaling) one or more BFD RS resources to measure. Alternatively, the UE could implicitly determine the one or more BFD RS resources as the QCL source RS(s) indicated in active TCI state(s) for PDCCH reception(s) in one or more CORESET(s). Under the Rel. 17 unified TCI framework, a UE could be provided by the network a joint DL and UL TCI state or separate DL or UL TCI state via MAC CE or DCI (DCI format 1_1 or 1_2 with or without DL assignment) based signaling.

Furthermore, the UE could receive from the network in a carrier—referred to as a self/serving carrier—a Rel. 17 unified TCI state configured for both the self/serving carrier and one or more different other carriers. Hence, under the Rel. 17 unified TCI framework, various design aspects related to cross-carrier beam failure recovery procedures need to be specified. In the present disclosure, a carrier could correspond to a cell or a BWP or a component carrier or a frequency band or a frequency range. As described above, the carrier in which the UE receives the Rel. 17 unified TCI state indication could be referred to as the self/serving carrier or own carrier.

The present disclosure provides various design aspects related to specifying cross-carrier beam failure recovery procedure(s) under the Rel. 17 unified TCI framework, wherein a UE can be provided by the network a joint DL and UL TCI state or separate DL or UL TCI state via MAC CE or DCI (DCI format 1_1 or 1_2 with or without DL assignment) based signaling.

As described in the U.S. patent application Ser. No. 17/584,239, which is incorporated as a reference in its entirety, a unified TCI framework could indicate/include $N\geq1$ DL TCI states and/or $M\geq1$ UL TCI states, wherein the indicated TCI state could be at least one of: (1) a DL TCI state and/or its corresponding/associated TCI state ID; (2) an UL TCI state and/or its corresponding/associated TCI state ID; (3) a joint DL and UL TCI state and/or its corresponding/associated TCI state ID; and (4) separate DL TCI state and UL TCI state and/or their corresponding/associated TCI state ID(s).

There could be various design options/channels to indicate to the UE a beam (i.e., a TCI state) for the transmission/reception of a PDCCH or a PDSCH.

In one example, a MAC CE could be used to indicate to the UE a beam (i.e., a TCI state and/or a TCI state ID) for the transmission/reception of a PDCCH or a PDSCH.

In another example, a DCI could be used to indicate to the UE a beam (i.e., a TCI state and/or a TCI state ID) for the transmission/reception of a PDCCH or a PDSCH.

For example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.

For another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.

Yet for another example, a custom/purpose designed DCI format could be used to indicate to the UE a beam (i.e., a TCI state and/or a TCI state ID) for the transmission/reception of a PDCCH or a PDSCH.

Rel-17 introduced the unified TCI framework, where a unified or master or main TCI state is signaled to the UE. The unified or master or main TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state can be used at least for UE-dedicated DL channels; and (3) in case of separate TCI state indication, wherein different beams are used for DL and UL channels, a UL TCI state can be used at least for UE-dedicated UL channels.

The unified (master or main) TCI state is TCI state of UE-dedicated reception on PDSCH/PDCCH or dynamic-grant/configured-grant based PUSCH and all of dedicated PUCCH resources.

Under the Rel. 15/16 TCI framework, the UE may expect to receive from the network a MAC CE to indicate the one or more TCI states—from a higher layer RRC configured pool of TCI states—for the one or more PDCCHs. Under the unified TCI framework, the UE may expect to receive from the network a MAC CE, or a DCI, or both MAC CE and DCI to indicate the one or more TCI states—from a higher layer RRC configured pool of TCI states—for the one or more PDCCHs.

Furthermore, as aforementioned, an indicated TCI state could be: (1) a DL TCI state and/or its corresponding/associated TCI state ID for both PDCCH and PDSCH, (2) an UL TCI state and/or its corresponding/associated TCI state ID for both PUCCH and PUSCH, (3) a joint DL and UL TCI state and/or its corresponding/associated TCI state ID for all DL and UL channels such as PDCCH, PDSCH, PUCCH and PUSCH, and (4) a separate DL TCI state for PDCCH and PDSCH and a separate UL TCI state for PUCCH and PUSCH and/or their corresponding/associated TCI state ID(s).

Figure 10:
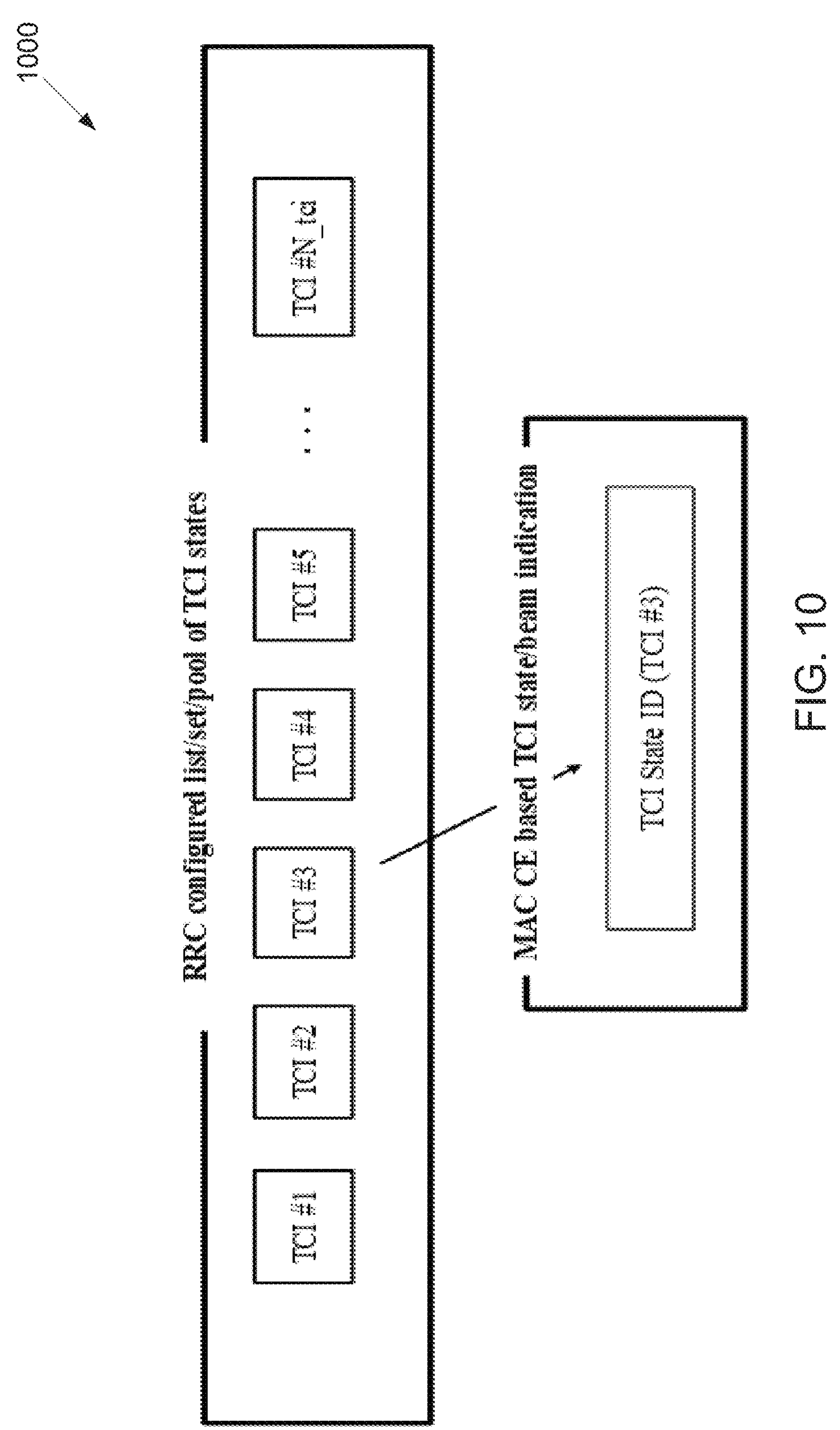
FIG. 10 illustrates an example of MAC CE based TCI state/beam indication according to embodiments of the present disclosure.

FIG. 10 illustrates an example of MAC CE based TCI state/beam indication 1000 according to embodiments of the present disclosure. The embodiment of the MAC CE based TCI state/beam indication 1000 illustrated in FIG. 10 is for illustration only.

In FIG. 10, an example of MAC CE based TCI state/beam indication is presented. As illustrated in FIG. 10, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more MAC CE commands to indicate one or more beam(s) (i.e., the TCI state(s)) for the transmission/reception of the PDCCH(s), PDSCH(s), PUCCH(s) or PUSCH(s).

The MAC CE for common TCI state/beam indication could include at least a TCI state ID. As discussed above, the TCI state corresponding to the TCI state ID could be at least one of: (1) a DL TCI state; (2) an UL TCI state; (3) a joint DL and UL TCI state; and (4) separate DL TCI state and UL TCI state.

Figure 11:
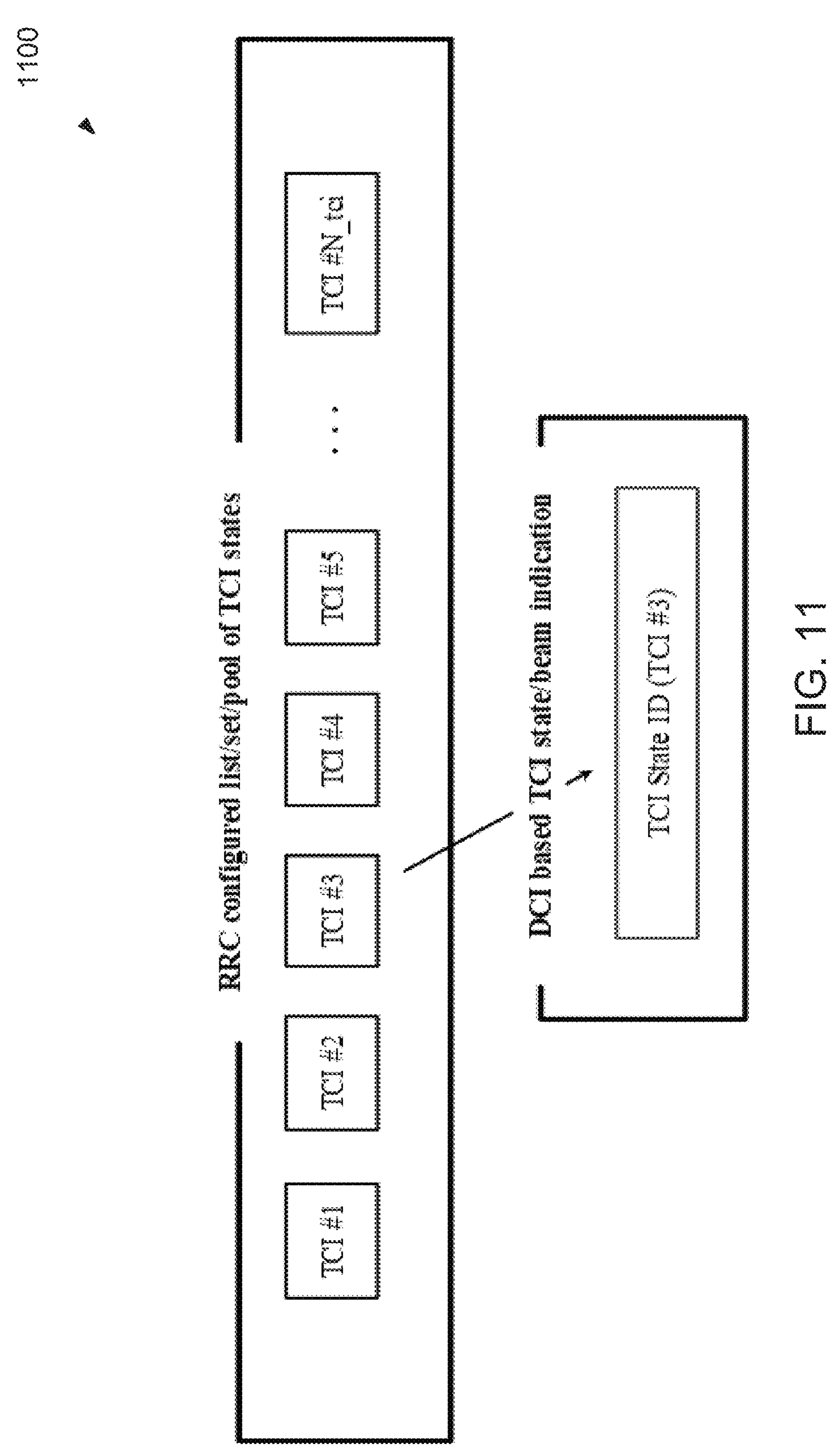
FIG. 11 illustrates an example of DCI based common TCI state/beam indication according to embodiments of the present disclosure.

FIG. 11 illustrates an example of DCI based common TCI state/beam indication 1100 according to embodiments of the present disclosure. The embodiment of the DCI based common TCI state/beam indication 1100 illustrated in FIG. 11 is for illustration only.

In FIG. 11, an example of DCI based common TCI state/beam indication is presented. As illustrated in FIG. 11, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more DCIs to indicate one or more beam(s) (i.e., the TCI state(s)) for the transmission/reception of the PDCCH(s), PDSCH(s), PUSCH(s) or PUCCH(s).

Figure 12:
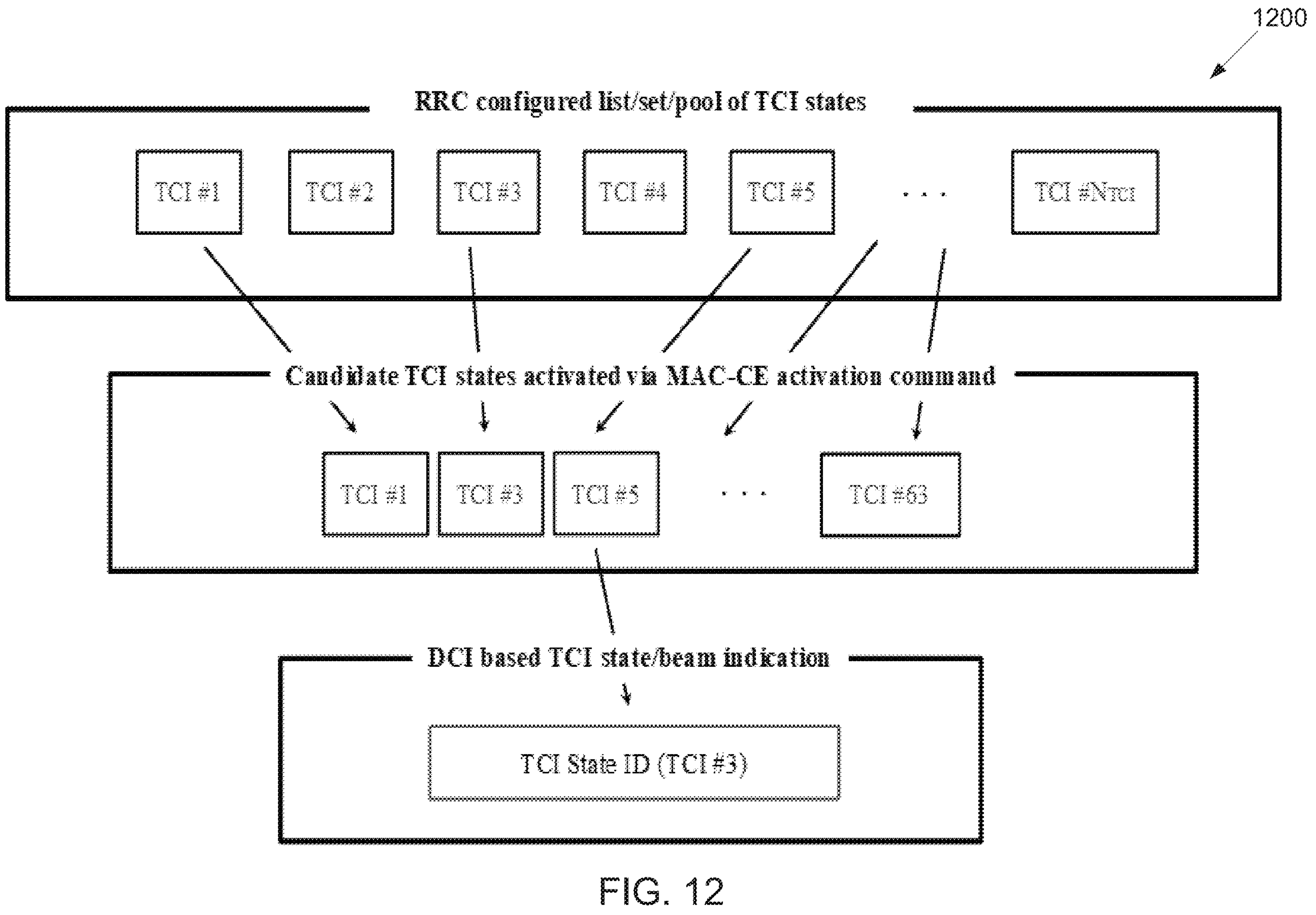
FIG. 12 illustrates an example of DCI based common TCI state/beam indication with MAC CE activated TCI states according to embodiments of the present disclosure.

FIG. 12 illustrates an example of DCI based common TCI state/beam indication with MAC CE activated TCI states 1200 according to embodiments of the present disclosure. The embodiment of the DCI based common TCI state/beam indication with MAC CE activated TCI states 1200 illustrated in FIG. 12 is for illustration only.

In FIG. 12, an example of DCI based common TCI state/beam indication (with MAC CE activated TCI states) is presented. As illustrated in FIG. 12, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more MAC CE activation commands activating one or more TCI states from the higher layer configured list/pool of TCI states, e.g., up to eight TCI states could be activated by a MAC CE activation command. The UE could receive from the network one or more DCIs for beam indication to indicate one or more beam(s) (i.e., the TCI state(s)) from the MAC CE activated TCI state(s)/beam(s) for the transmission/reception of the PDCCH(s), PDSCH(s), PUCCH(s) or PUSCH(s).

As described above, a DCI used to indicate to the UE a beam (i.e., a TCI state and/or a TCI state ID) for the transmission/reception of a PDCCH or a PDSCH could be at least one of the following examples.

In one example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.

In another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.

Yet in another example, a custom/purpose designed DCI format could be used to indicate to the UE a beam (i.e., a TCI state and/or a TCI state ID) for the transmission/reception of a PDCCH or a PDSCH.

Furthermore, the TCI state indicated in the DCI for beam indication could be at least one of: (1) a DL TCI state; (2) an UL TCI state; (3) a joint DL and UL TCI state; and (4) separate DL TCI state and UL TCI state.

Furthermore, a UE could receive in a self/serving carrier a Rel. 17 unified TCI state indication for the self/serving carrier and at least one carrier different from the self/serving carrier. Or equivalently, a different carrier could share the same Rel. 17 unified TCI state indicated for a UE's self/serving carrier.

Both implicit and explicit BFD RS resource configuration methods are specified in the present disclosure under the Rel. 17 unified TCI framework for cross-carrier beam indication. In a cross-carrier setting comprising the self/serving carrier and at least one carrier different from the self/serving carrier, the UE could receive in the self/serving carrier one or more Rel. 17 unified TCI states—e.g., via MAC CE or DCI (e.g., DCI format 1_1 or 1_2 with or without DL assignment) based signaling—indicated for both the self/serving carrier and one or more different other carriers. In one example, one or more "carrier indicator" fields could be included/configured in an indicated Rel. 17 unified TCI state, e.g., in the corresponding higher layer parameter TCI-State_r17 indicated via a DCI format with or without DL assignment; for this case, one or more CORESETs of the carrier(s) indicated by the "carrier indicator" field(s) could share the same indicated Rel. 17 unified TCI state(s) for the self/serving carrier.

In another example, the UE could be provided/configured by the network a list/set/pool of one or more carriers (or carrier indexes) which could share the same indicated Rel. 17 unified TCI state(s) for the self/serving carrier; for this case, the "carrier indicator" field(s) as discussed above may no longer be configured/provided in the corresponding MAC CE or DCI format (e.g., DCI format 1_1 or 1_2 with or without DL assignment) that indicates the Rel. 17 unified TCI state for the self/serving carrier. Furthermore, one or more CORESETs in one or more carriers different from the self/serving carrier could be configured with "useIndicatedr17TCIStateForSelfCarrier." For this case, the one or more CORESETs configured with "useIndicatedr17TCIStateForSelfCarrier" could share the same indicated Rel. 17 unified TCI state(s) for the self/serving carrier.

A UE could receive in the self/serving carrier K≥1 MAC CEs or DCIs for the Rel. 17 unified TCI states indication; each MAC CE or DCI could indicate a different value(s) of "carrier indicator" field(s) or a different carrier(s)/carrier index(es) different from the self/serving carrier.

A UE could implicitly determine a set of RSs (or RS resources) q0x for beam failure detection for both the self/serving carrier and a carrier j (also referred to as a cross-carrier BFD RS set) under the Rel. 17 unified TCI framework, wherein throughout the present disclosure carrier $j \in J$ represents a carrier different from the self/serving carrier, J contains all carriers/carrier indexes different from the self/serving carrier, and the UE is provided by the network, e.g., via MAC CE or DCI (e.g., DCI format 1_1 or 1_2 with or without DL assignment) based signaling through the higher layer parameter TCI-State_r17, M=1 joint DL and UL Rel. 17 unified TCI state or M=1 separate UL Rel. 17 unified TCI state or N=1 separate DL Rel. 17 unified TCI state for UE-dedicated reception on PDSCH/PDCCH or dynamic-grant/configured-grant based PUSCH and all of dedicated PUCCH resources.

In one example, the UE could determine the cross-carrier BFD RS set q0x to include periodic CSI-RS resource configuration indexes or SSB indexes (also referred to as BFD RS resource indexes) with same values as the RS indexes in the RS sets indicated in a Rel. 17 unified TCI state provided by the higher layer parameter TCI-State-r17 for respective CORESETs that the UE uses for monitoring PDCCH in the self/serving carrier, wherein the indicated Rel. 17 unified TCI state, e.g., the corresponding higher layer parameter TCI-State-r17, could include/configure a "carrier indicator" field indicating at least carrier j. For this case, the UE could also monitor radio link quality of the cross-carrier BFD RS set q0x to detect potential beam failure(s) for one or more CORESETs that the UE uses for monitoring PDCCH in at least carrier j.

In another example, the UE could determine the cross-carrier BFD RS set q0x to include periodic CSI-RS resource configuration indexes or SSB indexes (also referred to as BFD RS resource indexes) with same values as the RS indexes in the RS sets indicated in a Rel. 17 unified TCI state provided by the higher layer parameter TCI-State-r17 for respective CORESETs that the UE uses for monitoring PDCCH in the self/serving carrier, wherein the Rel. 17 unified TCI state is indicated for both the self/serving carrier and at least carrier j. In this example, the UE could be provided/configured by the network, e.g., via higher layer RRC signaling, a list/set/pool of carriers (or carrier indexes) including carrier j which may share the same indicated Rel. 17 unified TCI state(s) for the self/serving carrier. For this case, the UE could also monitor radio link quality of the cross-carrier BFD RS set q0x to detect potential beam failure(s) for one or more CORESETs that the UE uses for monitoring PDCCH in at least carrier j.

When a Rel. 17 unified TCI state indicated in the self/serving carrier is also configured for a carrier (e.g., carrier j in the above discussed design examples) different from the self/serving carrier, DM-RS antenna ports for PDCCH receptions in one or more CORESETs in the carrier different from the self/serving carrier may or may not be quasi co-located with the reference signal provided in the indicated Rel. 17 unified TCI state in the self/serving carrier. In the present disclosure, the control resource set(s) in a carrier different from the self/serving carrier whose QCL assumption(s) follow that provided in the indicated Rel. 17 unified TCI state in the self/serving carrier or sharing the indicated Rel. 17 unified TCI state in the self/serving carrier is referred to as Type-1 CORESET(s) in the carrier different from the self/serving carrier, while the control resource set(s) in the carrier different from the self/serving carrier whose QCL assumption(s) does not follow that provided in the indicated Rel. 17 unified TCI state in the self/serving carrier or not sharing the indicated Rel. 17 unified TCI state in the self/serving carrier is referred to as Type-2 CORESET(s) in the carrier different from the self/serving carrier.

Furthermore, a Type-1 CORESET or a Type-2 CORESET could correspond to one or more of: (1) "CORESET A": a CORESET other than CORESET with index 0 (or CORESET #0) associated with only UE-dedicated PDCCH reception(s) in a CC, comprising, e.g., CORESET(s) associated with USS set(s) or Type3-PDCCH CSS set(s); (2) "CORESET B": a CORESET other than CORESET #0 associated with only non-UE-dedicated PDCCH reception(s) in a CC, comprising, e.g., CORESET(s) associated with all types of CSS sets such as Type0/0A/1/2/3-PDCCH CSS sets or CSS sets other than Type3-PDCCH CSS set(s) such as Type0/0A/1/2-PDCCH CSS sets; (3) "CORESET C": a CORESET other than CORESET #0 associated with both UE-dedicated and non-UE-dedicated PDCCH receptions in a CC; and (4) CORESET #0, i.e., CORESET with index 0.

The UE could be provided/configured with "useIndicatedr17TCIStateForSelfCarrier" for one or more of the Type-1 CORESETs in a carrier different from the self/serving carrier. For instance, the UE could be provided/configured with "useIndicatedr17TCIstateForSelfCarrier" set to "enabled" in the parameter, e.g., the higher layer parameter ControlResourceSet, that configures the corresponding Type-1 CORESET(s) in a carrier different from the self/serving carrier.

In one example, the UE could determine the cross-carrier BFD RS set q0x to include periodic CSI-RS resource configuration indexes or SSB indexes (also referred to as BFD RS resource indexes) with same values as the RS indexes in the RS sets indicated in a Rel. 17 unified TCI state provided by the higher layer parameter TCI-State-r17 for respective CORESETs that the UE uses for monitoring PDCCH in the self/serving carrier, wherein the indicated Rel. 17 unified TCI state, e.g., the corresponding higher layer parameter TCI-State-r17, could include/configure a "carrier indicator" field indicating at least carrier j. For this case, the UE could also monitor radio link quality of the cross-carrier BFD RS set q0x to detect potential beam failure(s) for Type-1 CORESETs that the UE uses for monitoring PDCCH in at least carrier j.

In another example, the UE could determine the cross-carrier BFD RS set q0x to include periodic CSI-RS resource configuration indexes or SSB indexes (also referred to as BFD RS resource indexes) with same values as the RS indexes in the RS sets indicated in a Rel. 17 unified TCI state provided by the higher layer parameter TCI-State-r17 for respective CORESETs that the UE uses for monitoring PDCCH in the self/serving carrier, wherein the Rel. 17 unified TCI state is indicated for both the self/serving carrier and at least carrier j. In this example, the UE could be provided/configured by the network, e.g., via higher layer RRC signaling, a list/set/pool of carriers (or carrier indexes) including carrier j which may share the same indicated Rel. 17 unified TCI state(s) for the self/serving carrier. For this case, the UE could also monitor radio link quality of the cross-carrier BFD RS set q0x to detect potential beam failure(s) for Type-1 CORESETs that the UE uses for monitoring PDCCH in at least carrier j.

The UE could determine K≥1 cross-carrier BFD RS sets as described above, each corresponding to a different carrier/carrier index or a different set of carriers/carrier indexes from the self/serving carrier.

The UE could be configured by the network a set of RSs (or RS resources) for beam failure detection (also referred to as BFD RS set) q0 under the Rel. 17 unified TCI framework, wherein the UE is provided by the network, e.g., via MAC CE or DCI (e.g., DCI format 1_1 or 1_2 with or without DL assignment) based signaling through the higher layer parameter TCI-State_r17, M=1 joint DL and UL Rel. 17 unified TCI state or M=1 separate UL Rel. 17 unified TCI state or N=1 separate DL Rel. 17 unified TCI state for UE-dedicated reception on PDSCH/PDCCH or dynamic-grant/configured-grant based PUSCH and all of dedicated PUCCH resources. To detect potential beam failure for carrier j different from the self/serving carrier, wherein throughout the present disclosure carrier j∈J represents a carrier different from the self/serving carrier, J contains all carriers/carrier indexes different from the self/serving carrier.

In one example, the UE could be configured by the network, e.g., provided by the higher layer parameter failureDetectionResourcesToAddModList, the BFD RS set q0 of periodic CSI-RS resource configuration indexes or SSB indexes for beam/link failure detection or declaration. The UE could only assess a first radio link quality of the BFD RS set q0 according to SSBs on the PCell or the PSCell or periodic CSI-RS resource configurations that are indicated in a Rel. 17 unified TCI state provided by the higher layer parameter TCI-State-r17 for respective CORESETs that the UE uses for monitoring PDCCH in the self/serving carrier, wherein the indicated Rel. 17 unified TCI state, e.g., the corresponding higher layer parameter TCI-State-r17, could include/configure a "carrier indicator" field indicating at least carrier j. For this case, the UE could also use the first radio link quality of the BFD RS set q0 to detect potential beam failure(s) for one or more CORESETs that the UE uses for monitoring PDCCH in at least carrier j.

In another example, the UE could be configured by the network, e.g., provided by the higher layer parameter failureDetectionResourcesToAddModList, the BFD RS set q0 of periodic CSI-RS resource configuration indexes or SSB indexes for beam/link failure detection or declaration. The UE could only assess a first radio link quality of the BFD RS set q0 according to SSBs on the PCell or the PSCell or periodic CSI-RS resource configurations that are indicated in a Rel. 17 unified TCI state provided by the higher layer parameter TCI-State-r17 for respective CORESETs that the UE uses for monitoring PDCCH in the self/serving carrier, wherein the Rel. 17 unified TCI state is indicated for both the self/serving carrier and at least carrier j. In this example, the UE could be provided/configured by the network, e.g., via higher layer RRC signaling, a list/set/pool of carriers (or carrier indexes) including carrier j which may share the same indicated Rel. 17 unified TCI state(s) for the self/serving carrier. For this case, the UE could also use the first radio link quality of the BFD RS set q0 to detect potential beam failure(s) for one or more CORESETs that the UE uses for monitoring PDCCH in at least carrier j.

In yet another example, the UE could be configured by the network, e.g., provided by the higher layer parameter failureDetectionResourcesToAddModList, the BFD RS set q0 of periodic CSI-RS resource configuration indexes or SSB indexes for beam/link failure detection or declaration. The UE could only assess a first radio link quality of the BFD RS set q0 according to SSBs on the PCell or the PSCell or periodic CSI-RS resource configurations that are indicated in a Rel. 17 unified TCI state provided by the higher layer parameter TCI-State-r17 for respective CORESETs that the UE uses for monitoring PDCCH in the self/serving carrier, wherein the indicated Rel. 17 unified TCI state, e.g., the corresponding higher layer parameter TCI-State-r17, could include/configure a "carrier indicator" field indicating at least carrier j. For this case, the UE could also use the first radio link quality of the BFD RS set q0 to detect potential beam failure(s) for Type-1 CORESETs that the UE uses for monitoring PDCCH in at least carrier j.

In yet another example, the UE could be configured by the network, e.g., provided by the higher layer parameter failureDetectionResourcesToAddModList, the BFD RS set q0 of periodic CSI-RS resource configuration indexes or SSB indexes for beam/link failure detection or declaration. The UE could only assess a first radio link quality of the BFD RS set q0 according to SSBs on the PCell or the PSCell or periodic CSI-RS resource configurations that are indicated in a Rel. 17 unified TCI state provided by the higher layer parameter TCI-State-r17 for respective CORESETs that the UE uses for monitoring PDCCH in the self/serving carrier, wherein the Rel. 17 unified TCI state is indicated for both self/serving carrier and at least carrier j. In this example, the UE could be provided/configured by the network, e.g., via higher layer RRC signaling, a list/set/pool of carriers (or carrier indexes) including carrier j which may share the same indicated Rel. 17 unified TCI state(s) for the self/serving carrier. For this case, the UE could also use the first radio link quality of the BFD RS set q0 to detect potential beam failure(s) for Type-1 CORESETs that the UE uses for monitoring PDCCH in at least carrier j.

The UE could assess K≥1 first radio link qualities of the BFD RS set q0 as described above, each corresponding to a different carrier/carrier index or a different set of carriers/carrier indexes from the self/serving carrier.

As discussed in the present disclosure, the UE could assess the radio link quality of one or more SSB indexes on the PCell or the PSCell or periodic CSI-RS resource configuration indexes in the cross-carrier BFD RS set q0x against a BFD threshold Qout. Furthermore, the physical layer in the UE provides an indication to higher layers when the radio link quality for all corresponding periodic CSI-RS resource configuration indexes or SSB indexes in the cross-carrier BFD RS set q0x is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the cross-carrier BFD RS set q0x and 2 msec.

The physical layer in the UE could also provide to higher layers the carrier(s) or carrier index(es)—different from the self/serving carrier—associated with the cross-carrier BFD RS set q0x. As discussed in the present disclosure, the UE could determine the carrier(s) or carrier index(es) from the "carrier indicator" field(s) in the corresponding MAC CE or DCI format (e.g., DCI format 1_1 or 1_2 with or without DL assignment) indicating the Rel. 17 unified TCI state.

In one example, the UE could determine the carrier(s) or carrier index(es) according to one or more entries in the list/set/pool of carriers (or carrier indexes) higher layer configured to the UE. For the examples as discussed in the present disclosure, the physical layer in the UE indicates to higher layers (i) at least carrier j or carrier index of carrier j if the radio link quality of the cross-carrier BFD RS set q0x is below the BFD threshold Qout, or (ii) index of the cross-carrier BFD RS set q0x if the radio link quality of the cross-carrier BFD RS set q0x is below the BFD threshold Qout.

In one example, the UE could assess the first radio link quality of one or more SSB indexes on the PCell or the PSCell or periodic CSI-RS resource configuration indexes in the BFD RS set q0 with same values as the RS indexes in the RS sets indicated in a Rel. 17 unified TCI state provided by the higher layer parameter TCI-State-r17 for respective CORESETs that the UE uses for monitoring PDCCH in the self/serving carrier and at least carrier j against the BFD threshold Qout, wherein the indicated Rel. 17 unified TCI state, e.g., the corresponding higher layer parameter TCI-State-r17, could include/configure a "carrier indicator" field indicating at least carrier j.

In one example, the UE could assess the first radio link quality of one or more SSB indexes on the PCell or the PSCell or periodic CSI-RS resource configuration indexes in the BFD RS set q0 with same values as the RS indexes in the RS sets indicated in a Rel. 17 unified TCI state provided by the higher layer parameter TCI-State-r17 for respective CORESETs that the UE uses for monitoring PDCCH in the self/serving carrier and at least carrier j against the BFD threshold Qout, wherein the Rel. 17 unified TCI state is indicated for both the self/serving carrier and at least carrier j, where carrier j is from a list/set/pool of carriers (or carrier indexes) higher layer configured to the UE which could share the same indicated Rel. 17 unified TCI state for the self/serving carrier.

The physical layer in the UE provides an indication to higher layers when the first radio link quality for all corresponding periodic CSI-RS resource configuration indexes or SSB indexes in the BFD RS set q0 that have same values as the RS indexes in the RS sets indicated in the Rel. 17 unified TCI state provided by TCI-State-r17 for respective CORESETs that the UE uses for monitoring PDCCH in the self/serving carrier and at least carrier j is worse than the threshold Qout. The physical layer informs the higher layers when the first radio link quality is worse than the BFD threshold Qout a periodicity determined by the maximum between the shortest periodicity among the SSBs on the PCell or the PSCell and/or the periodic CSI-RS configurations in the BFD RS set q0 that the UE uses to assess the first radio link quality and 2 msec.

The physical layer in the UE could also provide to higher layers the carrier(s) or carrier index(es)—different from the self/serving carrier—if the corresponding first radio link quality is assessed less than Qout. For examples discussed in the present disclosure, the physical layer in the UE could determine the carrier(s) or carrier index(es) from the "carrier indicator" field(s) in the corresponding MAC CE or DCI format (e.g., DCI format 1_1 or 1_2 with or without DL assignment) indicating the Rel. 17 unified TCI state. For examples disclosed in the present disclosure, the physical layer in the UE could determine the carrier(s) or carrier index(es) according to one or more entries in the list/set/pool of carriers (or carrier indexes) higher layer configured to the UE. For examples discussed in the present disclosure, the physical layer in the UE indicates to higher layers at least carrier j or carrier index of carrier j if the corresponding first radio link quality is assessed below the BFD threshold Qout.

For examples disclosed in the present disclosure, the higher layers in the UE may increment BFI count (by one) in a cross-carrier BFI counter (denoted by BFI_COUNTERx) if the higher layers receive from the physical layer in the UE that the radio link quality of the cross-carrier BFD RS set q0x is worse than Qout. The UE may declare a DL and/or UL beam failure for the cross-carrier BFD RS set q0x if the BFI count in the cross-carrier BFI counter BFI_COUNTERx for the cross-carrier BFD RS set q0x reaches the maximum number of BFI counts (e.g., provided by the higher layer parameter maxBFIcount) before a BFD timer expires.

After the higher layers in the UE declare DL and/or UL beam failure for the cross-carrier BFD RS set q0x, the higher layers in the UE may reset the BFI count in the cross-carrier BFI counter BFI_COUNTERx or the BFD timer to zero. In addition, the higher layers in the UE could also reset the BFI count in the cross-carrier BFI counter BFI_COUNTERx or the BFD timer to zero if the UE receives in the self/serving carrier a MAC CE or DCI (e.g., DCI format 1_1 or 1_2 with or without DL assignment) based signaling to indicate/update a Rel. 17 unified TCI state provided by TCI-State_r17 for respective CORESETs that the UE uses for monitoring PDCCH or a Rel. 17 unified TCI state provided by TCI-State_r17 indicating the same carrier(s) or carrier index(es)—e.g., the same value(s) of "carrier indicator" field(s), or the same value(s) of the list/set/pool of carriers/carrier indexes higher layer configured to the UE that could share the same indicated Rel. 17 unified TCI state for the self/serving carrier—for the corresponding beam failure recovery.

For examples ad discussed in the present disclosure, the higher layers in the UE may increment the BFI count (by one) in a cross-carrier BFI counter (denoted by BFI_COUNTERx) if the higher layers receive from the physical layer in the UE that the corresponding first radio link quality of the BFD RS set q0 is worse than Qout. The UE may declare a DL and/or UL beam failure for the self/serving carrier and at least carrier j if the BFI count in the cross-carrier BFI counter BFI_COUNTERx reaches the maximum number of BFI counts (e.g., provided by the higher layer parameter maxBFIcount) before a BFD timer expires. After the higher layers in the UE declare DL and/or UL beam failure for the self/serving carrier and at least carrier j, the higher layers in the UE may reset the BFI count in the cross-carrier BFI counter BFI_COUNTERx or the BFD timer to zero.

In addition, the higher layers in the UE could also reset the BFI count in the cross-carrier BFI counter BFI_COUNTERx or the BFD timer to zero if the UE receives in the self/serving carrier a MAC CE or DCI (e.g., DCI format 1_1 or 1_2 with or without DL assignment) based signaling to indicate/update a Rel. 17 unified TCI state provided by TCI-State_r17 for respective CORESETs that the UE uses for monitoring PDCCH or a Rel. 17 unified TCI state provided by TCI-State_r17 indicating the same carrier(s) or carrier index(es)—e.g., the same value(s) of "carrier indicator" field(s), or the same value(s) of the list/set/pool of carriers/carrier indexes higher layer configured to the UE that could share the same indicated Rel. 17 unified TCI state for the self/serving carrier—for the corresponding beam failure recovery.

A UE could maintain K≥1 cross-carrier BFI counters as described above, each corresponding to a cross-carrier BFD RS set or a first radio link quality of the BFD RS set q0.

For the BFD RS configurations described in examples in the present disclosure, the UE could be configured with/provided by the network, e.g., via the higher layer parameter candidateBeamRSList, a cross-carrier NBI RS set q1x of periodic CSI-RS resource configuration indexes or SSB indexes for radio link quality measurement. The cross-carrier NBI RS set q1x is associated with the cross-carrier BFD RS set q0x used for identifying potential new beam(s) to recover the failed beam(s)/link(s) for the cross-carrier BFD RS set q0x. The UE expects single-port or two-port CSI-RS with frequency density equal to 1 or 3 REs per RB in the set q1x.

The UE could assess the radio link quality according to the set q1x of resource configurations against a threshold Qin. The UE may apply the Qin threshold to the L1-RSRP measurement obtained from a SSB in q1x, and apply the Qin threshold to the L1-RSRP measurement obtained from a CSI-RS resource in q1x after scaling a respective CSI-RS reception power with a value provided by powerControlOffsetSS. According to the L1-RSRP measurements, the UE could identify the periodic CSI-RS resource configuration index or SSB index in the NBI RS set q1x, denoted by qx_new, that corresponds to the largest/highest measured L1-RSRP among those larger than or equal to the Qin threshold.

For the BFD RS configurations, a UE could be configured with/provided by the network, e.g., via the higher layer parameter candidateBeamRSList, a cross-carrier NBI RS set q1x of periodic CSI-RS resource configuration indexes or SSB indexes for radio link quality measurement. The cross-carrier NBI RS set q1x is associated with the Rel. 17 unified TCI state indicated for the self/serving carrier and at least carrier j or the one or more RS (RS resources) in the BFD RS set q0 used for assessing the first radio link quality. The UE expects single-port or two-port CSI-RS with frequency density equal to 1 or 3 REs per RB in the set q1x. The UE could assess the radio link quality according to the set q1x of resource configurations against a threshold Qin.

The UE may apply the Qin threshold to the L1-RSRP measurement obtained from a SSB in q1x, and apply the Qin threshold to the L1-RSRP measurement obtained from a CSI-RS resource in q1x after scaling a respective CSI-RS reception power with a value provided by powerControlOffsetSS. According to the L1-RSRP measurements, the UE could identify the periodic CSI-RS resource configuration index or SSB index in the NBI RS set q1x, denoted by qx_new, that corresponds to the largest/highest measured L1-RSRP among those larger than or equal to the Qin threshold.

Furthermore, the UE could be configured with K≥1 cross-carrier NBI RS sets, each associated with/corresponding to a different cross-carrier BFD RS set, a different first radio link quality, one or more RS (RS resources) in the BFD RS set q0 used for assessing a different first radio link quality, or a Rel. 17 unified TCI state indicated for the self/serving carrier and at least one different carrier different from the self/serving carrier.

For the BFD RS configurations described in examples in the present disclosure: (i) for the PCell or the PSCell, upon request from higher layers, the UE provides to higher layers the periodic CSI-RS configuration index or SSB index qx_new from the cross-carrier NBI RS set q1x and the corresponding L1-RSRP measurement that is larger than or equal to the Qin threshold, and (ii) for the SCell, upon request from higher layers, the UE indicates to higher layers whether there is at least one periodic CSI-RS configuration index or SSB index from the cross-carrier NBI RS set q1x with corresponding L1-RSRP measurement that is larger than or equal to the Qin threshold, and provides the periodic CSI-RS configuration index or SSB index qx_new from the cross-carrier NBI RS set q1x and the corresponding L1-RSRP measurement that is larger than or equal to the Qin threshold, if any.

In one example, for the PCell or the PSCell, the UE can be provided, by PRACH-ResourceDedicatedCrossCarrierBFR, a configuration for PRACH transmission, wherein each cross-carrier NBI RS set, and therefore the periodic CSI-RS configuration index(es) or SSB index(es) configured therein, is associated with one or more different PRACH preambles. The UE could transmit at least one PRACH preamble according to antenna port quasi co-location parameters associated with periodic CSI-RS resource configuration or with SSB associated with index qx_new provided by higher layers.

In another example, for the SCell, the UE can be provided, by schedulingRequestID-CrossCarrierBFR-SCell, a configuration for PUCCH transmission with a link recovery request (LRR) using either PUCCH format 0 or PUCCH format 1 as described in the 3GPP TS 38.213. The UE could receive from the network an uplink grant in response to the PUCCH transmission with LRR for a first PUSCH MAC CE transmission. The UE could provide in the first PUSCH MAC CE index(es) for at least corresponding carrier(s)—including or excluding the self/serving carrier—with radio link quality worse than Qout (e.g., at least carrier j examples disclosed in the present disclosure), indication(s) of presence of qx_new for corresponding carrier(s), index(es) qx_new for a periodic CSI-RS configuration or for a SSB provided by higher layers, if any, for corresponding carrier(s), index(es) of the corresponding cross-carrier NBI RS set(s)—e.g., the NBI RS set q1x, or index(es) of the corresponding cross-carrier BFD RS set(s)—e.g., the BFD RS set q0x.

For the PCell or the PSCell, the UE could be provided a CORESET through a link to a search space set provided by recoverySearchSpaceId, as described in the 3GPP TS 38.213, for monitoring PDCCH in the CORESET. If the UE is provided recoverySearchSpaceId, the UE does not expect to be provided another search space set for monitoring PDCCH in the CORESET associated with the search space set provided by recoverySearchSpaceId.

For the PCell or the PSCell, the UE can be provided, by PRACH-ResourceDedicatedCrossCarrierBFR, a configuration for PRACH transmission, wherein each cross-carrier NBI RS set, and therefore the periodic CSI-RS configuration index(es) or SSB index(es) configured therein, is associated with one or more different PRACH preambles. For PRACH transmission in slot n and according to antenna port quasi co-location parameters associated with periodic CSI-RS resource configuration or with SS/PBCH block associated with index qx_new from a cross-carrier NBI RS set q1x provided by higher layers, the UE monitors PDCCH in a search space set provided by recoverySearchSpaceId for detection of a DCI format with CRC scrambled by C-RNTI or MCS-C-RNTI starting from slot n+4 within a window configured by BeamFailureRecoveryConfig. For PDCCH monitoring in a search space set provided by recoverySearchSpaceId and for corresponding PDSCH reception, the UE assumes the same antenna port quasi-collocation parameters as the ones associated with index qx_new until the UE receives an activation/update of a Rel. 17 unified TCI state provided by TCI-State_r17 via MAC CE or DCI (e.g., DCI format 1_1 or 1_2 with or without DL assignment) based signalling indicating the same carrier(s) or carrier index(es)—different from the self/serving carrier—for the corresponding beam failure recovery.

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives an activation/update of a Rel. 17 unified TCI state provided by TCI-State_r17 via MAC CE or DCI (e.g., DCI format 1_1 or 1_2 with or without DL assignment) based signalling indicating the same carrier(s) or carrier index(es)—different from the self/serving carrier—for the corresponding beam failure recovery.

In one example, if the UE is provided TCI-State_r17 indicating a Rel. 17 unified TCI state (e.g., a joint DL and UL TCI state or a separate DL TCI state or a separate UL TCI state) for the PCell or the PSCell as described in the 3GPP TS 38.214, after X symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in respective CORESETs in at least carrier j, and receives PDSCH (e.g., the PDSCH scheduled by the PDCCH in the respective CORESETs in at least carrier j) and aperiodic CSI-RS in a resource from a CSI-RS resource set configured in at least carrier j with same indicated TCI state as for the PDCCH and PDSCH in at least carrier j, using the same antenna port quasi co-location parameters as the ones associated with the corresponding index qx_new, if any; and (2) transmits PUCCH, PUSCH (e.g., the PUCCH and the PUSCH associated with the PDCCH in the respective CORESETs in at least carrier j) and SRS configured in at least carrier j with same indicated TCI state as for the PUCCH and the PUSCH in at least carrier j using a same spatial domain filter as for the last PRACH transmission, and a power setting associated with the indicated Rel. 17 unified TCI state for both the self/serving carrier and at least carrier j with q_u=0, q_d=qx_new, and closed loop index 1=0 or 1

In such examples, X could correspond to 28, and the subcarrier spacing (SCS) for the X=28 symbols could correspond to one or more of following examples.

In one example, the smallest of the SCS configurations of the active DL BWP for the PDCCH reception, e.g., in the respective CORESETs in the self/serving carrier, and of the active DL BWP(s) of the serving cell.

In one example, the smallest of the SCS configurations of the active DL BWP for the PDCCH reception, e.g., in the respective CORESETs in at least carrier j, and of the active DL BWP(s) of the serving cell.

In one example, the smallest of the SCS configurations of the active DL BWP for the PDCCH reception, e.g., in the respective CORESETs in the self/serving carrier and at least carrier j, and of the active DL BWP(s) of the serving cell.

In one example, the smallest of the SCS configurations of the active DL BWP for the PDCCH reception, e.g., in the respective CORESETs in all carriers including the self/serving carrier, and of the active DL BWP(s) of the serving cell.

In one example, the smallest of the SCS configurations of the active DL BWP for the PDCCH reception, e.g., in the respective CORESETs in all carriers excluding the self/serving carrier, and of the active DL BWP(s) of the serving cell.

In one example, the smallest of the SCS configurations of all the signal(s)/channels configured in the self/serving carrier sharing the same indicated Rel. 17 TCI state/beam (e.g., provided by the higher layer parameter TCI-State_r17).

In one example, the smallest of the SCS configurations of all the signal(s)/channels configured in at least carrier j sharing the same indicated Rel. 17 TCI state/beam (e.g., provided by the higher layer parameter TCI-State_r17).

In one example, the smallest of the SCS configurations of all the signal(s)/channels configured in the self/serving carrier and at least carrier j sharing the same indicated Rel. 17 TCI state/beam (e.g., provided by the higher layer parameter TCI-State_r17).

In one example, the smallest of the SCS configurations of all the signal(s)/channels configured in all carriers including the self/serving carrier sharing the same indicated Rel. 17 TCI state/beam (e.g., provided by the higher layer parameter TCI-State_r17).

In one example, the smallest of the SCS configurations of all the signal(s)/channels configured in all carriers excluding the self/serving carrier sharing the same indicated Rel. 17 TCI state/beam (e.g., provided by the higher layer parameter TCI-State_r17).

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives an activation/update of a Rel. 17 unified TCI state provided by TCI-State_r17 via MAC CE or DCI (e.g., DCI format 1_1 or 1_2 with or without DL assignment) based signalling indicating the same carrier(s) or carrier index(es)—different from the self/serving carrier—for the corresponding beam failure recovery.

In one example, if the UE is provided TCI-State_r17 indicating a Rel. 17 unified TCI state (e.g., a joint DL and UL TCI state or separate DL TCI state or separate UL TCI state) for the PCell or the PSCell as described in the 3GPP TS 38.214 and the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in respective CORESETs in at least carrier j, and receives PDSCH (e.g., the PDSCH scheduled by the PDCCH in the respective CORESETs in at least carrier j) and aperiodic CSI-RS in a resource from a CSI-RS resource set configured in at least carrier j with same indicated TCI state as for the PDCCH and PDSCH in at least carrier j, using the same antenna port quasi co-location parameters as the ones associated with the corresponding index qx_new, if any; and (2) transmits PUCCH, PUSCH (e.g., the PUCCH and the PUSCH associated with the PDCCH in the respective CORESETs in at least carrier j) and SRS configured in at least carrier j with same indicated TCI state as for the PUCCH and the PUSCH in at least carrier j using a same spatial domain filter as for the last PRACH transmission, and a power setting associated with the indicated Rel. 17 unified TCI state for both the self/serving carrier and at least carrier j with q_u=0, q_d=qx_new, and closed loop index 1=0 or 1.

In such examples, X could correspond to 28, and the subcarrier spacing (SCS) for the X=28 symbols could correspond to one or more of following examples.

In one example, the smallest of the SCS configurations of the active DL BWP for the PDCCH reception, e.g., in the respective CORESETs in the self/serving carrier, and of the active DL BWP(s) of the serving cell.

In one example, the smallest of the SCS configurations of the active DL BWP for the PDCCH reception, e.g., in the respective CORESETs in at least carrier j, and of the active DL BWP(s) of the serving cell.

In one example, the smallest of the SCS configurations of the active DL BWP for the PDCCH reception, e.g., in the respective CORESETs in the self/serving carrier and at least carrier j, and of the active DL BWP(s) of the serving cell.

In one example, the smallest of the SCS configurations of the active DL BWP for the PDCCH reception, e.g., in the respective CORESETs in all carriers including the self/serving carrier, and of the active DL BWP(s) of the serving cell.

In one example, the smallest of the SCS configurations of the active DL BWP for the PDCCH reception, e.g., in the respective CORESETs in all carriers excluding the self/serving carrier, and of the active DL BWP(s) of the serving cell.

In one example, the smallest of the SCS configurations of all the signal(s)/channels configured in the self/serving carrier sharing the same indicated Rel. 17 TCI state/beam (e.g., provided by the higher layer parameter TCI-State_r17).

In one example, the smallest of the SCS configurations of all the signal(s)/channels configured in at least carrier j sharing the same indicated Rel. 17 TCI state/beam (e.g., provided by the higher layer parameter TCI-State_r17).

In one example, the smallest of the SCS configurations of all the signal(s)/channels configured in the self/serving carrier and at least carrier j sharing the same indicated Rel. 17 TCI state/beam (e.g., provided by the higher layer parameter TCI-State_r17).

In one example, the smallest of the SCS configurations of all the signal(s)/channels configured in all carriers including the self/serving carrier sharing the same indicated Rel. 17 TCI state/beam (e.g., provided by the higher layer parameter TCI-State_r17).

In one example, the smallest of the SCS configurations of all the signal(s)/channels configured in all carriers excluding the self/serving carrier sharing the same indicated Rel. 17 TCI state/beam (e.g., provided by the higher layer parameter TCI-State_r17).

In one example, if the UE is provided TCI-State_r17 indicating a Rel. 17 unified TCI state (e.g., a joint DL and UL TCI state or a separate DL TCI state or a separate UL TCI state), after X symbols from a last symbol of a PDCCH reception with a DCI format scheduling a PUSCH transmission with a same HARQ process number as for the transmission of the first PUSCH MAC CE and having a toggled NDI field value, the UE: (1) monitors PDCCH in respective CORESETs in at least carrier j, and receives PDSCH (e.g., the PDSCH scheduled by the PDCCH in the respective CORESETs in at least carrier j) and aperiodic CSI-RS in a resource from a CSI-RS resource set configured in at least carrier j with same indicated TCI state as for the PDCCH and PDSCH in at least carrier j, using the same antenna port quasi co-location parameters as the ones associated with the corresponding index qx_new, if any; and (2) transmits PUCCH, PUSCH (e.g., the PUCCH and the PUSCH associated with the PDCCH in the respective CORESETs in at least carrier j) and SRS configured in at least carrier j with same indicated TCI state as for the PUCCH and the PUSCH in at least carrier j using a same spatial domain filter as the one corresponding to qx_new, and a power setting associated with the indicated Rel. 17 unified TCI state for both the self/serving carrier and at least carrier j with q_u=0, q_d=qx_new, and closed loop index 1=0 or 1, where X could correspond to 28, and the subcarrier spacing (SCS) for the X=28 symbols could correspond to one or more of following examples.

In one example, the smallest of the SCS configurations of the active DL BWP for the PDCCH reception, e.g., in the respective CORESETs in the self/serving carrier, and of the active DL BWP(s) of the serving cell.

In one example, the smallest of the SCS configurations of the active DL BWP for the PDCCH reception, e.g., in the respective CORESETs in at least carrier j, and of the active DL BWP(s) of the serving cell.

In one example, the smallest of the SCS configurations of the active DL BWP for the PDCCH reception, e.g., in the respective CORESETs in the self/serving carrier and at least carrier j, and of the active DL BWP(s) of the serving cell.

In one example, the smallest of the SCS configurations of the active DL BWP for the PDCCH reception, e.g., in the respective CORESETs in all carriers including the self/serving carrier, and of the active DL BWP(s) of the serving cell.

In one example, the smallest of the SCS configurations of the active DL BWP for the PDCCH reception, e.g., in the respective CORESETs in all carriers excluding the self/serving carrier, and of the active DL BWP(s) of the serving cell.

In one example, the smallest of the SCS configurations of all the signal(s)/channels configured in the self/serving carrier sharing the same indicated Rel. 17 TCI state/beam (e.g., provided by the higher layer parameter TCI-State_r17).

In one example, the smallest of the SCS configurations of all the signal(s)/channels configured in at least carrier j sharing the same indicated Rel. 17 TCI state/beam (e.g., provided by the higher layer parameter TCI-State_r17).

In one example, the smallest of the SCS configurations of all the signal(s)/channels configured in the self/serving carrier and at least carrier j sharing the same indicated Rel. 17 TCI state/beam (e.g., provided by the higher layer parameter TCI-State_r17).

In one example, the smallest of the SCS configurations of all the signal(s)/channels configured in all carriers including the self/serving carrier sharing the same indicated Rel. 17 TCI state/beam (e.g., provided by the higher layer parameter TCI-State_r17).

In one example, the smallest of the SCS configurations of all the signal(s)/channels configured in all carriers excluding the self/serving carrier sharing the same indicated Rel. 17 TCI state/beam (e.g., provided by the higher layer parameter TCI-State_r17).

In one example, if the UE is provided TCI-State_r17 indicating a Rel. 17 unified TCI state (e.g., a joint DL and UL TCI state or a separate DL TCI state or a separate UL TCI state) for the PCell or the PSCell as described in the 3GPP TS 38.214, after X symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in respective Type-1 CORESETs in at least carrier j, and receives PDSCH (e.g., the PDSCH scheduled by the PDCCH in the respective Type-1 CORESETs in at least carrier j) and aperiodic CSI-RS in a resource from a CSI-RS resource set configured in at least carrier j with same indicated TCI state as for the PDCCH and PDSCH in at least carrier j, using the same antenna port quasi co-location parameters as the ones associated with the corresponding index qx_new, if any; and (2) transmits PUCCH, PUSCH (e.g., the PUCCH and the PUSCH associated with the PDCCH in the respective Type-1 CORESETs in at least carrier j) and SRS configured in at least carrier j with same indicated TCI state as for the PUCCH and the PUSCH in at least carrier j using a same spatial domain filter as for the last PRACH transmission, and a power setting associated with the indicated Rel. 17 unified TCI state for both the self/serving carrier and at least carrier j with q_u=0, q_d=qx_new, and closed loop index l=0 or 1.

In such examples, X could correspond to 28, and the subcarrier spacing (SCS) for the X=28 symbols could correspond to one or more of following examples.

In one example, the smallest of the SCS configurations of the active DL BWP for the PDCCH reception, e.g., in the respective CORESETs in the self/serving carrier, and of the active DL BWP(s) of the serving cell.

In one example, the smallest of the SCS configurations of the active DL BWP for the PDCCH reception, e.g., in the respective Type-1 CORESETs in at least carrier j, and of the active DL BWP(s) of the serving cell.

In one example, the smallest of the SCS configurations of the active DL BWP for the PDCCH reception, e.g., in the respective CORESETs in the self/serving carrier and the respective Type-1 CORESETs in at least carrier j, and of the active DL BWP(s) of the serving cell.

In one example, the smallest of the SCS configurations of the active DL BWP for the PDCCH reception, e.g., in the respective Type-1 CORESETs in all carriers different from the self/serving carrier and the respective CORESETs in the self/serving carrier, and of the active DL BWP(s) of the serving cell.

In one example, the smallest of the SCS configurations of the active DL BWP for the PDCCH reception, e.g., in the respective Type-1 CORESETs in all carriers excluding the self/serving carrier, and of the active DL BWP(s) of the serving cell.

In one example, the smallest of the SCS configurations of all the signal(s)/channels configured in the self/serving carrier sharing the same indicated Rel. 17 TCI state/beam (e.g., provided by the higher layer parameter TCI-State_r17).

In one example, the smallest of the SCS configurations of all the signal(s)/channels configured in at least carrier j sharing the same indicated Rel. 17 TCI state/beam (e.g., provided by the higher layer parameter TCI-State_r17).

In one example, the smallest of the SCS configurations of all the signal(s)/channels configured in the self/serving carrier and at least carrier j sharing the same indicated Rel. 17 TCI state/beam (e.g., provided by the higher layer parameter TCI-State_r17).

In one example, the smallest of the SCS configurations of all the signal(s)/channels configured in all carriers including the self/serving carrier sharing the same indicated Rel. 17 TCI state/beam (e.g., provided by the higher layer parameter TCI-State_r17).

In one example, the smallest of the SCS configurations of all the signal(s)/channels configured in all carriers excluding the self/serving carrier sharing the same indicated Rel. 17 TCI state/beam (e.g., provided by the higher layer parameter TCI-State_r17).

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives an activation/update of a Rel. 17 unified TCI state provided by TCI-State_r17 via MAC CE or DCI (e.g., DCI format 1_1 or 1_2 with or without DL assignment) based signalling indicating the same carrier(s) or carrier index(es)—different from the self/serving carrier—for the corresponding beam failure recovery.

In one example, if the UE is provided TCI-State_r17 indicating a Rel. 17 unified TCI state (e.g., a joint DL and UL TCI state or separate DL TCI state or separate UL TCI state) for the PCell or the PSCell as described in the 3GPP TS 38.214 and the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in respective Type-1 CORESETs in at least carrier j, and receives PDSCH (e.g., the PDSCH scheduled by the PDCCH in the respective Type-1 CORESETs in at least carrier j) and aperiodic CSI-RS in a resource from a CSI-RS resource set configured in at least carrier j with same indicated TCI state as for the PDCCH and PDSCH in at least carrier j, using the same antenna port quasi co-location parameters as the ones associated with the corresponding index qx_new, if any; and (2) transmits PUCCH, PUSCH (e.g., the PUCCH and the PUSCH associated with the PDCCH in the respective Type-1 CORESETs in at least carrier j) and SRS configured in at least carrier j with same indicated TCI state as for the PUCCH and the PUSCH in at least carrier j using a same spatial domain filter as for the last PRACH transmission, and a power setting associated with the indicated Rel. 17 unified TCI state for both the self/serving carrier and at least carrier j with q_u=0, q_d=qx_new, and closed loop index 1=0 or 1.

In such examples, X could correspond to 28, and the subcarrier spacing (SCS) for the X=28 symbols could correspond to one or more of following examples.

In one example, the smallest of the SCS configurations of the active DL BWP for the PDCCH reception, e.g., in the respective CORESETs in the self/serving carrier, and of the active DL BWP(s) of the serving cell.

In one example, the smallest of the SCS configurations of the active DL BWP for the PDCCH reception, e.g., in the respective Type-1 CORESETs in at least carrier j, and of the active DL BWP(s) of the serving cell.

In one example, the smallest of the SCS configurations of the active DL BWP for the PDCCH reception, e.g., in the respective CORESETs in the self/serving carrier and the respective Type-1 CORESETs in at least carrier j, and of the active DL BWP(s) of the serving cell.

In one example, the smallest of the SCS configurations of the active DL BWP for the PDCCH reception, e.g., in the respective Type-1 CORESETs in all carriers different from the self/serving carrier and the respective CORESETs in the self/serving carrier, and of the active DL BWP(s) of the serving cell.

In one example, the smallest of the SCS configurations of the active DL BWP for the PDCCH reception, e.g., in the respective Type-1 CORESETs in all carriers excluding the self/serving carrier, and of the active DL BWP(s) of the serving cell.

In one example, the smallest of the SCS configurations of all the signal(s)/channels configured in the self/serving carrier sharing the same indicated Rel. 17 TCI state/beam (e.g., provided by the higher layer parameter TCI-State_r17).

In one example, the smallest of the SCS configurations of all the signal(s)/channels configured in at least carrier j sharing the same indicated Rel. 17 TCI state/beam (e.g., provided by the higher layer parameter TCI-State_r17).

In one example, the smallest of the SCS configurations of all the signal(s)/channels configured in the self/serving carrier and at least carrier j sharing the same indicated Rel. 17 TCI state/beam (e.g., provided by the higher layer parameter TCI-State_r17).

In one example, the smallest of the SCS configurations of all the signal(s)/channels configured in all carriers including the self/serving carrier sharing the same indicated Rel. 17 TCI state/beam (e.g., provided by the higher layer parameter TCI-State_r17).

In one example, the smallest of the SCS configurations of all the signal(s)/channels configured in all carriers excluding the self/serving carrier sharing the same indicated Rel. 17 TCI state/beam (e.g., provided by the higher layer parameter TCI-State_r17).

In one example, if the UE is provided TCI-State_r17 indicating a Rel. 17 unified TCI state (e.g., a joint DL and UL TCI state or a separate DL TCI state or a separate UL TCI state), after X symbols from a last symbol of a PDCCH reception with a DCI format scheduling a PUSCH transmission with a same HARQ process number as for the transmission of the first PUSCH MAC CE and having a toggled NDI field value, the UE: (1) monitors PDCCH in respective Type-1 CORESETs in at least carrier j, and receives PDSCH (e.g., the PDSCH scheduled by the PDCCH in the respective Type-1 CORESETs in at least carrier j) and aperiodic CSI-RS in a resource from a CSI-RS resource set configured in at least carrier j with same indicated TCI state as for the PDCCH and PDSCH in at least carrier j, using the same antenna port quasi co-location parameters as the ones associated with the corresponding index qx_new, if any; and (2) transmits PUCCH, PUSCH (e.g., the PUCCH and the PUSCH associated with the PDCCH in the respective Type-1 CORESETs in at least carrier j) and SRS configured in at least carrier j with same indicated TCI state as for the PUCCH and the PUSCH in at least carrier j using a same spatial domain filter as the one corresponding to qx_new, and a power setting associated with the indicated Rel. 17 unified TCI state for both the self/serving carrier and at least carrier j with q_u=0, q_d=qx_new, and closed loop index 1=0 or 1.

In such example, X could correspond to 28, and the subcarrier spacing (SCS) for the X=28 symbols could correspond to one or more of following examples.

In one example, the smallest of the SCS configurations of the active DL BWP for the PDCCH reception, e.g., in the respective CORESETs in the self/serving carrier, and of the active DL BWP(s) of the serving cell.

In one example, the smallest of the SCS configurations of the active DL BWP for the PDCCH reception, e.g., in the respective Type-1 CORESETs in at least carrier j, and of the active DL BWP(s) of the serving cell.

In one example, the smallest of the SCS configurations of the active DL BWP for the PDCCH reception, e.g., in the respective CORESETs in the self/serving carrier and the respective Type-1 CORESETs in at least carrier j, and of the active DL BWP(s) of the serving cell.

In one example, the smallest of the SCS configurations of the active DL BWP for the PDCCH reception, e.g., in the respective Type-1 CORESETs in all carriers different from the self/serving carrier and the respective CORESETs in the self/serving carrier, and of the active DL BWP(s) of the serving cell.

In one example, the smallest of the SCS configurations of the active DL BWP for the PDCCH reception, e.g., in the respective Type-1 CORESETs in all carriers excluding the self/serving carrier, and of the active DL BWP(s) of the serving cell.

In one example, the smallest of the SCS configurations of all the signal(s)/channels configured in the self/serving carrier sharing the same indicated Rel. 17 TCI state/beam (e.g., provided by the higher layer parameter TCI-State_r17).

In one example, the smallest of the SCS configurations of all the signal(s)/channels configured in at least carrier j sharing the same indicated Rel. 17 TCI state/beam (e.g., provided by the higher layer parameter TCI-State_r17).

In one example, the smallest of the SCS configurations of all the signal(s)/channels configured in the self/serving carrier and at least carrier j sharing the same indicated Rel. 17 TCI state/beam (e.g., provided by the higher layer parameter TCI-State_r17).

In one example, the smallest of the SCS configurations of all the signal(s)/channels configured in all carriers including the self/serving carrier sharing the same indicated Rel. 17 TCI state/beam (e.g., provided by the higher layer parameter TCI-State_r17).

In one example, the smallest of the SCS configurations of all the signal(s)/channels configured in all carriers excluding the self/serving carrier sharing the same indicated Rel. 17 TCI state/beam (e.g., provided by the higher layer parameter TCI-State_r17).

The unified (master or main) TCI state is TCI state of UE-dedicated reception on PDSCH/PDCCH or dynamic-grant/configured-grant based PUSCH and all of dedicated PUCCH resources. As discussed above, a UE could be provided by the network, e.g., via MAC CE or DCI (e.g., DCI format 1_1 or 1_2 with or without DL assignment) based signaling through the higher layer parameter TCI-State_r17, M>1 joint DL and UL Rel. 17 unified TCI states or M>1 separate UL Rel. 17 unified TCI states or a first combination of M>1 joint DL and UL Rel. 17 unified TCI states and separate UL Rel. 17 unified TCI states or N>1 separate DL Rel. 17 unified TCI states or a second combination of N>1 joint DL and UL Rel. 17 unified TCI states and separate DL Rel. 17 unified TCI states or a third combination of N>1 joint DL and UL Rel. 17 unified TCI states, separate DL Rel. 17 unified TCI states and separate UL Rel. 17 unified TCI states for UE-dedicated reception on PDSCH/PDCCH or dynamic-grant/configured-grant based PUSCH and all of dedicated PUCCH resources.

For instance, the DCI format for unified TCI state/beam indication (e.g., DCI format 1_1 or 1_2 with or without DL assignment) could include a "transmission configuration indication" field containing one or more codepoints activated by a MAC CE activation command from a set/pool of codepoints. For this case, each codepoint could indicate M>1 joint DL and UL Rel. 17 unified TCI states or M>1 separate UL Rel. 17 unified TCI states or a first combination of M>1 joint DL and UL Rel. 17 unified TCI states and separate UL Rel. 17 unified TCI states or N>1 separate DL Rel. 17 unified TCI states or a second combination of N>1 joint DL and UL Rel. 17 unified TCI states and separate DL Rel. 17 unified TCI states or a third combination of N>1 joint DL and UL Rel. 17 unified TCI states, separate DL Rel. 17 unified TCI states and separate UL Rel. 17 unified TCI for UE-dedicated reception on PDSCH/PDCCH or dynamic-grant/configured-grant based PUSCH and all of dedicated PUCCH resources.

In the present disclosure, the indicated Rel. 17 unified TCI state n or m ($n \in \{1, \ldots, N\}$ and $m \in \{1, \ldots, M\}$) could correspond to the n-th joint DL and UL TCI state or the m-th separate UL TCI state or the n-th separate DL TCI state or the m-th TCI state in the first combination of TCI states or the n-th TCI state in the second combination of TCI states or the n-th TCI state in the third combination of TCI states or the joint DL and UL TCI state with the n-th lowest or highest TCI state ID or the separate UL TCI state with the m-th lowest or highest TCI state ID or the separate DL TCI state with the n-th lowest or highest TCI state ID or the TCI state in the first combination of TCI states with the m-th lowest or highest TCI state ID or the TCI state in the second combination of TCI states with the n-th lowest or highest TCI state ID or the TCI state in the third combination of TCI states with the n-th lowest or highest TCI state ID, among the N>1 or M>1 Rel. 17 unified TCI states, indicated via the MAC CE or DCI (e.g., DCI format 1_1 or 1_2 with or without DL assignment) based signalling.

Furthermore, a UE could receive in a self/serving carrier via MAC CE or DCI (e.g., DCI format 1_1 or 1_2 with or without DL assignment) based signaling through the higher layer parameter TCI-State_r17 one or more (e.g., N>1 or M>1) Rel. 17 unified TCI states for the self/serving carrier and at least one carrier different from the self/serving carrier. In one example, the MAC CE or DCI for unified TCI state indication could include/contain one or more "carrier indicator" fields. A "carrier indicator" field could indicate one or more (e.g., K>1) carriers or carrier indexes.

Alternatively, a "transmission configuration indication" field in the MAC CE or DCI for unified TCI state indication could contain/include/indicate one or more (e.g., K>1) carriers or carrier indexes. Each of the indicated K>1 carriers or carrier indexes could correspond/map to at least one Rel. 17 unified TCI state among the N>1 or M>1 Rel. 17 unified TCI states indicated in the MAC CE or DCI for unified TCI state indication.

Both implicit and explicit BFD RS resource configuration methods are specified in the present disclosure under the Rel. 17 unified TCI framework for cross-carrier beam indication. In a cross-carrier setting comprising the self/serving carrier and at least one carrier different from the self/serving carrier, the UE could receive in the self/serving carrier one or more Rel. 17 unified TCI states—e.g., via MAC CE or DCI (e.g., DCI format 1_1 or 1_2 with or without DL assignment) based signaling—indicated for both the self/serving carrier and one or more different other carriers. As discussed above, one or more carrier or carrier indexes could be indicated in one or more "transmission configuration indication" fields in the MAC CE or DCI format for unified TCI state indication or in one or more "carrier indicator" fields in the MAC CE or DCI format for unified TCI state indication.

Furthermore, as discussed above, a carrier or carrier index could be associated/mapped to one or more Rel. 17 unified TCI states indicated in the same MAC CE or DCI format (e.g., DCI format 1_1 or 1_2 with or without DL assignment) for unified TCI state indication. For this case, a UE could use one or more of the reference signals indicated in the one or more Rel. 17 unified TCI states associated with a carrier to configure QCL assumption(s) for PDCCH reception(s) in one or more CORESETs of the corresponding carrier. The one or more CORESETs of the corresponding carrier could be configured with a same higher layer parameter "useIndicatedr17TCIState."

In the present disclosure, a carrier j different from the self/serving carrier is considered. The carrier j or the carrier index of the carrier j is indicated in a "carrier indicator" field or a "transmission configuration indication" field in the MAC CE or DCI for unified TCI state indication received in the self/serving carrier. The UE is provided by the network in the self/serving carrier via MAC CE or DCI (e.g., DCI format 1_1 or 1_2 with or without DL assignment) based signaling through the higher layer parameter TCI-State_r17 N>1 or M>1 Rel. 17 unified TCI states for UE-dedicated reception on PDSCH/PDCCH or dynamic-grant/configured-grant based PUSCH and all of dedicated PUCCH resources in both the self/serving carrier and one or more carriers different from the self/serving carrier. In the present disclosure, the Rel. 17 unified TCI states—among the N>1 or M>1 Rel. 17 unified TCI states indicated in the MAC CE or DCI format for unified TCI state indication received in the self/serving carrier—associated with the carrier j are regarded as first Rel. 17 unified TCI states for carrier j.

A UE could implicitly determine a set of RSs (or RS resources) q0x for beam failure detection (also referred to as a cross-carrier BFD RS set) for the carrier j under the Rel. 17 unified TCI framework. In one example, the UE could determine the cross-carrier BFD RS set q0x to include periodic CSI-RS resource configuration indexes or SSB indexes (also referred to as BFD RS resource indexes) with same values as the RS indexes in the RS sets indicated in one or more of the first Rel. 17 unified TCI states for carrier j—referred to as second Rel. 17 unified TCI states for carrier j—for respective CORESETs that the UE uses for monitoring PDCCH in the carrier j. In the present disclosure, the second Rel. 17 unified TCI states for carrier j could correspond to at least one of: joint DL and UL TCI states, separate DL TCI states, separate UL TCI states, a combination of joint DL and UL TCI states and separate DL TCI states, and a combination of joint DL and UL TCI states and separate UL TCI states.

Furthermore, in the present disclosure, the second Rel. 17 unified TCI states for carrier j could correspond to or could be the same as the first Rel. 17 unified TCI states for carrier j. For this case, the UE could monitor radio link quality of the cross-carrier BFD RS set q0x to detect potential DL or UL beam failure(s) for one or more CORESETs that the UE uses for monitoring PDCCH in the carrier j.

DM-RS antenna ports for PDCCH receptions in one or more CORESETs of the carrier j may or may not be quasi co-located with the reference signal provided in the first Rel. 17 unified TCI state for carrier j. In the present disclosure, the control resource set(s) in the carrier j whose QCL assumption(s) follow that provided in the indicated first Rel. 17 unified TCI states for carrier j is referred to as Type-1 CORESET(s) in the carrier j, while the control resource set(s) in the carrier j whose QCL assumption(s) does not follow that provided in the indicated first Rel. 17 unified TCI states for carrier j is referred to as Type-2 CORESET(s) in the carrier j.

Furthermore, a Type-1 CORESET or a Type-2 CORESET could correspond to one or more of: (1) "CORESET A": a CORESET other than CORESET with index 0 (or CORESET #0) associated with only UE-dedicated PDCCH reception(s) in a CC, comprising, e.g., CORESET(s) associated with USS set(s) or Type3-PDCCH CSS set(s); (2) "CORESET B": a CORESET other than CORESET #0 associated with only non-UE-dedicated PDCCH reception(s) in a CC, comprising, e.g., CORESET(s) associated with all types of CSS sets such as Type0/0A/1/2/3-PDCCH CSS sets or CSS sets other than Type3-PDCCH CSS set(s) such as Type0/0A/1/2-PDCCH CSS sets; (3) "CORESET C": a CORESET other than CORESET #0 associated with both UE-dedicated and non-UE-dedicated PDCCH receptions in a CC; or (4) CORESET #0, i.e., CORESET with index 0.

The UE could be provided/configured with "useIndicatedr17TCIState" for one or more of the Type-1 CORESETs in the carrier j. For instance, the UE could be provided/configured with "useIndicatedr17TCIstate" set to "enabled" in the parameter, e.g., the higher layer parameter ControlResourceSet, that configures the corresponding Type-1 CORESET(s) in a carrier (e.g., the carrier j) different from the self/serving carrier. For this case, the UE could determine the cross-carrier BFD RS set q0x to include periodic CSI-RS resource configuration indexes or SSB indexes (also referred to as BFD RS resource indexes) with same values as the RS indexes in the RS sets indicated in one or more of the first Rel. 17 unified TCI states for carrier j—referred to as second Rel. 17 unified TCI states for carrier j—for respective CORESETs that the UE uses for monitoring PDCCH in the carrier j. In the present disclosure, the second Rel. 17 unified TCI states for carrier j could correspond to at least one of: joint DL and UL TCI states, separate DL TCI states, separate UL TCI states, a combination of joint DL and UL TCI states and separate DL TCI states, and a combination of joint DL and UL TCI states and separate UL TCI states.

Furthermore, in the present disclosure, the second Rel. 17 unified TCI states for carrier j could correspond to or could be the same as the first Rel. 17 unified TCI states for carrier j. For this case, the UE could also monitor radio link quality of the cross-carrier BFD RS set q0x to detect potential DL or UL beam failure(s) for Type-1 CORESETs that the UE uses for monitoring PDCCH in the carrier j.

As a UE could be configured with K>1 carriers or carrier indexes, the UE could determine at least K>1 cross-carrier BFD RS sets as described above, each corresponding to a carrier or carrier index among the K>1 carriers or carrier indexes indicated in the MAC CE or DCI format (e.g., DCI format 1_1 or 1_2 with or without DL assignment) for unified TCI state indication received in the self/serving carrier.

The UE could be configured by the network a set of RSs (or RS resources) for beam failure detection (also referred to as BFD RS set) q0 under the Rel. 17 unified TCI framework, wherein the UE is provided by the network in the self/serving carrier via MAC CE or DCI (e.g., DCI format 1_1 or 1_2 with or without DL assignment) based signaling through the higher layer parameter TCI-State_r17, N>1 or M>1 Rel. 17 unified TCI states for UE-dedicated reception on PDSCH/PDCCH or dynamic-grant/configured-grant based PUSCH and all of dedicated PUCCH resources in the self/serving carrier and one or more carriers different from the self/serving carrier. To detect potential DL or UL beam failure(s) for the carrier j, following examples can be provided.

In one example, the UE could be configured by the network, e.g., provided by the higher layer parameter failureDetectionResourcesToAddModList, the BFD RS set q0 of periodic CSI-RS resource configuration indexes or SSB indexes for beam/link failure detection or declaration. The UE could only assess a first radio link quality of the BFD RS set q0 according to SSBs on the PCell or the PSCell or periodic CSI-RS resource configurations that are indicated in one or more of the first Rel. 17 unified TCI states for carrier j—referred to as second Rel. 17 unified TCI states for carrier j—for respective CORESETs that the UE uses for monitoring PDCCH in the carrier j. For this case, the UE could use the first radio link quality of the BFD RS set q0 to detect potential DL or UL beam failure(s) for one or more CORESETs that the UE uses for monitoring PDCCH in the carrier j.

In another example, the UE could be configured by the network, e.g., provided by the higher layer parameter failureDetectionResourcesToAddModList, the BFD RS set q0 of periodic CSI-RS resource configuration indexes or SSB indexes for beam/link failure detection or declaration. The UE could only assess a first radio link quality of the BFD RS set q0 according to SSBs on the PCell or the PSCell or periodic CSI-RS resource configurations that are indicated in one or more of the first Rel. 17 unified TCI states for carrier j—referred to as second Rel. 17 unified TCI states for carrier j—for respective CORESETs that the UE uses for monitoring PDCCH in the carrier j. For this case, the UE could use the first radio link quality of the BFD RS set q0 to detect potential DL or UL beam failure(s) for Type-1 CORESETs that the UE uses for monitoring PDCCH in the carrier j.

As a UE could be configured with K>1 carriers or carrier indexes, the UE could assess at least K>1 first radio link qualities of the BFD RS set q0 as described above, each corresponding to a carrier or carrier index among the K>1 carriers or carrier indexes indicated in the MAC CE or DCI format (e.g., DCI format 1_1 or 1_2 with or without DL assignment) for unified TCI state indication received in the self/serving carrier.

In one example, a UE could assess the radio link quality of one or more SSB indexes on the PCell or the PSCell or periodic CSI-RS resource configuration indexes in the cross-carrier BFD RS set q0x against a BFD threshold Qout. Furthermore, the physical layer in the UE provides an indication to higher layers when the radio link quality for all corresponding periodic CSI-RS resource configuration indexes or SSB indexes in the cross-carrier BFD RS set q0x is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the cross-carrier BFD RS set q0x and 2 msec.

The physical layer in the UE could also provide to higher layers the carrier(s) or carrier index(es)—e.g., the carrier j or the carrier index of the carrier j—associated with the cross-carrier BFD RS set q0x. The UE could determine the carrier(s) or carrier index(es) from the "carrier indicator" field(s) or the "transmission configuration indication" field (s) in the corresponding MAC CE or DCI format (e.g., DCI format 1_1 or 1_2 with or without DL assignment) for unified TCI state indication. For examples discussed in the present disclosure, the physical layer in the UE indicates to higher layers (i) the carrier j or the carrier index of the carrier j if the radio link quality of the cross-carrier BFD RS set q0x is below the BFD threshold Qout, or (ii) set index of the cross-carrier BFD RS set q0x if the radio link quality of the cross-carrier BFD RS set q0x is below the BFD threshold Qout.

In one example, a UE could assess the first radio link quality of one or more SSB indexes on the PCell or the PSCell or periodic CSI-RS resource configuration indexes in the BFD RS set q0 with same values as the RS indexes in the RS sets indicated in the second Rel. 17 unified TCI states for respective CORESETs that the UE uses for monitoring PDCCH in the carrier j against the BFD threshold Qout. The physical layer in the UE provides an indication to higher layers when the first radio link quality for all corresponding periodic CSI-RS resource configuration indexes or SSB indexes in the BFD RS set q0 that have same values as the RS indexes in the RS sets indicated in the second Rel. 17 unified TCI states for respective CORESETs that the UE uses for monitoring PDCCH in the carrier j is worse than the threshold Qout.

The physical layer informs the higher layers when the first radio link quality is worse than the BFD threshold Qout a periodicity determined by the maximum between the shortest periodicity among the SSBs on the PCell or the PSCell and/or the periodic CSI-RS configurations in the BFD RS set q0 that the UE uses to assess the first radio link quality and 2 msec. The physical layer in the UE could also provide to higher layers the carrier(s) or carrier index(es)—e.g., the carrier j or the carrier index of the carrier j—if the corresponding first radio link quality is assessed less than Qout. The physical layer in the UE could determine the carrier(s) or carrier index(es) from the "carrier indicator" field(s) or the "transmission configuration indication" field(s) in the corresponding MAC CE or DCI format (e.g., DCI format 1_1 or 1_2 with or without DL assignment) for unified TCI state indication. Furthermore, the physical layer in the UE indicates to higher layers the carrier j or the carrier index of the carrier j if the corresponding first radio link quality is assessed below the BFD threshold Qout.

In one example, the higher layers in the UE may increment beam failure instance (BFI) count (by one) in a cross-carrier BFI counter (denoted by BFI_COUNTERx) if the higher layers receive from the physical layer in the UE that the radio link quality of the cross-carrier BFD RS set q0x is worse than Qout. The UE may declare a DL and/or UL beam failure for the cross-carrier BFD RS set q0x if the BFI count in the cross-carrier BFI counter BFI_COUNTERx for the cross-carrier BFD RS set q0x reaches the maximum number of BFI counts (e.g., provided by the higher layer parameter maxBFIcount) before a BFD timer expires.

After the higher layers in the UE declare DL and/or UL beam failure for the cross-carrier BFD RS set q0x, the higher layers in the UE may reset the BFI count in the cross-carrier BFI counter BFI_COUNTERx or the BFD timer to zero. In addition, the higher layers in the UE could also reset the BFI count in the cross-carrier BFI counter BFI_COUNTERx or the BFD timer to zero if the UE receives in the self/serving carrier a MAC CE or DCI (e.g., DCI format 1_1 or 1_2 with or without DL assignment) based signaling to indicate/update one or more first Rel. 17 unified TCI states or one or more second Rel. 17 unified TCI states for the carrier j.

In one example, the higher layers in the UE may increment the beam failure instance (BFI) count (by one) in a cross-carrier BFI counter (denoted by BFI_COUNTERx) if the higher layers receive from the physical layer in the UE that the corresponding first radio link quality of the BFD RS set q0 is worse than Qout. The UE may declare a DL and/or UL beam failure for the carrier j if the BFI count in the cross-carrier BFI counter BFI_COUNTERx reaches the maximum number of BFI counts (e.g., provided by the higher layer parameter maxBFIcount) before a BFD timer expires.

After the higher layers in the UE declare DL and/or UL beam failure for the carrier j, the higher layers in the UE may reset the BFI count in the cross-carrier BFI counter BFI_COUNTERx or the BFD timer to zero. In addition, the higher layers in the UE could also reset the BFI count in the cross-carrier BFI counter BFI_COUNTERx or the BFD timer to zero if the UE receives in the self/serving carrier a MAC CE or DCI (e.g., DCI format 1_1 or 1_2 with or without DL assignment) based signaling to indicate/update one or more first Rel. 17 unified TCI states or one or more second Rel. 17 unified TCI states for the carrier j.

As a UE could be configured with K>1 carriers or carrier indexes, the UE could maintain at least K>1 cross-carrier BFI counters as described above, each corresponding to a carrier or carrier index among the K>1 carriers or carrier indexes indicated in the MAC CE or DCI format (e.g., DCI format 1_1 or 1_2 with or without DL assignment) for unified TCI state indication received in the self/serving carrier.

For the BFD RS configurations, the UE could be configured with/provided by the network, e.g., via the higher layer parameter candidateBeamRSList, a cross-carrier NBI RS set q1x of periodic CSI-RS resource configuration indexes or SSB indexes for radio link quality measurement. The cross-carrier NBI RS set q1x is associated with the cross-carrier BFD RS set q0x (and therefore, the carrier j) used for identifying potential new beam(s) to recover the failed beam(s)/link(s) for the cross-carrier BFD RS set q0x (and therefore, the carrier j). The UE expects single-port or two-port CSI-RS with frequency density equal to 1 or 3 REs per RB in the set q1x.

The UE could assess the radio link quality according to the set q1x of resource configurations against a threshold Qin. The UE may apply the Qin threshold to the L1-RSRP measurement obtained from a SSB in q1x, and apply the Qin threshold to the L1-RSRP measurement obtained from a CSI-RS resource in q1x after scaling a respective CSI-RS reception power with a value provided by powerControlOffsetSS. According to the L1-RSRP measurements, the UE could identify the periodic CSI-RS resource configuration index or SSB index in the NBI RS set q1x, denoted by qx_new, that corresponds to the largest/highest measured L1-RSRP among those larger than or equal to the Qin threshold.

For the BFD RS configurations, the UE could be configured with/provided by the network, e.g., via the higher layer parameter candidateBeamRSList, a cross-carrier NBI RS set q1x of periodic CSI-RS resource configuration indexes or SSB indexes for radio link quality measurement. The cross-carrier NBI RS set q1x is associated with the carrier j or the first Rel. 17 unified TCI states for carrier j or the second Rel. 17 unified TCI states for carrier j or the one or more RS (RS resources) in the BFD RS set q0 used for assessing the first radio link quality for the carrier j. The UE expects single-port or two-port CSI-RS with frequency density equal to 1 or 3 REs per RB in the set q1x.

The UE could assess the radio link quality according to the set q1x of resource configurations against a threshold Qin. The UE may apply the Qin threshold to the L1-RSRP measurement obtained from a SSB in q1x, and apply the Qin threshold to the L1-RSRP measurement obtained from a CSI-RS resource in q1x after scaling a respective CSI-RS reception power with a value provided by powerControlOffsetSS. According to the L1-RSRP measurements, the UE could identify the periodic CSI-RS resource configuration index or SSB index in the NBI RS set q1x, denoted by qx_new, that corresponds to the largest/highest measured L1-RSRP among those larger than or equal to the Qin threshold.

Furthermore, the UE could be configured with at least K>1 cross-carrier NBI RS sets, each associated with/corresponding to a different cross-carrier BFD RS set, a different first radio link quality, one or more RS (RS resources) in the BFD RS set q0 used for assessing a different first radio link quality, or first Rel. 17 unified TCI states for a carrier, or second Rel. 17 unified TCI states for a carrier.

For the BFD RS configurations: (i) for the PCell or the PSCell, upon request from higher layers, the UE provides to higher layers the periodic CSI-RS configuration index or SSB index qx_new from the cross-carrier NBI RS set q1x and the corresponding L1-RSRP measurement that is larger than or equal to the Qin threshold, and (ii) for the SCell, upon request from higher layers, the UE indicates to higher layers whether there is at least one periodic CSI-RS configuration index or SSB index from the cross-carrier NBI RS set q1x with corresponding L1-RSRP measurement that is larger than or equal to the Qin threshold, and provides the periodic CSI-RS configuration index or SSB index qx_new from the cross-carrier NBI RS set q1x and the corresponding L1-RSRP measurement that is larger than or equal to the Qin threshold, if any.

In one example, for the PCell or the PSCell, the UE can be provided, by PRACH-ResourceDedicatedCrossCarrierBFR, a configuration for PRACH transmission, wherein each cross-carrier NBI RS set, and therefore the periodic CSI-RS configuration index(es) or SSB index(es) configured therein, is associated with one or more different PRACH preambles. The UE could transmit at least one PRACH preamble according to antenna port quasi co-location parameters associated with periodic CSI-RS resource configuration or with SSB associated with index qx_new provided by higher layers.

In another example, for the SCell, the UE can be provided, by schedulingRequestID-CrossCarrierBFR-SCell, a configuration for PUCCH transmission with a link recovery request (LRR) using either PUCCH format 0 or PUCCH format 1 as described in the 3GPP TS 38.213. The UE could receive from the network an uplink grant in response to the PUCCH transmission with LRR for a first PUSCH MAC CE transmission. The UE could provide in the first PUSCH MAC CE index(es) for at least corresponding carrier(s)—including or excluding the self/serving carrier—with radio link quality worse than Qout (e.g., the carrier j), indication(s) of presence of qx_new for corresponding carrier(s), index(es) qx_new for a periodic CSI-RS configuration or for a SSB provided by higher layers, if any, for corresponding carrier(s), index(es) of the corresponding cross-carrier NBI RS set(s)—e.g., the NBI RS set q1x, or index(es) of the corresponding cross-carrier BFD RS set (s)—e.g., the BFD RS set q0x.

For the PCell or the PSCell, the UE could be provided a CORESET through a link to a search space set provided by recoverySearchSpaceId, as described in the 3GPP TS 38.213, for monitoring PDCCH in the CORESET. If the UE is provided recoverySearchSpaceId, the UE does not expect to be provided another search space set for monitoring PDCCH in the CORESET associated with the search space set provided by recoverySearchSpaceId.

For the PCell or the PSCell, the UE can be provided, by PRACH-ResourceDedicatedCrossCarrierBFR, a configuration for PRACH transmission, wherein each cross-carrier NBI RS set, and therefore the periodic CSI-RS configuration index(es) or SSB index(es) configured therein, is associated with one or more different PRACH preambles. For PRACH transmission in slot n and according to antenna port quasi co-location parameters associated with periodic CSI-RS resource configuration or with SS/PBCH block associated with index qx_new from a cross-carrier NBI RS set q1x provided by higher layers, the UE monitors PDCCH in a search space set provided by recoverySearchSpaceId for detection of a DCI format with CRC scrambled by C-RNTI or MCS-C-RNTI starting from slot n+4 within a window configured by BeamFailureRecoveryConfig.

For PDCCH monitoring in a search space set provided by recoverySearchSpaceId and for corresponding PDSCH reception, the UE assumes the same antenna port quasi-collocation parameters as the ones associated with index qx_new from the cross-carrier NBI RS set q1x until the UE receives an activation/update of one or more first Rel. 17 unified TCI states for carrier j or one or more second Rel. 17 unified TCI states for carrier j via MAC CE or DCI (e.g., DCI format 1_1 or 1_2 with or without DL assignment) based signalling for unified TCI state indication received in the self/serving carrier.

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives an activation/update of one or more first Rel. 17 unified TCI states for carrier j or one or more second Rel. 17 unified TCI states for carrier j via MAC CE or DCI (e.g., DCI format 1_1 or 1_2 with or without DL assignment) based signalling for unified TCI state indication received in the self/serving carrier.

In one example, if a UE is provided in the self/serving carrier via MAC CE or DCI (e.g., DCI format 1_1 or 1_2 with or without DL assignment) through TCI-State_r17 N>1 or M>1 Rel. 17 unified TCI states for the PCell or the PSCell, after X symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in respective CORESETs in the carrier j, and receives PDSCH (e.g., the PDSCH scheduled by the PDCCH in the respective CORESETs in the carrier j) and aperiodic CSI-RS in a resource from a CSI-RS resource set configured in the carrier j with same indicated TCI state(s) as for the PDCCH and PDSCH in the carrier j, using the same antenna port quasi co-location parameters as the ones associated with the corresponding index qx_new, if any; and (2) transmits PUCCH, PUSCH (e.g., the PUCCH and the PUSCH associated with the PDCCH in the respective CORESETs in the carrier j) and SRS configured in the carrier j with same indicated TCI state(s) as for the PUCCH and the PUSCH in the carrier j using a same spatial domain filter as for the last PRACH transmission, and a power setting associated with the second Rel. 17 unified TCI states for carrier j with q_u=0, q_d=qx_new, and closed loop index 1=0 or 1.

In such examples, X could correspond to 28, and the subcarrier spacing (SCS) for the X=28 symbols could correspond to one or more of following examples.

In one example, the smallest of the SCS configurations of the active DL BWP(s) for the PDCCH reception, e.g., in the respective CORESETs in the self/serving carrier, and of the active DL BWP(s) of the self/serving carrier.

In one example, the smallest of the SCS configurations of the active DL BWP(s) for the PDCCH reception, e.g., in the respective CORESETs in the carrier j, and of the active DL BWP(s) of the carrier j.

In one example, the smallest of the SCS configurations of the active DL BWP(s) for the PDCCH reception, e.g., in the respective CORESETs in the self/serving carrier and the carrier j, and of the active DL BWP(s) of the self/serving carrier and the carrier j.

In one example, the smallest of the SCS configurations of the active DL BWP(s) for the PDCCH reception, e.g., in the respective CORESETs in all carriers including the self/serving carrier, and of the active DL BWP(s) of all carriers including the self/serving carrier.

In one example, the smallest of the SCS configurations of the active DL BWP(s) for the PDCCH reception, e.g., in the respective CORESETs in all carriers excluding the self/serving carrier, and of the active DL BWP(s) of all carriers excluding the self/serving carrier.

In one example, the smallest of the SCS configurations of all the signal(s)/channels configured in the self/serving carrier sharing the same indicated first Rel. 17 TCI states for the self/serving carrier.

In one example, the smallest of the SCS configurations of all the signal(s)/channels configured in the self/serving carrier sharing the same indicated second Rel. 17 TCI states for the self/serving carrier.

In one example, the smallest of the SCS configurations of all the signal(s)/channels configured in the carrier j sharing the same indicated first Rel. 17 TCI states for the carrier j.

In one example, the smallest of the SCS configurations of all the signal(s)/channels configured in the carrier j sharing the same indicated second Rel. 17 TCI states for the carrier j.

In one example, the smallest of the SCS configurations of all the signal(s)/channels configured in the self/serving carrier sharing the same indicated first (or second) Rel. 17 TCI states for the self/serving carrier and the SCS configurations of all the signal(s)/channels configured in the carrier j sharing the same indicated first (or second) Rel. 17 TCI states for the carrier j.

In one example, the smallest of the SCS configurations of all the signal(s)/channels configured in the self/serving carrier sharing the same indicated first (or second) Rel. 17 TCI states for the self/serving carrier and the SCS configurations of all the signal(s)/channels configured in the carrier j sharing the same indicated second (or first) Rel. 17 TCI states for the carrier j.

In one example, the smallest of the SCS configurations of all the signal(s)/channels configured in all carriers including the self/serving carrier sharing the same indicated first (or second) Rel. 17 TCI states for respective carriers.

In one example, the smallest of the SCS configurations of all the signal(s)/channels configured in all carriers excluding the self/serving carrier sharing the same indicated first (or second) Rel. 17 TCI states for respective carriers.

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives an activation/update of one or more first Rel. 17 unified TCI states for carrier j or one or more second Rel. 17 unified TCI states for carrier j via MAC CE or DCI (e.g., DCI format 1_1 or 1_2 with or without DL assignment) based signalling for unified TCI state indication received in the self/serving carrier.

In one example, if a UE is provided in the self/serving carrier via MAC CE or DCI (e.g., DCI format 1_1 or 1_2 with or without DL assignment) through TCI-State_r17 N>1 or M>1 Rel. 17 unified TCI states for the PCell or the PSCell and the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in respective CORESETs in the carrier j, and receives PDSCH (e.g., the PDSCH scheduled by the PDCCH in the respective CORESETs in the carrier j) and aperiodic CSI-RS in a resource from a CSI-RS resource set configured in the carrier j with same indicated TCI state(s) as for the PDCCH and PDSCH in the carrier j, using the same antenna port quasi co-location parameters as the ones associated with the corresponding index qx_new, if any; and (2) transmits PUCCH, PUSCH (e.g., the PUCCH and the PUSCH associated with the PDCCH in the respective CORESETs in the carrier j) and SRS configured in the carrier j with same indicated TCI state(s) as for the PUCCH and the PUSCH in the carrier j using a same spatial domain filter as for the last PRACH transmission, and a power setting associated with the second Rel. 17 unified TCI states for carrier j with q_u=0, q_d=qx_new, and closed loop index 1=0 or 1.

In such examples, X could correspond to 28, and the subcarrier spacing (SCS) for the X=28 symbols could correspond to one or more of following examples.

In one example, the smallest of the SCS configurations of the active DL BWP(s) for the PDCCH reception, e.g., in the respective CORESETs in the self/serving carrier, and of the active DL BWP(s) of the self/serving carrier.

In one example, the smallest of the SCS configurations of the active DL BWP(s) for the PDCCH reception, e.g., in the respective CORESETs in the carrier j, and of the active DL BWP(s) of the carrier j.

In one example, the smallest of the SCS configurations of the active DL BWP(s) for the PDCCH reception, e.g., in the respective CORESETs in the self/serving carrier and the carrier j, and of the active DL BWP(s) of the self/serving carrier and the carrier j.

In one example, the smallest of the SCS configurations of the active DL BWP(s) for the PDCCH reception, e.g., in the respective CORESETs in all carriers including the self/ serving carrier, and of the active DL BWP(s) of all carriers including the self/serving carrier.

In one example, the smallest of the SCS configurations of the active DL BWP(s) for the PDCCH reception, e.g., in the respective CORESETs in all carriers excluding the self/serving carrier, and of the active DL BWP(s) of all carriers excluding the self/serving carrier.

In one example, the smallest of the SCS configurations of all the signal(s)/channels configured in the self/serving carrier sharing the same indicated first Rel. 17 TCI states for the self/serving carrier.

In one example, the smallest of the SCS configurations of all the signal(s)/channels configured in the self/serving carrier sharing the same indicated second Rel. 17 TCI states for the self/serving carrier.

In one example, the smallest of the SCS configurations of all the signal(s)/channels configured in the carrier j sharing the same indicated first Rel. 17 TCI states for the carrier j.

In one example, the smallest of the SCS configurations of all the signal(s)/channels configured in the carrier j sharing the same indicated second Rel. 17 TCI states for the carrier j.

In one example, the smallest of the SCS configurations of all the signal(s)/channels configured in the self/serving carrier sharing the same indicated first (or second) Rel. 17 TCI states for the self/serving carrier and the SCS configurations of all the signal(s)/channels configured in the carrier j sharing the same indicated first (or second) Rel. 17 TCI states for the carrier j.

In one example, the smallest of the SCS configurations of all the signal(s)/channels configured in the self/serving carrier sharing the same indicated first (or second) Rel. 17 TCI states for the self/serving carrier and the SCS configurations of all the signal(s)/channels configured in the carrier j sharing the same indicated second (or first) Rel. 17 TCI states for the carrier j.

In one example, the smallest of the SCS configurations of all the signal(s)/channels configured in all carriers including the self/serving carrier sharing the same indicated first (or second) Rel. 17 TCI states for respective carriers.

In one example, the smallest of the SCS configurations of all the signal(s)/channels configured in all carriers excluding the self/serving carrier sharing the same indicated first (or second) Rel. 17 TCI states for respective carriers.

In one example, if a UE is provided in the self/serving carrier via MAC CE or DCI (e.g., DCI format 1_1 or 1_2 with or without DL assignment) through TCI-State_r17 N>1 or M>1 Rel. 17 unified TCI states, after X symbols from a last symbol of a PDCCH reception with a DCI format scheduling a PUSCH transmission with a same HARQ process number as for the transmission of the first PUSCH MAC CE and having a toggled NDI field value, the UE: (1) monitors PDCCH in respective CORESETs in the carrier j, and receives PDSCH (e.g., the PDSCH scheduled by the PDCCH in the respective CORESETs in the carrier j) and aperiodic CSI-RS in a resource from a CSI-RS resource set configured in the carrier j with same indicated TCI state(s) as for the PDCCH and PDSCH in the carrier j, using the same antenna port quasi co-location parameters as the ones associated with the corresponding index qx_new, if any; and (2) transmits PUCCH, PUSCH (e.g., the PUCCH and the PUSCH associated with the PDCCH in the respective CORESETs in the carrier j) and SRS configured in the carrier j with same indicated TCI state(s) as for the PUCCH and the PUSCH in the carrier j using a same spatial domain filter as the one corresponding to qx_new, and a power setting associated with the second Rel. 17 unified TCI states for carrier j with q_u=0, q_d=qx_new, and closed loop index 1=0 or 1.

In such examples, X could correspond to 28, and the subcarrier spacing (SCS) for the X=28 symbols could correspond to one or more of following examples.

In one example, the smallest of the SCS configurations of the active DL BWP(s) for the PDCCH reception, e.g., in the respective CORESETs in the self/serving carrier, and of the active DL BWP(s) of the self/serving carrier.

In one example, the smallest of the SCS configurations of the active DL BWP(s) for the PDCCH reception, e.g., in the respective CORESETs in the carrier j, and of the active DL BWP(s) of the carrier j.

In one example, the smallest of the SCS configurations of the active DL BWP(s) for the PDCCH reception, e.g., in the respective CORESETs in the self/serving carrier and the carrier j, and of the active DL BWP(s) of the self/serving carrier and the carrier j.

In one example, the smallest of the SCS configurations of the active DL BWP(s) for the PDCCH reception, e.g., in the respective CORESETs in all carriers including the self/serving carrier, and of the active DL BWP(s) of all carriers including the self/serving carrier.

In one example, the smallest of the SCS configurations of the active DL BWP(s) for the PDCCH reception, e.g., in the respective CORESETs in all carriers excluding the self/serving carrier, and of the active DL BWP(s) of all carriers excluding the self/serving carrier.

In one example, the smallest of the SCS configurations of all the signal(s)/channels configured in the self/serving carrier sharing the same indicated first Rel. 17 TCI states for the self/serving carrier.

In one example, the smallest of the SCS configurations of all the signal(s)/channels configured in the self/serving carrier sharing the same indicated second Rel. 17 TCI states for the self/serving carrier.

In one example, the smallest of the SCS configurations of all the signal(s)/channels configured in the carrier j sharing the same indicated first Rel. 17 TCI states for the carrier j.

In one example, the smallest of the SCS configurations of all the signal(s)/channels configured in the carrier j sharing the same indicated second Rel. 17 TCI states for the carrier j.

In one example, the smallest of the SCS configurations of all the signal(s)/channels configured in the self/serving carrier sharing the same indicated first (or second) Rel. 17 TCI states for the self/serving carrier and the SCS configurations of all the signal(s)/channels configured in the carrier j sharing the same indicated first (or second) Rel. 17 TCI states for the carrier j.

In one example, the smallest of the SCS configurations of all the signal(s)/channels configured in the self/serving carrier sharing the same indicated first (or second) Rel. 17 TCI states for the self/serving carrier and the SCS configurations of all the signal(s)/channels configured in the carrier j sharing the same indicated second (or first) Rel. 17 TCI states for the carrier j.

In one example, the smallest of the SCS configurations of all the signal(s)/channels configured in all carriers including the self/serving carrier sharing the same indicated first (or second) Rel. 17 TCI states for respective carriers.

In one example, the smallest of the SCS configurations of all the signal(s)/channels configured in all carriers excluding the self/serving carrier sharing the same indicated first (or second) Rel. 17 TCI states for respective carriers.

In one example, if a UE is provided in the self/serving carrier via MAC CE or DCI (e.g., DCI format 1_1 or 1_2 with or without DL assignment) through TCI-State_r17 N>1 or M>1 Rel. 17 unified TCI states for the PCell or the PSCell, after X symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in respective Type-1 CORESETs in the carrier j, and receives PDSCH (e.g., the PDSCH scheduled by the PDCCH in the respective Type-1 CORESETs in the carrier j) and aperiodic CSI-RS in a resource from a CSI-RS resource set configured in the carrier j with same indicated TCI state(s) as for the PDCCH and PDSCH in the carrier j, using the same antenna port quasi co-location parameters as the ones associated with the corresponding index qx_new, if any; and (2) transmits PUCCH, PUSCH (e.g., the PUCCH and the PUSCH associated with the PDCCH in the respective Type-1 CORESETs in the carrier j) and SRS configured in the carrier j with same indicated TCI state(s) as for the PUCCH and the PUSCH in the carrier j using a same spatial domain filter as for the last PRACH transmission, and a power setting associated with the second Rel. 17 unified TCI states for carrier j with q_u=0, q_d=qx_new, and closed loop index 1=0 or 1.

In such examples, X could correspond to 28, and the subcarrier spacing (SCS) for the X=28 symbols could correspond to one or more of following examples.

In one example, the smallest of the SCS configurations of the active DL BWP(s) for the PDCCH reception, e.g., in the respective CORESETs in the self/serving carrier, and of the active DL BWP(s) of the self/serving carrier.

In one example, the smallest of the SCS configurations of the active DL BWP(s) for the PDCCH reception, e.g., in the respective CORESETs in the carrier j, and of the active DL BWP(s) of the carrier j.

In one example, the smallest of the SCS configurations of the active DL BWP(s) for the PDCCH reception, e.g., in the respective CORESETs in the self/serving carrier and the carrier j, and of the active DL BWP(s) of the self/serving carrier and the carrier j.

In one example, the smallest of the SCS configurations of the active DL BWP(s) for the PDCCH reception, e.g., in the respective CORESETs in all carriers including the self/serving carrier, and of the active DL BWP(s) of all carriers including the self/serving carrier.

In one example, the smallest of the SCS configurations of the active DL BWP(s) for the PDCCH reception, e.g., in the respective CORESETs in all carriers excluding the self/serving carrier, and of the active DL BWP(s) of all carriers excluding the self/serving carrier.

In one example, the smallest of the SCS configurations of all the signal(s)/channels configured in the self/serving carrier sharing the same indicated first Rel. 17 TCI states for the self/serving carrier.

In one example, the smallest of the SCS configurations of all the signal(s)/channels configured in the self/serving carrier sharing the same indicated second Rel. 17 TCI states for the self/serving carrier.

In one example, the smallest of the SCS configurations of all the signal(s)/channels configured in the carrier j sharing the same indicated first Rel. 17 TCI states for the carrier j.

In one example, the smallest of the SCS configurations of all the signal(s)/channels configured in the carrier j sharing the same indicated second Rel. 17 TCI states for the carrier j.

In one example, the smallest of the SCS configurations of all the signal(s)/channels configured in the self/serving carrier sharing the same indicated first (or second) Rel. 17 TCI states for the self/serving carrier and the SCS configurations of all the signal(s)/channels configured in the carrier j sharing the same indicated first (or second) Rel. 17 TCI states for the carrier j.

In one example, the smallest of the SCS configurations of all the signal(s)/channels configured in the self/serving carrier sharing the same indicated first (or second) Rel. 17 TCI states for the self/serving carrier and the SCS configurations of all the signal(s)/channels configured in the carrier j sharing the same indicated second (or first) Rel. 17 TCI states for the carrier j.

In one example, the smallest of the SCS configurations of all the signal(s)/channels configured in all carriers including the self/serving carrier sharing the same indicated first (or second) Rel. 17 TCI states for respective carriers.

In one example, the smallest of the SCS configurations of all the signal(s)/channels configured in all carriers excluding the self/serving carrier sharing the same indicated first (or second) Rel. 17 TCI states for respective carriers.

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives an activation/update of one or more first Rel. 17 unified TCI states for carrier j or one or more second Rel. 17 unified TCI states for carrier j via MAC CE or DCI (e.g., DCI format 1_1 or 1_2 with or without DL assignment) based signalling for unified TCI state indication received in the self/serving carrier.

In one example, if a UE is provided in the self/serving carrier via MAC CE or DCI (e.g., DCI format 1_1 or 1_2 with or without DL assignment) through TCI-State_r17 N>1 or M>1 Rel. 17 unified TCI states for the PCell or the PSCell and the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in respective Type-1 CORESETs in the carrier j, and receives PDSCH (e.g., the PDSCH scheduled by the PDCCH in the respective Type-1 CORESETs in the carrier j) and aperiodic CSI-RS in a resource from a CSI-RS resource set configured in the carrier j with same indicated TCI state(s) as for the PDCCH and PDSCH in the carrier j, using the same antenna port quasi co-location parameters as the ones associated with the corresponding index qx_new, if any; (2) transmits PUCCH, PUSCH (e.g., the PUCCH and the PUSCH associated with the PDCCH in the respective Type-1 CORESETs in the carrier j) and SRS configured in the carrier j with same indicated TCI state(s) as for the PUCCH and the PUSCH in the carrier j using a same spatial domain filter as for the last PRACH transmission, and a power setting associated with the second Rel. 17 unified TCI states for carrier j with q_u=0, q_d=qx_new, and closed loop index 1=0 or 1.

In such examples, X could correspond to 28, and the subcarrier spacing (SCS) for the X=28 symbols could correspond to one or more of following examples.

In one example, the smallest of the SCS configurations of the active DL BWP(s) for the PDCCH reception, e.g., in the respective CORESETs in the self/serving carrier, and of the active DL BWP(s) of the self/serving carrier.

In one example, the smallest of the SCS configurations of the active DL BWP(s) for the PDCCH reception, e.g., in the respective CORESETs in the carrier j, and of the active DL BWP(s) of the carrier j.

In one example, the smallest of the SCS configurations of the active DL BWP(s) for the PDCCH reception, e.g., in the respective CORESETs in the self/serving carrier and the carrier j, and of the active DL BWP(s) of the self/serving carrier and the carrier j.

In one example, the smallest of the SCS configurations of the active DL BWP(s) for the PDCCH reception, e.g., in the respective CORESETs in all carriers including the self/serving carrier, and of the active DL BWP(s) of all carriers including the self/serving carrier.

In one example, the smallest of the SCS configurations of the active DL BWP(s) for the PDCCH reception, e.g., in the respective CORESETs in all carriers excluding the self/serving carrier, and of the active DL BWP(s) of all carriers excluding the self/serving carrier.

In one example, the smallest of the SCS configurations of all the signal(s)/channels configured in the self/serving carrier sharing the same indicated first Rel. 17 TCI states for the self/serving carrier.

In one example, the smallest of the SCS configurations of all the signal(s)/channels configured in the self/serving carrier sharing the same indicated second Rel. 17 TCI states for the self/serving carrier.

In one example, the smallest of the SCS configurations of all the signal(s)/channels configured in the carrier j sharing the same indicated first Rel. 17 TCI states for the carrier j.

In one example, the smallest of the SCS configurations of all the signal(s)/channels configured in the carrier j sharing the same indicated second Rel. 17 TCI states for the carrier j.

In one example, the smallest of the SCS configurations of all the signal(s)/channels configured in the self/serving carrier sharing the same indicated first (or second) Rel. 17 TCI states for the self/serving carrier and the SCS configurations of all the signal(s)/channels configured in the carrier j sharing the same indicated first (or second) Rel. 17 TCI states for the carrier j.

In one example, the smallest of the SCS configurations of all the signal(s)/channels configured in the self/serving carrier sharing the same indicated first (or second) Rel. 17 TCI states for the self/serving carrier and the SCS configurations of all the signal(s)/channels configured in the carrier j sharing the same indicated second (or first) Rel. 17 TCI states for the carrier j.

In one example, the smallest of the SCS configurations of all the signal(s)/channels configured in all carriers including the self/serving carrier sharing the same indicated first (or second) Rel. 17 TCI states for respective carriers.

In one example, the smallest of the SCS configurations of all the signal(s)/channels configured in all carriers excluding the self/serving carrier sharing the same indicated first (or second) Rel. 17 TCI states for respective carriers.

In one example, if a UE is provided in the self/serving carrier via MAC CE or DCI (e.g., DCI format 1_1 or 1_2 with or without DL assignment) through TCI-State_r17 N>1 or M>1 Rel. 17 unified TCI states, after X symbols from a last symbol of a PDCCH reception with a DCI format scheduling a PUSCH transmission with a same HARQ process number as for the transmission of the first PUSCH MAC CE and having a toggled NDI field value, the UE: (1) monitors PDCCH in respective Type-1 CORESETs in the carrier j, and receives PDSCH (e.g., the PDSCH scheduled by the PDCCH in the respective Type-1 CORESETs in the carrier j) and aperiodic CSI-RS in a resource from a CSI-RS resource set configured in the carrier j with same indicated TCI state(s) as for the PDCCH and PDSCH in the carrier j, using the same antenna port quasi co-location parameters as the ones associated with the corresponding index qx_new, if any; and (2) transmits PUCCH, PUSCH (e.g., the PUCCH and the PUSCH associated with the PDCCH in the respective Type-1 CORESETs in the carrier j) and SRS configured in the carrier j with same indicated TCI state(s) as for the PUCCH and the PUSCH in the carrier j using a same spatial domain filter as the one corresponding to qx_new, and a power setting associated with the second Rel. 17 unified TCI states for carrier j with q_u=0, q_d=qx_new, and closed loop index 1=0 or 1, where X could correspond to 28, and the subcarrier spacing (SCS) for the X=28 symbols could correspond to one or more of following examples.

In one example, the smallest of the SCS configurations of the active DL BWP(s) for the PDCCH reception, e.g., in the respective CORESETs in the self/serving carrier, and of the active DL BWP(s) of the self/serving carrier.

In one example, the smallest of the SCS configurations of the active DL BWP(s) for the PDCCH reception, e.g., in the respective CORESETs in the carrier j, and of the active DL BWP(s) of the carrier j.

In one example, the smallest of the SCS configurations of the active DL BWP(s) for the PDCCH reception, e.g., in the respective CORESETs in the self/serving carrier and the carrier j, and of the active DL BWP(s) of the self/serving carrier and the carrier j.

In one example, the smallest of the SCS configurations of the active DL BWP(s) for the PDCCH reception, e.g., in the respective CORESETs in all carriers including the self/serving carrier, and of the active DL BWP(s) of all carriers including the self/serving carrier.

In one example, the smallest of the SCS configurations of the active DL BWP(s) for the PDCCH reception, e.g., in the respective CORESETs in all carriers excluding the self/serving carrier, and of the active DL BWP(s) of all carriers excluding the self/serving carrier.

In one example, the smallest of the SCS configurations of all the signal(s)/channels configured in the self/serving carrier sharing the same indicated first Rel. 17 TCI states for the self/serving carrier.

In one example, the smallest of the SCS configurations of all the signal(s)/channels configured in the self/serving carrier sharing the same indicated second Rel. 17 TCI states for the self/serving carrier.

In one example, the smallest of the SCS configurations of all the signal(s)/channels configured in the carrier j sharing the same indicated first Rel. 17 TCI states for the carrier j.

In one example, the smallest of the SCS configurations of all the signal(s)/channels configured in the carrier j sharing the same indicated second Rel. 17 TCI states for the carrier j.

In one example, the smallest of the SCS configurations of all the signal(s)/channels configured in the self/serving carrier sharing the same indicated first (or second) Rel. 17 TCI states for the self/serving carrier and the SCS configurations of all the signal(s)/channels configured in the carrier j sharing the same indicated first (or second) Rel. 17 TCI states for the carrier j.

In one example, the smallest of the SCS configurations of all the signal(s)/channels configured in the self/serving carrier sharing the same indicated first (or second) Rel. 17 TCI states for the self/serving carrier and the SCS configurations of all the signal(s)/channels configured in the carrier j sharing the same indicated second (or first) Rel. 17 TCI states for the carrier j.

In one example, the smallest of the SCS configurations of all the signal(s)/channels configured in all carriers including the self/serving carrier sharing the same indicated first (or second) Rel. 17 TCI states for respective carriers.

In one example, the smallest of the SCS configurations of all the signal(s)/channels configured in all carriers excluding the self/serving carrier sharing the same indicated first (or second) Rel. 17 TCI states for respective carriers.

Figure 13:
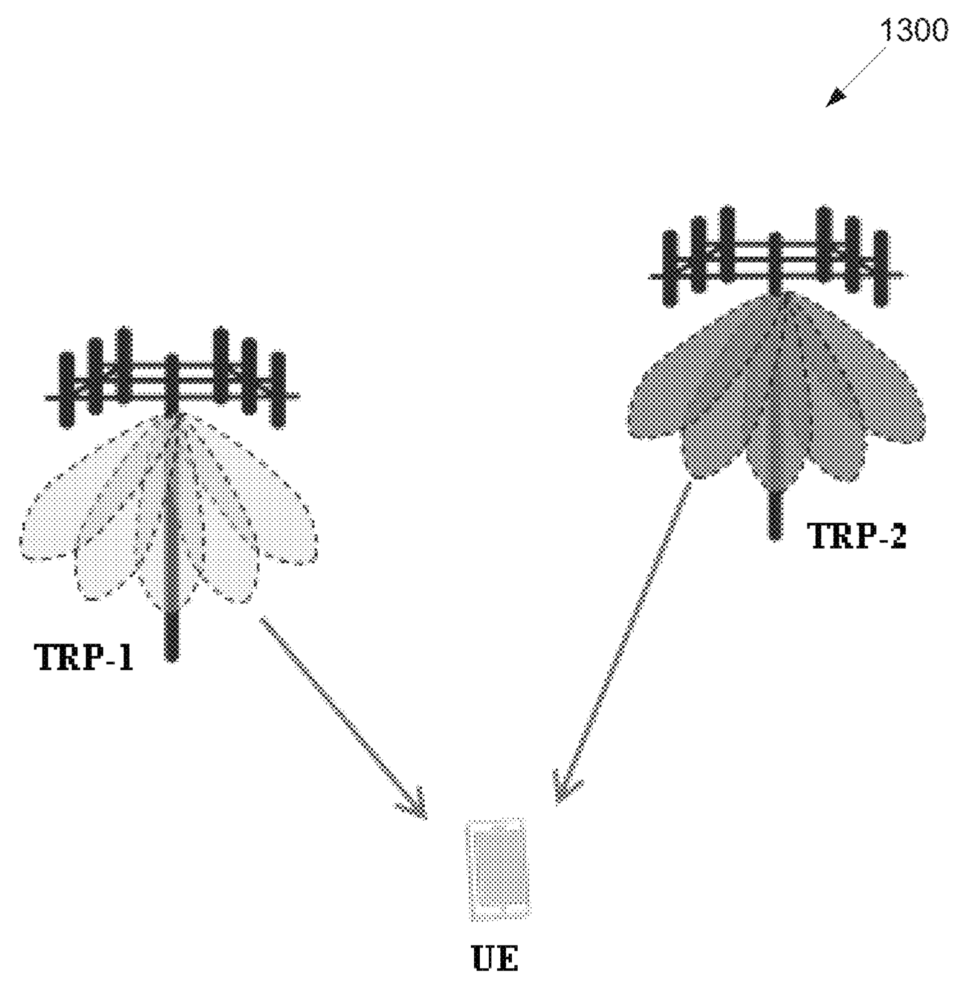
FIG. 13 illustrates an example of multiple TRP system according to embodiments of the present disclosure.

FIG. 13 illustrates an example of multiple TRP system 1300 according to embodiments of the present disclosure. The embodiment of the multiple TRP system 1300 illustrated in FIG. 13 is for illustration only.

In a multiple TRP system depicted in FIG. 13, the UE could simultaneously receive from multiple physically non-co-located TRPs various channels/RSs such as PDCCHs and/or PDSCHs using either a single receive (RX) panel or multiple RX panels. In this disclosure, a RX panel could correspond to a set of RX antenna elements/ports at the UE, a set of measurement RS resources such as SRS resources, a spatial domain RX filter or etc. Further, a TRP in the multi-TRP system can represent a collection of measurement antenna ports, measurement RS resources and/or CORESETs.

For example, a TRP could be associated with one or more of: (1) a plurality of CSI-RS resources; (2) a plurality of CRIs (CSI-RS resource indices/indicators); (3) a measurement RS resource set, for example, a CSI-RS resource set along with its indicator; (4) a plurality of CORESETs associated with a CORESETPoolIndex; and (5) a plurality of CORESETs associated with a TRP-specific index/indicator/identity.

A cell/TRP could be a non-serving cell/TRP. In this disclosure, the non-serving cell(s) or the non-serving cell TRP(s) could have/broadcast different physical cell IDs (PCIs) and/or other higher layer signaling index values from that of the serving cell or the serving cell TRP (i.e., the serving cell PCI). In one example, the serving cell or the serving cell TRP could be associated with the serving cell ID (SCI) and/or the serving cell PCI. That is, for the inter-cell operation considered in the present disclosure, different cells/TRPs could broadcast different PCIs and/or one or more cells/TRPs (referred to/defined as non-serving cells/TRPs in the present disclosure) could broadcast different PCIs from that of the serving cell/TRP (i.e., the serving cell PCI) and/or one or more cells/TRPs are not associated with valid SCI (e.g., provided by the higher layer parameter ServCellIndex). In the present disclosure, a non-serving cell PCI can also be referred to as an additional PCI, another PCI or a different PCI (with respect to the serving cell PCI).

In addition to simultaneously reception or coherent/non-coherent joint transmission, a UE equipped with multiple antenna panels could also simultaneously transmit to different TRPs various channels/signals. For this case, the UE could be provided by the network multiple spatial relations for setting/configuring multiple spatial-domain transmit filters each associated with at least one panel. The UE could use the multiple spatial-domain transmit filters to simultaneously transmit to different TRPs PDCCHs, PDSCHs and etc. via multiple panels.

Under the Rel. 17 unified TCI framework, wherein a UE could be provided by the network, e.g., via MAC CE or DCI (e.g., DCI format 1_1 or 1_2 with or without DL assignment) based signaling through higher layer parameter TCI-State_r17, one or more separate/joint DL or UL TCI state for various DL or UL channels/signals such as UE-dedicated reception on PDSCH/PDCCH or dynamic-grant/configured-grant based PUSCH and all of dedicated PUCCH resources, various design aspects related to beam indication for simultaneous multi-panel transmission need to be specified.

The present disclosure provides various design aspects related to beam indication enhancements targeting at facilitating simultaneous multi-panel transmission under the Rel. 17 unified TCI framework.

As described in the U.S. patent application Ser. No. 17/584,239 incorporated as a reference in its entirety, a unified TCI framework could indicate/include N>1 DL TCI states and/or M>1 UL TCI states, wherein the indicated TCI state could be at least one of: (1) a DL TCI state and/or its corresponding/associated TCI state ID; (2) an UL TCI state and/or its corresponding/associated TCI state ID; (3) a joint DL and UL TCI state and/or its corresponding/associated TCI state ID; and (4) separate DL TCI state and UL TCI state and/or their corresponding/associated TCI state ID(s).

There could be various design options/channels to indicate to the UE a beam (i.e., a TCI state) for the transmission/reception of a PDCCH or a PDSCH. As described in the U.S. patent application Ser. No. 17/584,239 incorporated as a reference in its entirety, following examples are provided.

In one example, a MAC CE could be used to indicate to the UE a beam (i.e., a TCI state and/or a TCI state ID) for the transmission/reception of a PDCCH or a PDSCH.

In another example, a DCI could be used to indicate to the UE a beam (i.e., a TCI state and/or a TCI state ID) for the transmission/reception of a PDCCH or a PDSCH.

For example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.

For another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.

Yet for another example, a custom/purpose designed DCI format could be used to indicate to the UE a beam (i.e., a TCI state and/or a TCI state ID) for the transmission/reception of a PDCCH or a PDSCH.

Rel-17 introduced the unified TCI framework, where a unified or master or main TCI state is signaled to the UE. The unified or master or main TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state can be used at least for UE-dedicated DL channels; and (3) in case of separate TCI state indication, wherein different beams are used for DL and UL channels, a UL TCI state can be used at least for UE-dedicated UL channels.

The unified (master or main) TCI state is TCI state of UE-dedicated reception on PDSCH/PDCCH or dynamic-grant/configured-grant based PUSCH and all of dedicated PUCCH resources. As discussed above, a UE could be provided by the network, e.g., via MAC CE or DCI (e.g., DCI format 1_1 or 1_2 with or without DL assignment) based signaling through the higher layer parameter TCI-State_r17, M>1 joint DL and UL Rel. 17 unified TCI states or M>1 separate UL Rel. 17 unified TCI states or a first combination of M>1 joint DL and UL Rel. 17 unified TCI states and separate UL Rel. 17 unified TCI states or N>1 separate DL Rel. 17 unified TCI states or a second combination of N>1 joint DL and UL Rel. 17 unified TCI states and separate DL Rel. 17 unified TCI states or a third combination of N>1 joint DL and UL Rel. 17 unified TCI states, separate DL Rel. 17 unified TCI states and separate UL Rel. 17 unified TCI for UE-dedicated reception on PDSCH/PDCCH or dynamic-grant/configured-grant based PUSCH and all of dedicated PUCCH resources.

For instance, the DCI format for unified TCI state/beam indication (e.g., DCI format 1_1 or 1_2 with or without DL assignment) could include a "transmission configuration indication" field containing one or more codepoints activated by a MAC CE activation command from a set/pool of codepoints. For this case, each codepoint could indicate M>1 joint DL and UL Rel. 17 unified TCI states or M>1 separate UL Rel. 17 unified TCI states or a first combination of M>1 joint DL and UL Rel. 17 unified TCI states and separate UL Rel. 17 unified TCI states or N>1 separate DL Rel. 17 unified TCI states or a second combination of N>1 joint DL and UL Rel. 17 unified TCI states and separate DL Rel. 17 unified TCI states or a third combination of N>1 joint DL and UL Rel. 17 unified TCI states, separate DL Rel. 17 unified TCI states and separate UL Rel. 17 unified TCI for UE-dedicated reception on PDSCH/PDCCH or dynamic-grant/configured-grant based PUSCH and all of dedicated PUCCH resources.

In the present disclosure, the indicated Rel. 17 unified TCI state n or m ($n \in \{1, \ldots, N\}$ and $m \in \{1, \ldots, M\}$) could correspond to the n-th joint DL and UL TCI state or the m-th separate UL TCI state or the n-th separate DL TCI state or the m-th TCI state in the first combination of TCI states or the n-th TCI state in the second combination of TCI states or the n-th TCI state in the third combination of TCI states or the joint DL and UL TCI state with the n-th lowest or highest TCI state ID or the separate UL TCI state with the m-th lowest or highest TCI state ID or the separate DL TCI state with the n-th lowest or highest TCI state ID or the TCI state in the first combination of TCI states with the m-th lowest or highest TCI state ID or the TCI state in the second combination of TCI states with the n-th lowest or highest TCI state ID or the TCI state in the third combination of TCI states with the n-th lowest or highest TCI state ID, among the N>1 or M>1 Rel. 17 unified TCI states, indicated via the MAC CE or DCI (e.g., DCI format 1_1 or 1_2 with or without DL assignment) based signalling.

In the present disclosure, various SRS resource configurations/settings are considered for simultaneous multi-panel transmission. The UE could be indicated by the network, e.g., via higher layer parameter multiPanelTX, whether or not simultaneous multi-panel transmission may be enabled at the UE; this indication could be via RRC, MAC CE, or DCI based signaling. For instance, the higher layer parameter multiPanelTX could be configured in corresponding SRS resource configuration/setting, e.g., in higher layer parameters SRS-Config, SRS-ResourceSet or SRS-Resource, or in corresponding CSI resource/reporting setting, e.g., in higher layer parameters CSI-ResourceConfig or CSI-ReportConfig, or in corresponding TCI state field, e.g., in higher layer parameter TCI-State or TCI-State_r17. If the higher layer parameter multiPanelTX is set to "enabled," the UE could use multiple panels/spatial-domain transmit filters to simultaneously transmit to the network various channels/signals.

Alternatively, the UE could autonomously determine whether to use multiple panels/spatial-domain transmit filters to simultaneously transmit to the network various channels/signals; the UE could indicate to the network, e.g., via CSI/UCI or PUSCH MAC CE, whether the UE may use multiple panels/spatial-domain transmit filters to simultaneously transmit to the network/TRPs. If simultaneous multi-panel transmission is configured/enabled, e.g., the higher layer parameter multiPanelTX is set to "enabled" or the UE autonomously decides to use multiple panels/spatial-domain transmit filters to simultaneously transmit to the network, In one example, the number of SRS resource configurations/settings configured/provided by the network is P>1 (e.g., P=2 for two antenna panels equipped at the UE) with each configured SRS resource configuration/setting associated with at least one antenna panel at the UE. A SRS resource configuration/setting provided by the higher layer parameter SRS-Config could be configured with "useIndicatedr17TCIState." If "useIndicatedr17TCIState" is configured/enabled, the SRS resource(s) configured in the SRS resource configuration/setting provided by SRS-Config could be associated with the indicated Rel. 17 unified TCI state (e.g., a joint DL and UL TCI state, a separate DL TCI state or a separate UL TCI state). That is, if "useIndicatedr17TCIState" is configured/enabled, the spatial filter(s) for transmitting the SRS resource(s) configured in the SRS resource configuration/setting provided by SRS-Config could be spatially related to reference signals provided in the indicated Rel. 17 unified TCI state.

When the UE is provided by the network, e.g., via MAC CE or DCI (e.g., DCI format 1_1 or 1_2 with or without DL assignment) based signaling through the higher layer parameter TCI-State_r17, M>1 or N>1 Rel. 17 unified TCI states, in addition to "useIndicatedr17TCIState," a SRS resource configuration/setting provided by the higher layer parameter SRS-Config could also be configured with a TCI state ID/index for an indicated Rel. 17 unified TCI state. For instance, in addition to "useIndicatedr17TCIState," if a SRS resource configuration/setting provided by the higher layer parameter SRS-Config is also configured with the TCI state ID/index for the indicated TCI state n (or m), where $n \in \{1, \ldots, N\}$ and $m \in \{1, \ldots, M\}$, the spatial filter(s) for transmitting the SRS resource(s) configured in the SRS resource configuration/setting provided by SRS-Config could be spatially related to reference signals provided in the indicated Rel. 17 unified TCI state n (or m).

In another example, the number of SRS resource sets configured/provided by the network in a SRS resource setting/configuration is S>1 (e.g., S=2 for two antenna panels equipped at the UE) with each configured SRS resource set associated with at least one antenna panel at the UE. A SRS resource set provided by the higher layer parameter SRS-ResourceSet could be configured with "useIndicatedr17TCIState." If "useIndicatedr17TCIState" is configured/enabled, the SRS resource(s) configured in the SRS resource set provided by SRS-ResourceSet could be associated with the indicated Rel. 17 unified TCI state (e.g., a joint DL and UL TCI state, a separate DL TCI state or a separate UL TCI state). That is, if "useIndicatedr17TCIState" is configured/enabled, the spatial filter(s) for transmitting the SRS resource(s) configured in the SRS resource set provided by SRS-ResourceSet could be spatially related to reference signals provided in the indicated Rel. 17 unified TCI state. When the UE is provided by the network, e.g., via MAC CE or DCI (e.g., DCI format 1_1 or 1_2 with or without DL assignment) based signaling through the higher layer parameter TCI-State_r17, M>1 or N>1 Rel. 17 unified TCI states, in addition to "useIndicatedr17TCIState," a SRS resource set provided by the higher layer parameter SRS-ResourceSet could also be configured with a TCI state ID/index for an indicated Rel. 17 unified TCI state.

For instance, in addition to "useIndicatedr17TCIState," if a SRS resource set provided by the higher layer parameter SRS-ResourceSet is also configured with the TCI state ID/index for the indicated TCI state n (or m), where $n \in \{1, \ldots, N\}$ and $m \in \{1, \ldots, M\}$, the spatial filter(s) for transmitting the SRS resource(s) configured in the SRS resource set provided by SRS-ResourceSet could be spatially related to reference signals provided in the indicated Rel. 17 unified TCI state n (or m).

In yet another example, one or more SRS resource configurations provided by higher layer parameter SRS-Resource in a SRS resource set could be configured in a SRS resource group. The number of SRS resource groups configured/provided by the network in a SRS resource set is K>1 (e.g., K=2 for two antenna panels equipped at the UE) with each configured SRS resource group associated with at least one antenna panel at the UE. Specifically, for K=2, the two SRS resource groups contain k1 and k2 SRS resource indexes respectively with k1+k2=K. For example, a SRS resource group in a SRS resource set containing one or more SRS resource indexes in the same SRS resource set could be provided by a higher layer parameter SRS-ResourceGroup. Different K>1 SRS resource groups provided by SRS-ResourceGroup configured in the SRS resource set could have different SRS resource group IDs/indexes (e.g., provided by SRS-ResourceGroupID). A SRS resource group, e.g., provided by the higher layer parameter SRS-ResourceGroup, could be configured with "useIndicatedr17TCIState."

If "useIndicatedr17TCIState" is configured/enabled, the SRS resource(s) configured in the SRS resource group provided by SRS-ResourceGroup could be associated with the indicated Rel. 17 unified TCI state (e.g., a joint DL and UL TCI state, a separate DL TCI state or a separate UL TCI state). That is, if "useIndicatedr17TCIState" is configured/enabled, the spatial filter(s) for transmitting the SRS resource(s) configured in the SRS resource group provided by SRS-ResourceGroup could be spatially related to reference signals provided in the indicated Rel. 17 unified TCI state. When the UE is provided by the network, e.g., via MAC CE or DCI (e.g., DCI format 1_1 or 1_2 with or without DL assignment) based signaling through the higher layer parameter TCI-State_r17, M>1 or N>1 Rel. 17 unified TCI states, in addition to "useIndicatedr17TCIState," a SRS resource group provided by the higher layer parameter SRS-ResourceGroup could also be configured with a TCI state ID/index for an indicated Rel. 17 unified TCI state.

For instance, in addition to "useIndicatedr17TCIState," if a SRS resource group provided by the higher layer parameter SRS-ResourceGroup is also configured with the TCI state ID/index for the indicated TCI state n (or m), where $n \in \{1, \ldots, N\}$ and $m \in \{1, \ldots, M\}$, the spatial filter(s) for transmitting the SRS resource(s) configured in the SRS resource group provided by SRS-ResourceGroup could be spatially related to reference signals provided in the indicated Rel. 17 unified TCI state n (or m).

In yet another example, the number of SRS resources configured/provided by the network in a SRS resource set is R>1 (e.g., R=2 for two antenna panels equipped at the UE). A SRS resource provided by SRS-Resource in a SRS resource set could be configured with "useIndicatedr17TCIState." If "useIndicatedr17TCIState" is configured/enabled, the corresponding SRS resource provided by SRS-Resource in the SRS resource set could be associated with the indicated Rel. 17 unified TCI state (e.g., a joint DL and UL TCI state, a separate DL TCI state or a separate UL TCI state). That is, if "useIndicatedr17TCIState" is configured/enabled, the spatial filter for transmitting the corresponding SRS resource provided by SRS-Resource could be spatially related to reference signals provided in the indicated Rel. 17 unified TCI state.

When the UE is provided by the network, e.g., via MAC CE or DCI (e.g., DCI format 1_1 or 1_2 with or without DL assignment) based signaling through the higher layer parameter TCI-State_r17, M>1 or N>1 Rel. 17 unified TCI states, in addition to "useIndicatedr17TCIState," a SRS resource provided by the higher layer parameter SRS-Resource could also be configured with a TCI state ID/index for an indicated Rel. 17 unified TCI state. For instance, in addition to "useIndicatedr17TCIState," if a SRS resource provided by the higher layer parameter SRS-Resource is also configured with the TCI state ID/index for the indicated TCI state n (or m), where $n \in \{1, \ldots, N\}$ and $m \in \{1, \ldots, M\}$, the spatial filter for transmitting the SRS resource provided by SRS-Resource could be spatially related to reference signals provided in the indicated Rel. 17 unified TCI state n (or m). The SRS resources configured with the same TCI state ID/index for an indicated Rel. 17 unified TCI state could be associated with at least one antenna panel at the UE.

To support simultaneous multi-panel transmission, various design options of uplink beam indication are considered in the present disclosure.

In one embodiment, a UE could be provided/configured by the network, e.g., via MAC CE or DCI (e.g., DCI format 1_1 or 1_2 with or without DL assignment) based signaling through the higher layer parameter TCI-State_r17, G≥1 groups of Rel. 17 unified TCI states with each group indicating/containing T>1 Rel. 17 unified TCI states. For instance, the DCI format (e.g., DCI format 1_1 or 1_2 with or without DL assignment) for unified TCI state/beam indication could include a "transmission configuration indication" field containing one or more codepoints activated by a MAC CE activation command from a set/pool of codepoints.

For this case, each codepoint could indicate G≥1 groups of Rel. 17 unified TCI states with each group indicating/containing T>1 Rel. 17 unified TCI states. Alternatively, the DCI format (e.g., DCI format 1_1 or 1_2 with or without DL assignment) for unified TCI state/beam indication could include G≥1 "transmission configuration indication" fields each containing at least one codepoint activated by a MAC CE activation command from a set/pool of codepoints.

For this case, each codepoint could indicate a group of T>1 Rel. 17 unified TCI states. Furthermore, the T>1 Rel. 17 unified TCI states indicated in a group could correspond to T>1 joint DL and UL TCI states, T>1 separate UL TCI states or a combination of T>1 joint DL and UL TCI states and separate UL TCI states. The UE could use the same or different spatial filters determined according to the reference signals (e.g., the spatial filters are spatially related to the reference signals) provided in the T>1 indicated Rel. 17 unified TCI states in a same group to simultaneously transmit various uplink channels/signals such as PUCCHs, PUSCHs or SRSs to the network/TRPs. The UE could be provided by the network the values of G or T. If G≤Gmax or T≤Tmax, where Gmax represents the maximum number of groups of Rel. 17 unified TCI states that can be indicated and Tmax is the maximum number of Rel. 17 unified TCI states that can be indicated in a group, the UE could also be provided by the network the values of Gmax or Tmax. The G groups of indicated Rel. 17 unified TCI states could be ordered according to a performance metric from high to low (or from low to high), wherein the performance metric could be throughput, radio link quality or error rate, specific to a group.

For instance, the UE could assume that the spatial filter(s) determined according to the first group of T indicated Rel. 17 unified TCI states to simultaneously transmit uplink channels/signals may result in the highest (or lowest) performance metric, the spatial filter(s) determined according to the second group of T indicated Rel. 17 unified TCI states to simultaneously transmit uplink channels/signals may result in the second highest (or second lowest) performance metric, and so on, and the special filter(s) determined according to the last (or the G-th) group of T indicated Rel. 17 unified TCI states to simultaneously transmit uplink channels/signals may result in the lowest (or highest) performance metric.

The T>1 Rel. 17 unified TCI states indicated in a group could be associated to one or more SRS resources, which could be configured according to examples in the present disclosure.

In one example, wherein the number of SRS resource configurations/settings configured/provided by the network is P>1 (e.g., P=2 for two antenna panels equipped at the UE) with each configured SRS resource configuration/setting associated with at least one antenna panel at the UE, following examples can be provided.

In one example, the first indicated Rel. 17 unified TCI state or the indicated Rel. 17 unified TCI state with the lowest (or highest) TCI state ID/index in a group of T>1 Rel. 17 unified TCI states could be associated to the first SRS resource configuration/setting or the SRS resource configuration/setting with the lowest configuration ID/index in the P>1 SRS resource configurations/settings provided by SRS-Config, the second indicated Rel. 17 unified TCI state or the indicated Rel. 17 unified TCI state with the second lowest (or second highest) TCI state ID/index in the group of T>1 Rel. 17 unified TCI states could be associated to the second SRS resource configuration/setting or the SRS resource configuration/setting with the second lowest configuration ID/index in the P>1 SRS resource configurations/settings provided by SRS-Config, and so on, and the last (or the T-th) indicated Rel. 17 unified TCI state or the indicated Rel. 17 unified TCI state with the highest (or lowest) TCI state ID/index in the group of T>1 Rel. 17 unified TCI states could be associated to the last (or the P-th) SRS resource configuration/setting or the SRS resource configuration/setting with the highest configuration ID/index in the P>1 SRS resource configurations/settings provided by SRS-Config, where T could equal to P.

That is, the u-th indicated Rel. 17 unified TCI state or the indicated Rel. 17 unified TCI state u or the indicated Rel. 17 unified TCI state with the u-th lowest (or the u-th highest) TCI state ID/index in the group of T>1 Rel. 17 unified TCI states could be associated to the p-th SRS resource configuration/setting or the SRS resource configuration/setting with the p-th lowest configuration ID/index in the P>1 SRS resource configurations/settings provided by SRS-Config, where $u \in \{1, \ldots, T\}$, $p \in \{1, \ldots, P\}$ and T could equal to P. For T=2, P=2, the first indicated Rel. 17 unified TCI state or the indicated Rel. 17 unified TCI state with the lowest (or highest) TCI state ID/index in a group of T=2 Rel. 17 unified TCI states could be associated to the first SRS resource configuration/setting or the SRS resource configuration/setting with the lowest configuration ID/index in the P=2 SRS resource configurations/settings provided by SRS-Config, and the second indicated Rel. 17 unified TCI state or the indicated Rel. 17 unified TCI state with the highest (or lowest) TCI state ID/index in the group of T=2 Rel. 17 unified TCI states could be associated to the second SRS resource configuration/setting or the SRS resource configuration/setting with the highest configuration ID/index in the P=2 SRS resource configurations/settings provided by SRS-Config.

In another example, the UE could be indicated by the network the association/mapping between the T>1 Rel. 17 unified TCI states indicated in a group and the P>1 SRS resource configurations/settings provided by SRS-Config; this indication could be via RRC, MAC CE, or DCI based signaling. For example, the UE could receive from the network, e.g., via higher layer RRC, MAC CE, or DCI based signaling, a set of T>1 TCI state IDs/indexes each corresponding to an indicated Rel. 17 unified TCI state in a group. For this case, the p-th SRS resource configuration/setting or the SRS resource configuration/setting with the p-th lowest (or highest) configuration ID/index in the P>1 SRS resource configurations/settings provided by SRS-Config could be associated to the indicated Rel. 17 unified TCI state with the TCI state ID/index having the same value as the u-th entry in the set of T>1 TCI state IDs/indexes, where $u \in \{1, \ldots, T\}$, $p \in \{1, \ldots, P\}$ and T could equal to P. The set of T>1 TCI state IDs/indexes could be indicated in higher layer parameter BWP-UplinkDedicated or SRS-Config or the DCI format (e.g., DCI format 1_1 or 1_2 with or without DL assignment) that indicates the corresponding T>1 Rel. 17 unified TCI state(s) or one or more TCI fields (e.g., provided by "transmission configuration indication") in the DCI format (e.g., DCI format 1_1 or 1_2 with or without DL assignment) that indicates the corresponding T>1 Rel. 17 unified TCI state(s).

For another example, the UE could receive from the network, e.g., via higher layer RRC, MAC CE, or DCI based signaling, a set of P>1 SRS resource configuration/setting IDs/indexes each corresponding to a configured SRS resource configuration/setting in the P>1 SRS resource configurations/settings provided by SRS-Config. For this case, the u-th indicated Rel. 17 unified TCI state or the indicated Rel. 17 unified TCI state u or the indicated Rel. 17 unified TCI state with the u-th lowest (or the u-th highest) TCI state ID/index in the group of T>1 Rel. 17 unified TCI states could be associated to the SRS resource configuration/setting with the configuration ID/index having the same value as the p-th entry in the set of P>1 SRS resource configuration IDs/indexes, where $u \in \{1, \ldots, T\}$, $p \in \{1, \ldots, P\}$ and T could equal to P. The set of P>1 SRS resource configuration IDs/indexes could be indicated in higher layer parameter BWP-UplinkDedicated or SRS-Config or the DCI format (e.g., DCI format 1_1 or 1_2 with or without DL assignment) that indicates the corresponding T>1 Rel. 17 unified TCI state(s) or one or more TCI fields (e.g., provided by "transmission configuration indication") in the DCI format (e.g., DCI format 1_1 or 1_2 with or without DL assignment) that indicates the corresponding T>1 Rel. 17 unified TCI state(s).

In yet another example, the UE could be indicated by the network the association/mapping between the T>1 Rel. 17 unified TCI states indicated in a group and the P>1 SRS resource configurations/settings provided by SRS-Config; this indication could be via RRC, MAC CE, or DCI based signaling. For T=2, P=2, the UE could receive from the network, e.g., via higher layer RRC, MAC CE, or DCI based signaling, a one-bit flag indicator. For example, if the one-bit flag indicator is set to “1,” the first indicated Rel. 17 unified TCI state or the indicated Rel. 17 unified TCI state with the lowest (or highest) TCI state ID/index in a group of T=2 Rel. 17 unified TCI states could be associated to the first SRS resource configuration/setting or the SRS resource configuration/setting with the lowest configuration ID/index in the P=2 SRS resource configurations/settings provided by SRS-Config, and the second indicated Rel. 17 unified TCI state or the indicated Rel. 17 unified TCI state with the highest (or lowest) TCI state ID/index in the group of T=2 Rel. 17 unified TCI states could be associated to the second SRS resource configuration/setting or the SRS resource configuration/setting with the highest configuration ID/index in the P=2 SRS resource configurations/settings provided by SRS-Config, or vice versa.

If the one-bit flag indicator is set to “0,” the first indicated Rel. 17 unified TCI state or the indicated Rel. 17 unified TCI state with the lowest (or highest) TCI state ID/index in a group of T=2 Rel. 17 unified TCI states could be associated to the second SRS resource configuration/setting or the SRS resource configuration/setting with the highest configuration ID/index in the P=2 SRS resource configurations/settings provided by SRS-Config, and the second indicated Rel. 17 unified TCI state or the indicated Rel. 17 unified TCI state with the highest (or lowest) TCI state ID/index in the group of T=2 Rel. 17 unified TCI states could be associated to the first SRS resource configuration/setting or the SRS resource configuration/setting with the lowest configuration ID/index in the P=2 SRS resource configurations/settings provided by SRS-Config, or vice versa. The one-bit flag indicator could be indicated in higher layer parameter BWP-UplinkDedicated or SRS-Config or the DCI format (e.g., DCI format 1_1 or 1_2 with or without DL assignment) that indicates the corresponding T>1 Rel. 17 unified TCI state(s) or one or more TCI fields (e.g., provided by “transmission configuration indication”) in the DCI format (e.g., DCI format 1_1 or 1_2 with or without DL assignment) that indicates the corresponding T>1 Rel. 17 unified TCI state(s).

In yet another example, a SRS resource configuration ID/index (e.g., provided by SRS-ConfigId) could be indicated/included in an indicated Rel. 17 unified TCI state, e.g., in the corresponding higher layer parameter TCI-State_r17, from a group of T>1 Rel. 17 unified TCI states. For this case, the Rel. 17 unified TCI state is associated to the SRS resource configuration ID/index indicated therein, and therefore, the corresponding SRS resource configuration/setting provided by SRS-Config. Alternatively, a TCI state ID/index of an indicated Rel. 17 unified TCI state from a group of T>1 Rel. 17 unified TCI states could be indicated/included in a SRS resource configuration/setting, e.g., in the corresponding higher layer parameter SRS-Config, from P>1 configured SRS resource configurations/settings.

For this case, the SRS resource configuration/setting is associated to the TCI state ID/index indicated therein, and therefore, the corresponding indicated Rel. 17 unified TCI state. Optionally, an entity ID/index could be indicated/included in an indicated Rel. 17 unified TCI state, e.g., in the corresponding higher layer parameter TCI-State_r17, from a group of T>1 Rel. 17 unified TCI states, or in a SRS resource configuration/setting, e.g., in the corresponding higher layer parameter SRS-Config, from P>1 configured SRS resource configurations/settings. An indicated Rel. 17 unified TCI state is associated to a SRS resource configuration/setting if they are associated with a same entity ID/index. Here, an entity ID/index could be a one-bit flag indicator, a PCI value, a CORESETPoolIndex value, a TRP ID/index value, a CORESET ID/index value, and etc.

In one example, wherein the number of SRS resource sets configured/provided by the network is S>1 (e.g., S=2 for two antenna panels equipped at the UE) with each configured SRS resource set associated with at least one antenna panel at the UE, following examples can be provided.

In one example, the first indicated Rel. 17 unified TCI state or the indicated Rel. 17 unified TCI state with the lowest (or highest) TCI state ID/index in a group of T>1 Rel. 17 unified TCI states could be associated to the first SRS resource set or the SRS resource set with the lowest set ID/index in the S>1 SRS resource sets provided by SRS-ResourceSet, the second indicated Rel. 17 unified TCI state or the indicated Rel. 17 unified TCI state with the second lowest (or second highest) TCI state ID/index in the group of T>1 Rel. 17 unified TCI states could be associated to the second SRS resource set or the SRS resource set with the second lowest set ID/index in the S>1 SRS resource sets provided by SRS-ResourceSet, and so on, and the last (or the T-th) indicated Rel. 17 unified TCI state or the indicated Rel. 17 unified TCI state with the highest (or lowest) TCI state ID/index in the group of T>1 Rel. 17 unified TCI states could be associated to the last (or the S-th) SRS resource set or the SRS resource set with the highest set ID/index in the S>1 SRS resource sets provided by SRS-ResourceSet, where T could equal to S.

That is, the u-th indicated Rel. 17 unified TCI state or the indicated Rel. 17 unified TCI state u or the indicated Rel. 17 unified TCI state with the u-th lowest (or the u-th highest) TCI state ID/index in the group of T>1 Rel. 17 unified TCI states could be associated to the s-th SRS resource set or the SRS resource set with the s-th lowest set ID/index in the S>1 SRS resource sets provided by SRS-ResourceSet, where $u \in \{1, \ldots, T\}$, $s \in \{1, \ldots, S\}$ and T could equal to S. For T=2, S=2, the first indicated Rel. 17 unified TCI state or the indicated Rel. 17 unified TCI state with the lowest (or highest) TCI state ID/index in a group of T=2 Rel. 17 unified TCI states could be associated to the first SRS resource set or the SRS resource set with the lowest set ID/index in the S=2 SRS resource sets provided by SRS-ResourceSet, and the second indicated Rel. 17 unified TCI state or the indicated Rel. 17 unified TCI state with the highest (or lowest) TCI state ID/index in the group of T=2 Rel. 17 unified TCI states could be associated to the second SRS resource set or the SRS resource set with the highest set ID/index in the S=2 SRS resource sets provided by SRS-ResourceSet.

In another example, the UE could be indicated by the network the association/mapping between the T>1 Rel. 17 unified TCI states indicated in a group and the S>1 SRS resource sets provided by SRS-ResourceSet; this indication could be via RRC, MAC CE, or DCI based signaling. For example, the UE could receive from the network, e.g., via higher layer RRC, MAC CE, or DCI based signaling, a set of T>1 TCI state IDs/indexes each corresponding to an indicated Rel. 17 unified TCI state in a group.

For this case, the s-th SRS resource set or the SRS resource set with the s-th lowest (or highest) set ID/index in the S>1 SRS resource sets provided by SRS-ResourceSet could be associated to the indicated Rel. 17 unified TCI state with the TCI state ID/index having the same value as the u-th entry in the set of T>1 TCI state IDs/indexes, where $u \in \{1, \ldots, T\}$, $s \in \{1, \ldots, S\}$ and T could equal to S. The set of T>1 TCI state IDs/indexes could be indicated in higher layer parameter BWP-UplinkDedicated or SRS-ResourceSet or the DCI format (e.g., DCI format 1_1 or 1_2 with or without DL assignment) that indicates the corresponding T>1 Rel. 17 unified TCI state(s) or one or more TCI fields (e.g., provided by “transmission configuration indication”)

in the DCI format (e.g., DCI format 1_1 or 1_2 with or without DL assignment) that indicates the corresponding T>1 Rel. 17 unified TCI state(s). For another example, the UE could receive from the network, e.g., via higher layer RRC, MAC CE, or DCI based signaling, a set of S>1 SRS resource set IDs/indexes each corresponding to a configured SRS resource set in the S>1 SRS resource sets provided by SRS-ResourceSet.

For this case, the u-th indicated Rel. 17 unified TCI state or the indicated Rel. 17 unified TCI state u or the indicated Rel. 17 unified TCI state with the u-th lowest (or the u-th highest) TCI state ID/index in the group of T>1 Rel. 17 unified TCI states could be associated to the SRS resource set with the set ID/index having the same value as the s-th entry in the set of S>1 SRS resource set IDs/indexes, where u∈{1, . . . , T}, s∈{1, . . . , S} and T could equal to S. The set of S>1 SRS resource set IDs/indexes could be indicated in higher layer parameter BWP-UplinkDedicated or SRS-ResourceSet or the DCI format (e.g., DCI format 1_1 or 1_2 with or without DL assignment) that indicates the corresponding T>1 Rel. 17 unified TCI state(s) or one or more TCI fields (e.g., provided by "transmission configuration indication") in the DCI format (e.g., DCI format 1_1 or 1_2 with or without DL assignment) that indicates the corresponding T>1 Rel. 17 unified TCI state(s).

In yet another example, the UE could be indicated by the network the association/mapping between the T>1 Rel. 17 unified TCI states indicated in a group and the S>1 SRS resource sets provided by SRS-ResourceSet; this indication could be via RRC, MAC CE, or DCI based signaling. For T=2, S=2, the UE could receive from the network, e.g., via higher layer RRC, MAC CE, or DCI based signaling, a one-bit flag indicator.

For example, if the one-bit flag indicator is set to "1," the first indicated Rel. 17 unified TCI state or the indicated Rel. 17 unified TCI state with the lowest (or highest) TCI state ID/index in a group of T=2 Rel. 17 unified TCI states could be associated to the first SRS resource set or the SRS resource set with the lowest set ID/index in the S=2 SRS resource sets provided by SRS-ResourceSet, and the second indicated Rel. 17 unified TCI state or the indicated Rel. 17 unified TCI state with the highest (or lowest) TCI state ID/index in the group of T=2 Rel. 17 unified TCI states could be associated to the second SRS resource set or the SRS resource set with the highest set ID/index in the S=2 SRS resource sets provided by SRS-ResourceSet, or vice versa. If the one-bit flag indicator is set to "0," the first indicated Rel. 17 unified TCI state or the indicated Rel. 17 unified TCI state with the lowest (or highest) TCI state ID/index in a group of T=2 Rel. 17 unified TCI states could be associated to the second SRS resource set or the SRS resource set with the highest set ID/index in the S=2 SRS resource sets provided by SRS-ResourceSet, and the second indicated Rel. 17 unified TCI state or the indicated Rel. 17 unified TCI state with the highest (or lowest) TCI state ID/index in the group of T=2 Rel. 17 unified TCI states could be associated to the first SRS resource set or the SRS resource set with the lowest set ID/index in the S=2 SRS resource sets provided by SRS-ResourceSet, or vice versa. The one-bit flag indicator could be indicated in higher layer parameter BWP-UplinkDedicated or SRS-ResourceSet or the DCI format (e.g., DCI format 1_1 or 1_2 with or without DL assignment) that indicates the corresponding T>1 Rel. 17 unified TCI state(s) or one or more TCI fields (e.g., provided by "transmission configuration indication") in the DCI format (e.g., DCI format 1_1 or 1_2 with or without DL assignment) that indicates the corresponding T>1 Rel. 17 unified TCI state(s).

In yet another example, a SRS resource set ID/index (e.g., provided by SRS-ResourceSetId) could be indicated/included in an indicated Rel. 17 unified TCI state, e.g., in the corresponding higher layer parameter TCI-State_r17, from a group of T>1 Rel. 17 unified TCI states. For this case, the Rel. 17 unified TCI state is associated to the SRS resource set ID/index indicated therein, and therefore, the corresponding SRS resource set provided by SRS-ResourceSet. Alternatively, a TCI state ID/index of an indicated Rel. 17 unified TCI state from a group of T>1 Rel. 17 unified TCI states could be indicated/included in a SRS resource set, e.g., in the corresponding higher layer parameter SRS-ResourceSet, from S>1 configured SRS resource sets. For this case, the SRS resource set is associated to the TCI state ID/index indicated therein, and therefore, the corresponding indicated Rel. 17 unified TCI state. Optionally, an entity ID/index could be indicated/included in an indicated Rel. 17 unified TCI state, e.g., in the corresponding higher layer parameter TCI-State_r17, from a group of T>1 Rel. 17 unified TCI states, or in a SRS resource set, e.g., in the corresponding higher layer parameter SRS-ResourceSet, from S>1 configured SRS resource sets. An indicated Rel. 17 unified TCI state is associated to a SRS resource set if they are associated with a same entity ID/index. Here, an entity ID/index could be a one-bit flag indicator, a PCI value, a CORESETPoolIndex value, a TRP ID/index value, a CORESET ID/index value, and etc.

In one example, wherein the number of SRS resource groups configured/provided by the network is K>1 (e.g., K=2 for two antenna panels equipped at the UE) with each configured SRS resource group associated with at least one antenna panel at the UE, following examples can be provided.

In one example, the first indicated Rel. 17 unified TCI state or the indicated Rel. 17 unified TCI state with the lowest (or highest) TCI state ID/index in a group of T>1 Rel. 17 unified TCI states could be associated to the first SRS resource group or the SRS resource group with the lowest group ID/index in the K>1 SRS resource groups provided by SRS-ResourceGroup, the second indicated Rel. 17 unified TCI state or the indicated Rel. 17 unified TCI state with the second lowest (or second highest) TCI state ID/index in the group of T>1 Rel. 17 unified TCI states could be associated to the second SRS resource group or the SRS resource group with the second lowest group ID/index in the K>1 SRS resource groups provided by SRS-ResourceGroup, and so on, and the last (or the T-th) indicated Rel. 17 unified TCI state or the indicated Rel. 17 unified TCI state with the highest (or lowest) TCI state ID/index in the group of T>1 Rel. 17 unified TCI states could be associated to the last (or the K-th) SRS resource group or the SRS resource group with the highest group ID/index in the K>1 SRS resource groups provided by SRS-ResourceGroup, where T could equal to K. That is, the u-th indicated Rel. 17 unified TCI state or the indicated Rel. 17 unified TCI state u or the indicated Rel. 17 unified TCI state with the u-th lowest (or the u-th highest) TCI state ID/index in the group of T>1 Rel. 17 unified TCI states could be associated to the k-th SRS resource group or the SRS resource group with the k-th lowest group ID/index in the K>1 SRS resource groups provided by SRS-ResourceGroup, where u∈{1, . . . , T}, k∈{1, . . . , K} and T could equal to K. For T=2, K=2, the first indicated Rel. 17 unified TCI state or the indicated Rel. 17 unified TCI state with the lowest (or highest) TCI state ID/index in a group of T=2 Rel. 17 unified TCI states could be associated to the first SRS resource group or the SRS resource group with the lowest group ID/index in the K=2 SRS resource groups provided by SRS-ResourceGroup, and the second indicated Rel. 17 unified TCI state or the indicated Rel. 17 unified TCI state with the highest (or lowest) TCI state ID/index in the group of T=2 Rel. 17 unified TCI states could be associated to the second SRS resource group or the SRS resource group with the highest group ID/index in the K=2 SRS resource groups provided by SRS-ResourceGroup.

In another example, the UE could be indicated by the network the association/mapping between the T>1 Rel. 17 unified TCI states indicated in a group and the S>1 SRS resource groups provided by SRS-ResourceGroup; this indication could be via RRC, MAC CE, or DCI based signaling. For example, the UE could receive from the network, e.g., via higher layer RRC, MAC CE, or DCI based signaling, a set of T>1 TCI state IDs/indexes each corresponding to an indicated Rel. 17 unified TCI state in a group. For this case, the s-th SRS resource group or the SRS resource group with the k-th lowest (or highest) group ID/index in the K>1 SRS resource groups provided by SRS-ResourceGroup could be associated to the indicated Rel. 17 unified TCI state with the TCI state ID/index having the same value as the u-th entry in the set of T>1 TCI state IDs/indexes, where $u \in \{1, \ldots, T\}$, $k \in \{1, \ldots, K\}$ and T could equal to K. The set of T>1 TCI state IDs/indexes could be indicated in higher layer parameter BWP-UplinkDedicated or SRS-ResourceGroup or the DCI format (e.g., DCI format 1_1 or 1_2 with or without DL assignment) that indicates the corresponding T>1 Rel. 17 unified TCI state(s) or one or more TCI fields (e.g., provided by "transmission configuration indication") in the DCI format (e.g., DCI format 1_1 or 1_2 with or without DL assignment) that indicates the corresponding T>1 Rel. 17 unified TCI state(s).

For another example, the UE could receive from the network, e.g., via higher layer RRC, MAC CE, or DCI based signaling, a set of K>1 SRS resource group IDs/indexes each corresponding to a configured SRS resource group in the K>1 SRS resource groups provided by SRS-ResourceGroup. For this case, the u-th indicated Rel. 17 unified TCI state or the indicated Rel. 17 unified TCI state u or the indicated Rel. 17 unified TCI state with the u-th lowest (or the u-th highest) TCI state ID/index in the group of T>1 Rel. 17 unified TCI states could be associated to the SRS resource group with the group ID/index having the same value as the k-th entry in the set of S>1 SRS resource group IDs/indexes, where $u \in \{1, \ldots, T\}$, $k \in \{1, \ldots, K\}$ and T could equal to K. The set of K>1 SRS resource group IDs/indexes could be indicated in higher layer parameter BWP-UplinkDedicated or SRS-ResourceGroup or the DCI format (e.g., DCI format 1_1 or 1_2 with or without DL assignment) that indicates the corresponding T>1 Rel. 17 unified TCI state(s) or one or more TCI fields (e.g., provided by "transmission configuration indication") in the DCI format (e.g., DCI format 1_1 or 1_2 with or without DL assignment) that indicates the corresponding T>1 Rel. 17 unified TCI state(s).

In yet another example, the UE could be indicated by the network the association/mapping between the T>1 Rel. 17 unified TCI states indicated in a group and the K>1 SRS resource groups provided by SRS-ResourceGroup; this indication could be via RRC, MAC CE, or DCI based signaling. For T=2, K=2, the UE could receive from the network, e.g., via higher layer RRC, MAC CE, or DCI based signaling, a one-bit flag indicator. For example, if the one-bit flag indicator is set to "1," the first indicated Rel. 17 unified TCI state or the indicated Rel. 17 unified TCI state with the lowest (or highest) TCI state ID/index in a group of T=2 Rel. 17 unified TCI states could be associated to the first SRS resource group or the SRS resource group with the lowest group ID/index in the K=2 SRS resource groups provided by SRS-ResourceGroup, and the second indicated Rel. 17 unified TCI state or the indicated Rel. 17 unified TCI state with the highest (or lowest) TCI state ID/index in the group of T=2 Rel. 17 unified TCI states could be associated to the second SRS resource group or the SRS resource group with the highest group ID/index in the K=2 SRS resource groups provided by SRS-ResourceGroup, or vice versa. If the one-bit flag indicator is set to "0," the first indicated Rel. 17 unified TCI state or the indicated Rel. 17 unified TCI state with the lowest (or highest) TCI state ID/index in a group of T=2 Rel. 17 unified TCI states could be associated to the second SRS resource group or the SRS resource group with the highest group ID/index in the K=2 SRS resource groups provided by SRS-ResourceGroup, and the second indicated Rel. 17 unified TCI state or the indicated Rel. 17 unified TCI state with the highest (or lowest) TCI state ID/index in the group of T=2 Rel. 17 unified TCI states could be associated to the first SRS resource group or the SRS resource group with the lowest group ID/index in the K=2 SRS resource groups provided by SRS-ResourceGroup, or vice versa. The one-bit flag indicator could be indicated in higher layer parameter BWP-UplinkDedicated or SRS-ResourceGroup or the DCI format (e.g., DCI format 1_1 or 1_2 with or without DL assignment) that indicates the corresponding T>1 Rel. 17 unified TCI state(s) or one or more TCI fields (e.g., provided by "transmission configuration indication") in the DCI format (e.g., DCI format 1_1 or 1_2 with or without DL assignment) that indicates the corresponding T>1 Rel. 17 unified TCI state(s).

In yet another example, a SRS resource group ID/index (e.g., provided by SRS-ResourceGroupId) could be indicated/included in an indicated Rel. 17 unified TCI state, e.g., in the corresponding higher layer parameter TCI-State_r17, from a group of T>1 Rel. 17 unified TCI states. For this case, the Rel. 17 unified TCI state is associated to the SRS resource group ID/index indicated therein, and therefore, the corresponding SRS resource group provided by SRS-ResourceGroup.

Alternatively, a TCI state ID/index of an indicated Rel. 17 unified TCI state from a group of T>1 Rel. 17 unified TCI states could be indicated/included in a SRS resource group, e.g., in the corresponding higher layer parameter SRS-ResourceGroup, from K>1 configured SRS resource groups. For this case, the SRS resource group is associated to the TCI state ID/index indicated therein, and therefore, the corresponding indicated Rel. 17 unified TCI state. Optionally, an entity ID/index could be indicated/included in an indicated Rel. 17 unified TCI state, e.g., in the corresponding higher layer parameter TCI-State_r17, from a group of T>1 Rel. 17 unified TCI states, or in a SRS resource group, e.g., in the corresponding higher layer parameter SRS-ResourceGroup, from K>1 configured SRS resource groups. An indicated Rel. 17 unified TCI state is associated to a SRS resource group if they are associated with a same entity ID/index. Here, an entity ID/index could be a one-bit flag indicator, a PCI value, a CORESETPoolIndex value, a TRP ID/index value, a CORESET ID/index value, and etc.

In one example, wherein the number of SRS resources configured/provided by the network is R>1 (e.g., R=2 for two antenna panels equipped at the UE) with each configured SRS resource is associated with at least one antenna panel at the UE, following examples.

In one example, the first indicated Rel. 17 unified TCI state or the indicated Rel. 17 unified TCI state with the lowest (or highest) TCI state ID/index in a group of T>1 Rel. 17 unified TCI states could be associated to the first SRS resource or the SRS resource with the lowest resource ID/index in the R>1 SRS resources provided by SRS-Resource, the second indicated Rel. 17 unified TCI state or the indicated Rel. 17 unified TCI state with the second lowest (or second highest) TCI state ID/index in the group of T>1 Rel. 17 unified TCI states could be associated to the second SRS resource or the SRS resource with the second lowest resource ID/index in the R>1 SRS resources provided by SRS-Resource, and so on, and the last (or the T-th) indicated Rel. 17 unified TCI state or the indicated Rel. 17 unified TCI state with the highest (or lowest) TCI state ID/index in the group of T>1 Rel. 17 unified TCI states could be associated to the last (or the R-th) SRS resource or the SRS resource with the highest resource ID/index in the R>1 SRS resources provided by SRS-Resource, where T could equal to R. That is, the u-th indicated Rel. 17 unified TCI state or the indicated Rel. 17 unified TCI state u or the indicated Rel. 17 unified TCI state with the u-th lowest (or the u-th highest) TCI state ID/index in the group of T>1 Rel. 17 unified TCI states could be associated to the r-th SRS resource or the SRS resource with the r-th lowest resource ID/index in the R>1 SRS resources provided by SRS-Resource, where $u \in \{1, \ldots, T\}$, $r \in \{1, \ldots, R\}$ and T could equal to R. For T=2, R=2, the first indicated Rel. 17 unified TCI state or the indicated Rel. 17 unified TCI state with the lowest (or highest) TCI state ID/index in a group of T=2 Rel. 17 unified TCI states could be associated to the first SRS resource or the SRS resource with the lowest resource ID/index in the R=2 SRS resources provided by SRS-Resource, and the second indicated Rel. 17 unified TCI state or the indicated Rel. 17 unified TCI state with the highest (or lowest) TCI state ID/index in the group of T=2 Rel. 17 unified TCI states could be associated to the second SRS resource or the SRS resource with the highest resource ID/index in the R=2 SRS resources provided by SRS-Resource.

In another example, the UE could be indicated by the network the association/mapping between the T>1 Rel. 17 unified TCI states indicated in a group and the R>1 SRS resources provided by SRS-Resource; this indication could be via RRC, MAC CE, or DCI based signaling. For example, the UE could receive from the network, e.g., via higher layer RRC, MAC CE, or DCI based signaling, a set of T>1 TCI state IDs/indexes each corresponding to an indicated Rel. 17 unified TCI state in a group. For this case, the r-th SRS resource or the SRS resource with the r-th lowest (or highest) resource ID/index in the R>1 SRS resources provided by SRS-Resource could be associated to the indicated Rel. 17 unified TCI state with the TCI state ID/index having the same value as the u-th entry in the set of T>1 TCI state IDs/indexes, where $u \in \{1, \ldots, T\}$, $r \in \{1, \ldots, R\}$ and T could equal to R. The set of T>1 TCI state IDs/indexes could be indicated in higher layer parameter BWP-UplinkDedicated or SRS-Resource or the DCI format (e.g., DCI format 1_1 or 1_2 with or without DL assignment) that indicates the corresponding T>1 Rel. 17 unified TCI state(s) or one or more TCI fields (e.g., provided by "transmission configuration indication") in the DCI format (e.g., DCI format 1_1 or 1_2 with or without DL assignment) that indicates the corresponding T>1 Rel. 17 unified TCI state(s).

For another example, the UE could receive from the network, e.g., via higher layer RRC, MAC CE, or DCI based signaling, a set of R>1 SRS resource IDs/indexes each corresponding to a configured SRS resource in the R>1 SRS resources provided by SRS-Resource. For this case, the u-th indicated Rel. 17 unified TCI state or the indicated Rel. 17 unified TCI state u or the indicated Rel. 17 unified TCI state with the u-th lowest (or the u-th highest) TCI state ID/index in the group of T>1 Rel. 17 unified TCI states could be associated to the SRS resource with the resource ID/index having the same value as the r-th entry in the set of R>1 SRS resource IDs/indexes, where $u \in \{1, \ldots, T\}$, $r \in \{1, \ldots, R\}$ and T could equal to R. The set of R>1 SRS resource IDs/indexes could be indicated in higher layer parameter BWP-UplinkDedicated or SRS-Resource or the DCI format (e.g., DCI format 1_1 or 1_2 with or without DL assignment) that indicates the corresponding T>1 Rel. 17 unified TCI state(s) or one or more TCI fields (e.g., provided by "transmission configuration indication") in the DCI format (e.g., DCI format 1_1 or 1_2 with or without DL assignment) that indicates the corresponding T>1 Rel. 17 unified TCI state(s).

In yet another example, the UE could be indicated by the network the association/mapping between the T>1 Rel. 17 unified TCI states indicated in a group and the R>1 SRS resources provided by SRS-Resource; this indication could be via RRC, MAC CE, or DCI based signaling. For T=2, R=2, the UE could receive from the network, e.g., via higher layer RRC, MAC CE, or DCI based signaling, a one-bit flag indicator. For example, if the one-bit flag indicator is set to "1," the first indicated Rel. 17 unified TCI state or the indicated Rel. 17 unified TCI state with the lowest (or highest) TCI state ID/index in a group of T=2 Rel. 17 unified TCI states could be associated to the first SRS resource or the SRS resource with the lowest resource ID/index in the R=2 SRS resources provided by SRS-Resource, and the second indicated Rel. 17 unified TCI state or the indicated Rel. 17 unified TCI state with the highest (or lowest) TCI state ID/index in the group of T=2 Rel. 17 unified TCI states could be associated to the second SRS resource or the SRS resource with the highest resource ID/index in the R=2 SRS resources provided by SRS-Resource, or vice versa. If the one-bit flag indicator is set to "0," the first indicated Rel. 17 unified TCI state or the indicated Rel. 17 unified TCI state with the lowest (or highest) TCI state ID/index in a group of T=2 Rel. 17 unified TCI states could be associated to the second SRS resource or the SRS resource with the highest resource ID/index in the R=2 SRS resources provided by SRS-Resource, and the second indicated Rel. 17 unified TCI state or the indicated Rel. 17 unified TCI state with the highest (or lowest) TCI state ID/index in the group of T=2 Rel. 17 unified TCI states could be associated to the first SRS resource or the SRS resource with the lowest resource ID/index in the R=2 SRS resources provided by SRS-Resource, or vice versa.

The one-bit flag indicator could be indicated in higher layer parameter BWP-UplinkDedicated or SRS-Resource or the DCI format (e.g., DCI format 1_1 or 1_2 with or without DL assignment) that indicates the corresponding T>1 Rel. 17 unified TCI state(s) or one or more TCI fields (e.g., provided by "transmission configuration indication") in the DCI format (e.g., DCI format 1_1 or 1_2 with or without DL assignment) that indicates the corresponding T>1 Rel. 17 unified TCI state(s).

In yet another example, a SRS resource ID/index (e.g., provided by SRS-ResourceId) could be indicated/included in an indicated Rel. 17 unified TCI state, e.g., in the corresponding higher layer parameter TCI-State_r17, from a group of T>1 Rel. 17 unified TCI states. For this case, the Rel. 17 unified TCI state is associated to the SRS resource ID/index indicated therein, and therefore, the corresponding SRS resource provided by SRS-Resource. Alternatively, a TCI state ID/index of an indicated Rel. 17 unified TCI state from a group of T>1 Rel. 17 unified TCI states could be indicated/included in a SRS resource, e.g., in the corresponding higher layer parameter SRS-Resource, from R>1 configured SRS resources. For this case, the SRS resource is associated to the TCI state ID/index indicated therein, and therefore, the corresponding indicated Rel. 17 unified TCI state. Optionally, an entity ID/index could be indicated/included in an indicated Rel. 17 unified TCI state, e.g., in the corresponding higher layer parameter TCI-State_r17, from a group of T>1 Rel. 17 unified TCI states, or in a SRS resource, e.g., in the corresponding higher layer parameter SRS-Resource, from R>1 configured SRS resources. An indicated Rel. 17 unified TCI state is associated to a SRS resource if they are associated with a same entity ID/index. Here, an entity ID/index could be a one-bit flag indicator, a PCI value, a CORESETPoolIndex value, a TRP ID/index value, a CORESET ID/index value, and etc.

Furthermore, one or more entity IDs/indexes could be indicated in the MAC CE or DCI format (e.g., DCI format 1_1 or 1_2 with or without DL assignment) for unified TCI state indication, wherein the G≥1 groups of Rel. 17 unified TCI states with each group indicating/containing T>1 Rel. 17 unified TCI states are indicated. Each entity ID/index could be a PCI value, a CORESETPoolIndex value, a CORESETGroupIndex value, a PCI index pointing/corresponding to an entry in a list/set/pool of PCIs higher layer configured to the UE, a TRP ID/index value, a one-bit flag indicator or etc. Each entity ID/index could be associated with/to at least one of the T>1 Rel. 17 unified TCI states indicated in a group. For instance, T>1 entity IDs/indexes corresponding to PCIs/PCI indexes/CORESETPoolIndex values/CORESETGroupIndex values could be indicated in the MAC CE or DCI for unified TCI state indication, wherein the G≥1 groups of Rel. 17 unified TCI states with each group indicating/containing T>1 Rel. 17 unified TCI states are indicated. For this case, the u-th entity ID/index or the u-th lowest (or the u-th highest) entity ID/index in the T>1 entity IDs/indexes could be associated with/to the u-th indicated Rel. 17 unified TCI state or the indicated Rel. 17 unified TCI state u or the indicated Rel. 17 unified TCI state with the u-th lowest (or the u-th highest) TCI state ID/index in a group of T>1 Rel. 17 unified TCI states, where $u \in \{1, \ldots, T\}$.

A UE could follow the group based uplink beam indication format as described in examples to configure the spatial domain transmit filter(s) for simultaneous multi-panel transmission according to at least one of following examples.

In one example, the UE receives from the network a higher layer parameter denoted by groupBasedUplinkBeamIndicationSchemeA. The higher layer parameter groupBasedUplinkBeamIndicationSchemeA could be indicated in the MAC CE or DCI (e.g., DCI format 1_1 or 1_2 with or without DL assignment) for unified TCI state indication or SRS-Config or SRS-ResourceSet or SRS-Resource. If the groupBasedUplinkBeamIndicationSchemeA is set to "enabled," the UE may follow the group based uplink beam indication format as described in examples to configure the spatial domain transmit filter(s) for simultaneous multi-panel transmission.

In another example, if the indicated Rel. 17 unified TCI states correspond to joint DL and UL TCI states, separate UL TCI states or a combination of joint DL and UL TCI states and separate UL TCI states, the UE may follow the group based uplink beam indication format as described in examples to configure the spatial domain transmit filter(s) for simultaneous multi-panel transmission.

In yet another example, if the higher layer parameter groupBasedUplinkBeamIndicationSchemeA is set to "enabled" and the indicated Rel. 17 unified TCI states correspond to joint DL and UL TCI states, separate UL TCI states or a combination of joint DL and UL TCI states and separate UL TCI states, the UE may follow the group based uplink beam indication format as described in examples to configure the spatial domain transmit filter(s) for simultaneous multi-panel transmission.

In one embodiment, a UE could be provided/configured by the network, e.g., via MAC CE or DCI (e.g., DCI format 1_1 or 1_2 with or without DL assignment) based signaling through the higher layer parameter TCI-State_r17, Q>1 groups of Rel. 17 unified TCI states with each group indicating/containing V≥1 Rel. 17 unified TCI states. For instance, the DCI format (e.g., DCI format 1_1 or 1_2 with or without DL assignment) for unified TCI state/beam indication could include a "transmission configuration indication" field containing one or more codepoints activated by a MAC CE activation command from a set/pool of codepoints. For this case, each codepoint could indicate Q>1 groups of Rel. 17 unified TCI states with each group indicating/containing V≥1 Rel. 17 unified TCI states.

Alternatively, the DCI format (e.g., DCI format 1_1 or 1_2 with or without DL assignment) for unified TCI state/beam indication could include Q>1 "transmission configuration indication" fields each containing at least one codepoint activated by a MAC CE activation command from a set/pool of codepoints. For this case, each codepoint could indicate a group of V≥1 Rel. 17 unified TCI states. Furthermore, the V≥1 Rel. 17 unified TCI states indicated in a group could correspond to V≥1 joint DL and UL TCI states, V≥1 separate UL TCI states or a combination of V≥1 joint DL and UL TCI states and separate UL TCI states. The UE could use the same or different spatial filters determined according to the reference signals (e.g., the spatial filters are spatially related to the reference signals) provided in the Rel. 17 unified TCI states indicated across different groups (e.g., across the Q>1 groups) to simultaneously transmit various uplink channels/signals such as PUCCHs, PUSCHs or SRSs to the network/TRPs. The UE could be provided by the network the values of Q or V. If Q≤Qmax or V≤Vmax, where Qmax represents the maximum number of groups of Rel. 17 unified TCI states or TCI fields that can be indicated in a MAC CE or DCI and Vmax is the maximum number of Rel. 17 unified TCI states that can be indicated in a group or a TCI field, the UE could also be provided by the network the values of Qmax or Vmax.

The Q>1 groups of indicated Rel. 17 unified TCI states or the Q>1 "transmission configuration indication" fields in a MAC CE or DCI indicating the Q>1 groups of Rel. 17 unified TCI states could be associated to one or more SRS resources, which could be configured according to examples in the present disclosure.

In one example, wherein the number of SRS resource configurations/settings configured/provided by the network is P>1 (e.g., P=2 for two antenna panels equipped at the UE) with each configured SRS resource configuration/setting associated with at least one antenna panel at the UE, following examples can be provided.

In one example, the first group of indicated Rel. 17 unified TCI states or the group of indicated Rel. 17 unified TCI states with the lowest (or highest) group ID/index in the Q>1 groups of Rel. 17 unified TCI states or the first "transmission configuration indication" field in the Q>1 "transmission configuration indication" fields in a MAC CE or DCI indicating the Q>1 groups of Rel. 17 unified TCI states or the TCI field with the lowest (or the highest) TCI field ID/index in the Q>1 TCI fields in a MAC CE or DCI indicating the Q>1 groups of Rel. 17 unified TCI states could be associated to the first SRS resource configuration/setting or the SRS resource configuration/setting with the lowest configuration ID/index in the P>1 SRS resource configurations/settings provided by SRS-Config, the second group of indicated Rel. 17 unified TCI states or the group of indicated Rel. 17 unified TCI states with the second lowest (or second highest) group ID/index in the Q>1 groups of Rel. 17 unified TCI states or the second "transmission configuration indication" field in the Q>1 "transmission configuration indication" fields in the MAC CE or DCI indicating the Q>1 groups of Rel. 17 unified TCI states or the TCI field with the second lowest (or second highest) TCI field ID/index in the Q>1 TCI fields in the MAC CE or DCI indicating the Q>1 groups of Rel. 17 unified TCI states could be associated to the second SRS resource configuration/setting or the SRS resource configuration/setting with the second lowest configuration ID/index in the P>1 SRS resource configurations/settings provided by SRS-Config, and so on, and the last (or the Q-th) group of indicated Rel. 17 unified TCI states or the group of indicated Rel. 17 unified TCI states with the highest (or lowest) group ID/index in the Q>1 groups of Rel. 17 unified TCI states or the last (or the Q-th) "transmission configuration indication" field in the Q>1 "transmission configuration indication" fields in the MAC CE or DCI indicating the Q>1 groups of Rel. 17 unified TCI states or the TCI field with the highest (or lowest) TCI field ID/index in the Q>1 TCI fields in the MAC CE or DCI indicating the Q>1 groups of Rel. 17 unified TCI states could be associated to the last (or the P-th) SRS resource configuration/setting or the SRS resource configuration/setting with the highest configuration ID/index in the P>1 SRS resource configurations/settings provided by SRS-Config, where Q could equal to P. That is, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields indicated in the MAC CE or DCI indicating the Q>1 groups of Rel. 17 unified TCI states could be associated to the p-th SRS resource configuration/setting or the SRS resource configuration/setting with the p-th lowest configuration ID/index in the P>1 SRS resource configurations/settings provided by SRS-Config, where $q \in \{1, \ldots, Q\}$, $p \in \{1, \ldots, P\}$ and Q could equal to P. For Q=2, P=2, the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration fields" in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource configuration/setting or the SRS resource configuration/setting with the lowest configuration ID/index in the P=2 SRS resource configurations/settings provided by SRS-Config, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource configuration/setting or the SRS resource configuration/setting with the highest configuration ID/index in the P=2 SRS resource configurations/settings provided by SRS-Config.

In another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the P>1 SRS resource configurations/settings provided by SRS-Config; this indication could be via RRC, MAC CE, or DCI based signaling. For example, the UE could receive from the network, e.g., via higher layer RRC, MAC CE, or DCI based signaling, a set of Q>1 TCI state group IDs/indexes or Q>1 TCI field IDs/indexes each corresponding to a group of indicated Rel. 17 unified TCI states.

For this case, the p-th SRS resource configuration/setting or the SRS resource configuration/setting with the p-th lowest (or highest) configuration ID/index in the P>1 SRS resource configurations/settings provided by SRS-Config could be associated to the group of indicated Rel. 17 unified TCI states with the group ID/index having the same value as the q-th entry in the set of Q>1 TCI state group IDs/indexes or the "transmission configuration indication" field indicating a group of Rel. 17 unified TCI states with the TCI field ID/index having the same value as the q-th entry in the set of Q>1 TCI field IDs/indexes, where $q \in \{1, \ldots, Q\}$, $p \in \{1, \ldots, P\}$ and Q could equal to P. The set of Q>1 TCI state group IDs/indexes or the set of Q>1 TCI field IDs/indexes could be indicated in higher layer parameter BWP-UplinkDedicated or SRS-Config or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

For another example, the UE could receive from the network, e.g., via higher layer RRC, MAC CE, or DCI based signaling, a set of P>1 SRS resource configuration/setting IDs/indexes each corresponding to a configured SRS resource configuration/setting in the P>1 SRS resource configurations/settings provided by SRS-Config. For this case, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields in the MAC CE or DCI indicating the Q>1 groups of Rel. 17 unified TCI states could be associated to the SRS resource configuration/setting with the configuration ID/index having the same value as the p-th entry in the set of P>1 SRS resource configuration IDs/indexes, where $q \in \{1, \ldots, Q\}$, $p \in \{1, \ldots, P\}$ and Q could equal to P. The set of P>1 SRS resource configuration IDs/indexes could be indicated in higher layer parameter BWP-UplinkDedicated or SRS-Config or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the P>1 SRS resource configurations/settings provided by SRS-Config; this indication could be via RRC, MAC CE, or DCI based signaling. For Q=2, P=2, the UE could receive from the network, e.g., via higher layer RRC, MAC CE, or DCI based signaling, a one-bit flag indicator. For example, if the one-bit flag indicator is set to "1," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource configuration/setting or the SRS resource configuration/setting with the lowest configuration ID/index in the P=2 SRS resource configurations/settings provided by SRS-Config, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource configuration/setting or the SRS resource configuration/setting with the highest configuration ID/index in the P=2 SRS resource configurations/settings provided by SRS-Config, or vice versa. If the one-bit flag indicator is set to "0," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the second SRS resource configuration/setting or the SRS resource configuration/setting with the highest configuration ID/index in the P=2 SRS resource configurations/settings provided by SRS-Config, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the first SRS resource configuration/setting or the SRS resource configuration/setting with the lowest configuration ID/index in the P=2 SRS resource configurations/settings provided by SRS-Config, or vice versa. The one-bit flag indicator could be indicated in higher layer parameter BWP-UplinkDedicated or SRS-Config or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, a SRS resource configuration ID/index (e.g., provided by SRS-ConfigId) could be indicated/included in a group of indicated Rel. 17 unified TCI states, e.g., in a higher layer parameter TCI-State-Group, from the Q>1 groups of Rel. 17 unified TCI states. Alternatively, a SRS resource configuration ID/index (e.g., provided by SRS-ConfigId) could be indicated/included in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states.

For this case, the group of Rel. 17 unified TCI state or the TCI field indicating a group of Rel. 17 unified TCI states is associated to the SRS resource configuration ID/index indicated therein, and therefore, the corresponding SRS resource configuration/setting provided by SRS-Config. Alternatively, a TCI state group ID/index of a group of indicated Rel. 17 unified TCI states from the Q>1 groups of Rel. 17 unified TCI states or a TCI field ID/index of a "transmission configuration indication" field in the Q>1 "transmission configuration indication" fields in a MAC CE or DCI indicating the Q>1 groups of Rel. 17 unified TCI states could be indicated/included in a SRS resource configuration/setting, e.g., in the corresponding higher layer parameter SRS-Config, from the P>1 configured SRS resource configurations/settings.

For this case, the SRS resource configuration/setting is associated to the TCI state group ID/index or the TCI field ID/index indicated therein, and therefore, the corresponding group of indicated Rel. 17 unified TCI states or the TCI field indicating the corresponding group of indicated Rel. 17 unified TCI states. Optionally, an entity ID/index could be indicated/included in a group of indicated Rel. 17 unified TCI states, e.g., in the higher layer parameter TCI-State-Group, from the Q>1 groups of Rel. 17 unified TCI states, or in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states, or in a SRS resource configuration/setting, e.g., in the corresponding higher layer parameter SRS-Config, from the P>1 configured SRS resource configurations/settings. A group of indicated Rel. 17 unified TCI states or a TCI field indicating a group of Rel. 17 unified TCI states is associated to a SRS resource configuration/setting if they are associated with a same entity ID/index. Here, an entity ID/index could be a one-bit flag indicator, a PCI value, a CORESETPoolIndex value, a TRP ID/index value, a CORESET ID/index value, and etc.

In one example, wherein the number of SRS resource sets configured/provided by the network is S>1 (e.g., S=2 for two antenna panels equipped at the UE) with each configured SRS resource set associated with at least one antenna panel at the UE, following examples can be provided.

In one example, the first group of indicated Rel. 17 unified TCI states or the group of indicated Rel. 17 unified TCI states with the lowest (or highest) group ID/index in the Q>1 groups of Rel. 17 unified TCI states or the first "transmission configuration indication" field in the Q>1 "transmission configuration indication" fields in a MAC CE or DCI indicating the Q>1 groups of Rel. 17 unified TCI states or the TCI field with the lowest (or the highest) TCI field ID/index in the Q>1 TCI fields in a MAC CE or DCI indicating the Q>1 groups of Rel. 17 unified TCI states could be associated to the first SRS resource set or the SRS resource set with the lowest set ID/index in the S>1 SRS resource sets provided by SRS-ResourceSet, the second group of indicated Rel. 17 unified TCI states or the group of indicated Rel. 17 unified TCI states with the second lowest (or second highest) group ID/index in the Q>1 groups of Rel. 17 unified TCI states or the second "transmission configuration indication" field in the Q>1 "transmission configuration indication" fields in the MAC CE or DCI indicating the Q>1 groups of Rel. 17 unified TCI states or the TCI field with the second lowest (or second highest) TCI field ID/index in the Q>1 TCI fields in the MAC CE or DCI indicating the Q>1 groups of Rel. 17 unified TCI states could be associated to the second SRS resource set or the SRS resource set with the second lowest set ID/index in the S>1 SRS resource sets provided by SRS-ResourceSet, and so on, and the last (or the Q-th) group of indicated Rel. 17 unified TCI states or the group of indicated Rel. 17 unified TCI states with the highest (or lowest) group ID/index in the Q>1 groups of Rel. 17 unified TCI states or the last (or the Q-th) "transmission configuration indication" field in the Q>1 "transmission configuration indication" fields in the MAC CE or DCI indicating the Q>1 groups of Rel. 17 unified TCI states or the TCI field with the highest (or lowest) TCI field ID/index in the Q>1 TCI fields in the MAC CE or DCI indicating the Q>1 groups of Rel. 17 unified TCI states could be associated to the last (or the S-th) SRS resource set or the SRS resource set with the highest set ID/index in the S>1 SRS resource sets provided by SRS-ResourceSet, where Q could equal to S. That is, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields indicated in the MAC CE or DCI indicating the Q>1 groups of Rel. 17 unified TCI states could be associated to the s-th SRS resource set or the SRS resource set with the s-th lowest set ID/index in the S>1 SRS resource sets provided by SRS-ResourceSet, where $q \in \{1, \ldots, Q\}$, $s \in \{1, \ldots, S\}$ and Q could equal to S. For Q=2, S=2, the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration fields" in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource set or the SRS resource set with the lowest set ID/index in the S=2 SRS resource sets provided by SRS-ResourceSet, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource set or the SRS resource set with the highest set ID/index in the S=2 SRS resource sets provided by SRS-ResourceSet.

In another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the S>1 SRS resource sets provided by SRS-ResourceSet; this indication could be via RRC, MAC CE, or DCI based signaling. For example, the UE could receive from the network, e.g., via higher layer RRC, MAC CE, or DCI based signaling, a set of Q>1 TCI state group IDs/indexes or Q>1 TCI field IDs/indexes each corresponding to a group of indicated Rel. 17 unified TCI states.

For this case, the s-th SRS resource set or the SRS resource set with the s-th lowest (or highest) set ID/index in the S>1 SRS resource sets provided by SRS-ResourceSet could be associated to the group of indicated Rel. 17 unified TCI states with the group ID/index having the same value as the q-th entry in the set of Q>1 TCI state group IDs/indexes or the "transmission configuration indication" field indicating a group of Rel. 17 unified TCI states with the TCI field ID/index having the same value as the q-th entry in the set of Q>1 TCI field IDs/indexes, where $q \in \{1, \ldots, Q\}$, $s \in \{1, \ldots, S\}$ and Q could equal to S. The set of Q>1 TCI state group IDs/indexes or the set of Q>1 TCI field IDs/indexes could be indicated in higher layer parameter BWP-UplinkDedicated or SRS-ResourceSet or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

For another example, the UE could receive from the network, e.g., via higher layer RRC, MAC CE, or DCI based signaling, a set of S>1 SRS resource set IDs/indexes each corresponding to a configured SRS resource set in the S>1 SRS resource sets provided by SRS-ResourceSet. For this case, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields in the MAC CE or DCI indicating the Q>1 groups of Rel. 17 unified TCI states could be associated to the SRS resource set with the set ID/index having the same value as the s-th entry in the set of S>1 SRS resource set IDs/indexes, where $q \in \{1, \ldots, Q\}$, $s \in \{1, \ldots, S\}$ and Q could equal to S. The set of S>1 SRS resource set IDs/indexes could be indicated in higher layer parameter BWP-UplinkDedicated or SRS-ResourceSet or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the S>1 SRS resource sets provided by SRS-ResourceSet; this indication could be via RRC, MAC CE, or DCI based signaling. For Q=2, S=2, the UE could receive from the network, e.g., via higher layer RRC, MAC CE, or DCI based signaling, a one-bit flag indicator.

For example, if the one-bit flag indicator is set to "1," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource set or the SRS resource set with the lowest set ID/index in the S=2 SRS resource sets provided by SRS-ResourceSet, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource set or the SRS resource set with the highest set ID/index in the S=2 SRS resource sets provided by SRS-ResourceSet, or vice versa.

If the one-bit flag indicator is set to "0," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the second SRS resource set or the SRS resource set with the highest set ID/index in the S=2 SRS resource sets provided by SRS-ResourceSet, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the first SRS resource set or the SRS resource set with the lowest set ID/index in the S=2 SRS resource sets provided by SRS-ResourceSet, or vice versa. The one-bit flag indicator could be indicated in higher layer parameter BWP-UplinkDedicated or SRS-ResourceSet or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, a SRS resource set ID/index (e.g., provided by SRS-ResourceSetId) could be indicated/included in a group of indicated Rel. 17 unified TCI states, e.g., in a higher layer parameter TCI-State-Group, from the Q>1 groups of Rel. 17 unified TCI states. Alternatively, a SRS resource set ID/index (e.g., provided by SRS-ResourceSetId) could be indicated/included in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states.

For this case, the group of Rel. 17 unified TCI state or the TCI field indicating a group of Rel. 17 unified TCI states is associated to the SRS resource set ID/index indicated therein, and therefore, the corresponding SRS resource set provided by SRS-ResourceSet. Alternatively, a TCI state group ID/index of a group of indicated Rel. 17 unified TCI states from the Q>1 groups of Rel. 17 unified TCI states or a TCI field ID/index of a "transmission configuration indication" field in the Q>1 "transmission configuration indication" fields in a MAC CE or DCI indicating the Q>1 groups of Rel. 17 unified TCI states could be indicated/included in a SRS resource set, e.g., in the corresponding higher layer parameter SRS-ResourceSet, from the S>1 configured SRS resource sets.

For this case, the SRS resource set is associated to the TCI state group ID/index or the TCI field ID/index indicated therein, and therefore, the corresponding group of indicated Rel. 17 unified TCI states or the TCI field indicating the corresponding group of Rel. 17 unified TCI states. Optionally, an entity ID/index could be indicated/included in a group of indicated Rel. 17 unified TCI states, e.g., in the higher layer parameter TCI-State-Group, from the Q>1 groups of Rel. 17 unified TCI states, or in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states, or in a SRS resource set, e.g., in the corresponding higher layer parameter SRS-ResourceSet, from the S>1 configured SRS resource sets. A group of indicated Rel. 17 unified TCI states or a TCI field indicating a group of Rel. 17 unified TCI states is associated to a SRS resource set if they are associated with a same entity ID/index. Here, an entity ID/index could be a one-bit flag indicator, a PCI value, a CORESETPoolIndex value, a TRP ID/index value, a CORESET ID/index value, and etc.

In one example, wherein the number of SRS resource groups configured/provided by the network is K>1 (e.g., K=2 for two antenna panels equipped at the UE) with each configured SRS resource group associated with at least one antenna panel at the UE, following examples can be provided.

In one example, the first group of indicated Rel. 17 unified TCI states or the group of indicated Rel. 17 unified TCI states with the lowest (or highest) group ID/index in the Q>1 groups of Rel. 17 unified TCI states or the first "transmission configuration indication" field in the Q>1 "transmission configuration indication" fields in a MAC CE or DCI indicating the Q>1 groups of Rel. 17 unified TCI states or the TCI field with the lowest (or the highest) TCI field ID/index in the Q>1 TCI fields in a MAC CE or DCI indicating the Q>1 groups of Rel. 17 unified TCI states could be associated to the first SRS resource group or the SRS resource group with the lowest group ID/index in the K>1 SRS resource groups provided by SRS-ResourceGroup, the second group of indicated Rel. 17 unified TCI states or the group of indicated Rel. 17 unified TCI states with the second lowest (or second highest) group ID/index in the Q>1 groups of Rel. 17 unified TCI states or the second "transmission configuration indication" field in the Q>1 "transmission configuration indication" fields in the MAC CE or DCI indicating the Q>1 groups of Rel. 17 unified TCI states or the TCI field with the second lowest (or second highest) TCI field ID/index in the Q>1 TCI fields in the MAC CE or DCI indicating the Q>1 groups of Rel. 17 unified TCI states could be associated to the second SRS resource group or the SRS resource group with the second lowest group ID/index in the K>1 SRS resource groups provided by SRS-ResourceGroup, and so on, and the last (or the Q-th) group of indicated Rel. 17 unified TCI states or the group of indicated Rel. 17 unified TCI states with the highest (or lowest) group ID/index in the Q>1 groups of Rel. 17 unified TCI states or the last (or the Q-th) "transmission configuration indication" field in the Q>1 "transmission configuration indication" fields in the MAC CE or DCI indicating the Q>1 groups of Rel. 17 unified TCI states or the TCI field with the highest (or lowest) TCI field ID/index in the Q>1 TCI fields in the MAC CE or DCI indicating the Q>1 groups of Rel. 17 unified TCI states could be associated to the last (or the K-th) SRS resource group or the SRS resource group with the highest group ID/index in the K>1 SRS resource groups provided by SRS-ResourceGroup, where Q could equal to K. That is, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields indicated in the MAC CE or DCI indicating the Q>1 groups of Rel. 17 unified TCI states could be associated to the k-th SRS resource group or the SRS resource group with the k-th lowest group ID/index in the K>1 SRS resource groups provided by SRS-ResourceGroup, where $q \in \{1, \ldots, Q\}$, $k \in \{1, \ldots, K\}$ and Q could equal to K. For Q=2, K=2, the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration fields" in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource group or the SRS resource group with the lowest group ID/index in the K=2 SRS resource groups provided by SRS-ResourceGroup, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource group or the SRS resource group with the highest group ID/index in the K=2 SRS resource groups provided by SRS-ResourceGroup.

In another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the K>1 SRS resource groups provided by SRS-ResourceGroup; this indication could be via RRC, MAC CE, or DCI based signaling.

For example, the UE could receive from the network, e.g., via higher layer RRC, MAC CE, or DCI based signaling, a set of Q>1 TCI state group IDs/indexes or Q>1 TCI field IDs/indexes each corresponding to a group of indicated Rel. 17 unified TCI states. For this case, the k-th SRS resource group or the SRS resource group with the k-th lowest (or highest) group ID/index in the K>1 SRS resource groups provided by SRS-ResourceGroup could be associated to the group of indicated Rel. 17 unified TCI states with the group ID/index having the same value as the q-th entry in the set of Q>1 TCI state group IDs/indexes or the "transmission configuration indication" field indicating a group of Rel. 17 unified TCI states with the TCI field ID/index having the same value as the q-th entry in the set of Q>1 TCI field IDs/indexes, where $q \in \{1, \ldots, Q\}$, $k \in \{1, \ldots, K\}$ and Q could equal to K. The set of Q>1 TCI state group IDs/indexes or the set of Q>1 TCI field IDs/indexes could be indicated in higher layer parameter BWP-UplinkDedicated or SRS-ResourceGroup or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

For another example, the UE could receive from the network, e.g., via higher layer RRC, MAC CE, or DCI based signaling, a set of S>1 SRS resource group IDs/indexes each corresponding to a configured SRS resource group in the S>1 SRS resource groups provided by SRS-ResourceGroup. For this case, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields in the MAC CE or DCI indicating the Q>1 groups of Rel. 17 unified TCI states could be associated to the SRS resource group with the group ID/index having the same value as the k-th entry in the set of K>1 SRS resource group IDs/indexes, where $q \in \{1, \ldots, Q\}$, $k \in \{1, \ldots, K\}$ and Q could equal to K. The set of K>1 SRS resource group IDs/indexes could be indicated in higher layer parameter BWP-UplinkDedicated or SRS-ResourceGroup or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the K>1 SRS resource groups provided by SRS-ResourceGroup; this indication could be via RRC, MAC CE, or DCI based signaling.

For Q=2, K=2, the UE could receive from the network, e.g., via higher layer RRC, MAC CE, or DCI based signaling, a one-bit flag indicator. For example, if the one-bit flag indicator is set to "1," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource group or the SRS resource group with the lowest group ID/index in the K=2 SRS resource groups provided by SRS-ResourceGroup, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource group or the SRS resource group with the highest group ID/index in the K=2 SRS resource groups provided by SRS-ResourceGroup, or vice versa.

If the one-bit flag indicator is set to "0," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the second SRS resource group or the SRS resource group with the highest group ID/index in the K=2 SRS resource groups provided by SRS-ResourceGroup, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the first SRS resource group or the SRS resource group with the lowest group ID/index in the K=2 SRS resource groups provided by SRS-ResourceGroup, or vice versa. The one-bit flag indicator could be indicated in higher layer parameter BWP-UplinkDedicated or SRS-ResourceGroup or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, a SRS resource group ID/index (e.g., provided by SRS-ResourceGroupId) could be indicated/included in a group of indicated Rel. 17 unified TCI states, e.g., in a higher layer parameter TCI-State-Group, from the Q>1 groups of Rel. 17 unified TCI states. Alternatively, a SRS resource group ID/index (e.g., provided by SRS-ResourceGroupId) could be indicated/included in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states.

For this case, the group of Rel. 17 unified TCI state or the TCI field indicating a group of Rel. 17 unified TCI states is associated to the SRS resource group ID/index indicated therein, and therefore, the corresponding SRS resource group provided by SRS-ResourceGroup. Alternatively, a TCI state group ID/index of a group of indicated Rel. 17 unified TCI states from the Q>1 groups of Rel. 17 unified TCI states or a TCI field ID/index of a "transmission configuration indication field in the Q>1 "transmission configuration indication" fields in a MAC CE or DCI indicating the Q>1 groups of Rel. 17 unified TCI states could be indicated/included in a SRS resource group, e.g., in the corresponding higher layer parameter SRS-ResourceGroup, from the K>1 configured SRS resource groups.

For this case, the SRS resource group is associated to the TCI state group ID/index or the TCI field ID/index indicated therein, and therefore, the corresponding group of indicated Rel. 17 unified TCI states or the TCI field indicating the corresponding group of Rel. 17 unified TCI states. Optionally, an entity ID/index could be indicated/included in a group of indicated Rel. 17 unified TCI states, e.g., in the higher layer parameter TCI-State-Group, from the Q>1 groups of Rel. 17 unified TCI states, or in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states, or in a SRS resource group, e.g., in the corresponding higher layer parameter SRS-ResourceGroup, from the K>1 configured SRS resource groups. A group of indicated Rel. 17 unified TCI states or a TCI field indicating a group of Rel. 17 unified TCI states is associated to a SRS resource group if they are associated with a same entity ID/index. Here, an entity ID/index could be a one-bit flag indicator, a PCI value, a CORESETPoolIndex value, a TRP ID/index value, a CORESET ID/index value, and etc.

In one example, wherein the number of SRS resources configured/provided by the network is R>1 (e.g., R=2 for two antenna panels equipped at the UE) with each configured SRS resource associated with at least one antenna panel at the UE, following examples can be provided.

In one example, the first group of indicated Rel. 17 unified TCI states or the group of indicated Rel. 17 unified TCI states with the lowest (or highest) group ID/index in the Q>1 groups of Rel. 17 unified TCI states or the first "transmission configuration indication" field in the Q>1 "transmission configuration indication" fields in a MAC CE or DCI indicating the Q>1 groups of Rel. 17 unified TCI states or the TCI field with the lowest (or the highest) TCI field ID/index in the Q>1 TCI fields in a MAC CE or DCI indicating the Q>1 groups of Rel. 17 unified TCI states could be associated to the first SRS resource or the SRS resource with the lowest resource ID/index in the R>1 SRS resources provided by SRS-Resource, the second group of indicated Rel. 17 unified TCI states or the group of indicated Rel. 17 unified TCI states with the second lowest (or second highest) group ID/index in the Q>1 groups of Rel. 17 unified TCI states or the second "transmission configuration indication" field in the Q>1 "transmission configuration indication" fields in the MAC CE or DCI indicating the Q>1 groups of Rel. 17 unified TCI states or the TCI field with the second lowest (or second highest) TCI field ID/index in the Q>1 TCI fields in the MAC CE or DCI indicating the Q>1 groups of Rel. 17 unified TCI states could be associated to the second SRS resource or the SRS resource with the second lowest resource ID/index in the R>1 SRS resources provided by SRS-Resource, and so on, and the last (or the Q-th) group of indicated Rel. 17 unified TCI states or the group of indicated Rel. 17 unified TCI states with the highest (or lowest) group ID/index in the Q>1 groups of Rel. 17 unified TCI states or the last (or the Q-th) "transmission configuration indication" field in the Q>1 "transmission configuration indication" fields in the MAC CE or DCI indicating the Q>1 groups of Rel. 17 unified TCI states or the TCI field with the highest (or lowest) TCI field ID/index in the Q>1 TCI fields in the MAC CE or DCI indicating the Q>1 groups of Rel. 17 unified TCI states could be associated to the last (or the R-th) SRS resource or the SRS resource with the highest resource ID/index in the R>1 SRS resources provided by SRS-Resource, where Q could equal to R. That is, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields indicated in the MAC CE or DCI indicating the Q>1 groups of Rel. 17 unified TCI states could be associated to the r-th SRS resource or the SRS resource with the r-th lowest resource ID/index in the R>1 SRS resources provided by SRS-Resource, where $q \in \{1, \ldots, Q\}$, $r \in \{1, \ldots, R\}$ and Q could equal to R. For Q=2, R=2, the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration fields" in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource or the SRS resource with the lowest resource ID/index in the R=2 SRS resources provided by SRS-Resource, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource or the SRS resource with the highest resource ID/index in the R=2 SRS resources provided by SRS-Resource.

In another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the R>1 SRS resources provided by SRS-Resource; this indication could be via RRC, MAC CE, or DCI based signaling.

For example, the UE could receive from the network, e.g., via higher layer RRC, MAC CE, or DCI based signaling, a set of Q>1 TCI state group IDs/indexes or Q>1 TCI field IDs/indexes each corresponding to a group of indicated Rel. 17 unified TCI states. For this case, the r-th SRS resource or the SRS resource with the r-th lowest (or highest) resource ID/index in the R>1 SRS resources provided by SRS-Resource could be associated to the group of indicated Rel. 17 unified TCI states with the group ID/index having the same value as the q-th entry in the set of Q>1 TCI state group IDs/indexes or the "transmission configuration indication" field indicating a group of Rel. 17 unified TCI states with the TCI field ID/index having the same value as the q-th entry in the set of Q>1 TCI field IDs/indexes, where $q \in \{1, \ldots, Q\}$, $r \in \{1, \ldots, R\}$ and Q could equal to R. The set of Q>1 TCI state group IDs/indexes or the set of Q>1 TCI field IDs/indexes could be indicated in higher layer parameter BWP-UplinkDedicated or SRS-Resource or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

For another example, the UE could receive from the network, e.g., via higher layer RRC, MAC CE, or DCI based signaling, a set of R>1 SRS resource IDs/indexes each corresponding to a configured SRS resource in the R>1 SRS resources provided by SRS-Resource. For this case, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields in the MAC CE or DCI indicating the Q>1 groups of Rel. 17 unified TCI states could be associated to the SRS resource with the resource ID/index having the same value as the r-th entry in the set of R>1 SRS resource IDs/indexes, where $q\in\{1, \ldots, Q\}$, $r\in\{1, \ldots, R\}$ and Q could equal to R. The set of R>1 SRS resource IDs/indexes could be indicated in higher layer parameter BWP-UplinkDedicated or SRS-Resource or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the R>1 SRS resources provided by SRS-Resource; this indication could be via RRC, MAC CE, or DCI based signaling. For Q=2, R=2, the UE could receive from the network, e.g., via higher layer RRC, MAC CE, or DCI based signaling, a one-bit flag indicator.

For example, if the one-bit flag indicator is set to "1," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource or the SRS resource with the lowest resource ID/index in the R=2 SRS resources provided by SRS-Resource, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource or the SRS resource with the highest resource ID/index in the R=2 SRS resources provided by SRS-Resource, or vice versa.

If the one-bit flag indicator is set to "0," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the second SRS resource or the SRS resource with the highest resource ID/index in the R=2 SRS resources provided by SRS-Resource, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the first SRS resource or the SRS resource with the lowest resource ID/index in the R=2 SRS resources provided by SRS-Resource, or vice versa.

The one-bit flag indicator could be indicated in higher layer parameter BWP-UplinkDedicated or SRS-Resource or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, a SRS resource ID/index (e.g., provided by SRS-Resource) could be indicated/included in a group of indicated Rel. 17 unified TCI states, e.g., in a higher layer parameter TCI-State-Group, from the Q>1 groups of Rel. 17 unified TCI states. Alternatively, a SRS resource ID/index (e.g., provided by SRS-ResourceId) could be indicated/included in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states. For this case, the group of Rel. 17 unified TCI state or the TCI field indicating a group of Rel. 17 unified TCI states is associated to the SRS resource ID/index indicated therein, and therefore, the corresponding SRS resource provided by SRS-Resource.

Alternatively, a TCI state group ID/index of a group of indicated Rel. 17 unified TCI states from the Q>1 groups of Rel. 17 unified TCI states or a TCI field ID/index of a "transmission configuration indication" field in the Q>1 "transmission configuration indication" fields in a MAC CE or DCI indicating the Q>1 groups of Rel. 17 unified TCI states could be indicated/included in a SRS resource, e.g., in the corresponding higher layer parameter SRS-Resource, from the R>1 configured SRS resources.

For this case, the SRS resource is associated to the TCI state group ID/index or the TCI field ID/index indicated therein, and therefore, the corresponding group of indicated Rel. 17 unified TCI states or the TCI field indicating the corresponding group of Rel. 17 unified TCI states. Optionally, an entity ID/index could be indicated/included in a group of indicated Rel. 17 unified TCI states, e.g., in the higher layer parameter TCI-State-Group, from the Q>1 groups of Rel. 17 unified TCI states, or in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states, or in a SRS resource, e.g., in the corresponding higher layer parameter SRS-Resource, from the R>1 configured SRS resources. A group of indicated Rel. 17 unified TCI states or a TCI field indicating a group of Rel.

17 unified TCI states is associated to a SRS resource if they are associated with a same entity ID/index. Here, an entity ID/index could be a one-bit flag indicator, a PCI value, a CORESETPoolIndex value, a TRP ID/index value, a CORESET ID/index value, and etc.

In one embodiment, one or more entity IDs/indexes could be indicated in the MAC CE or DCI format (e.g., DCI format 1_1 or 1_2 with or without DL assignment) for unified TCI state indication, wherein the Q>1 groups of Rel. 17 unified TCI states with each group indicating/containing V≥1 Rel. 17 unified TCI states are indicated. Each entity ID/index could be a PCI value, a CORESETPoolIndex value, a CORESETGroupIndex value, a PCI index pointing/corresponding to an entry in a list/set/pool of PCIs higher layer configured to the UE, a TRP ID/index value, a one-bit flag indicator or etc. Each entity ID/index could be associated with/to at least one of the Q>1 groups of Rel. 17 unified TCI states or Q>1 TCI fields.

For instance, Q>1 entity IDs/indexes corresponding to PCIs/PCI indexes/CORESETPoolIndex values/CORESETGroupIndex values could be indicated in the MAC CE or DCI for unified TCI state indication, wherein the Q>1 groups of Rel. 17 unified TCI states with each group indicating/containing V≥1 Rel. 17 unified TCI states are indicated. For this case, the q-th entity ID/index or the q-th lowest (or the q-th highest) entity ID/index in the Q>1 entity IDs/indexes could be associated with/to the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th “transmission configuration indication” field in the Q>1 “transmission configuration indication” fields in a MAC CE or DCI indicating the Q>1 groups of Rel. 17 unified TCI states or the TCI field with the q-th lowest (or the q-th highest) TCI field ID/index in the Q>1 TCI fields indicated in the MAC CE or DCI indicating the Q>1 groups of Rel. 17 unified TCI states, where q∈{1, . . . , Q}.

A UE could follow the group based uplink beam indication format as described in examples to configure the spatial domain transmit filter(s) for simultaneous multi-panel transmission according to at least one of following examples.

The UE receives from the network a higher layer parameter denoted by groupBasedUplinkBeamIndicationSchemeB. The higher layer parameter groupBasedUplinkBeamIndicationSchemeB could be indicated in the MAC CE or DCI (e.g., DCI format 1_1 or 1_2 with or without DL assignment) for unified TCI state indication or SRS-Config or SRS-ResourceSet or SRS-Resource. If the groupBasedUplinkBeamIndicationSchemeB is set to “enabled,” the UE may follow the group based uplink beam indication format as described in examples to configure the spatial domain transmit filter(s) for simultaneous multi-panel transmission.

If the indicated Rel. 17 unified TCI states correspond to joint DL and UL TCI states, separate UL TCI states or a combination of joint DL and UL TCI states and separate UL TCI states, the UE may follow the group based uplink beam indication format as described in examples to configure the spatial domain transmit filter(s) for simultaneous multi-panel transmission.

If the higher layer parameter groupBasedUplinkBeamIndicationSchemeB is set to “enabled” and the indicated Rel. 17 unified TCI states correspond to joint DL and UL TCI states, separate UL TCI states or a combination of joint DL and UL TCI states and separate UL TCI states, the UE may follow the group based uplink beam indication format as described in examples to configure the spatial domain transmit filter(s) for simultaneous multi-panel transmission.

To support simultaneous multi-panel transmission, various design options of SRI/TPMI indication are considered in the present disclosure.

In one embodiment, a UE could be provided/configured by the network, e.g., via higher layer RRC signaling, MAC CE or DCI based signaling, G'≥1 groups of SRIs/TPMIs with each group indicating/containing T'>1 SRIs/TPMIs. For instance, the G'≥1 groups of SRIs/TPMIs could be indicated in the MAC CE or DCI format (e.g., DCI format 1_1 or 1_2 with or without DL assignment) for unified TCI state/beam indication. The UE could use the same or different precoders determined according to the T'>1 SRIs/TPMIs indicated in a same group to simultaneously transmit various uplink channels/signals such as PUCCHs, PUSCHs or SRSs to the network/TRPs. The UE could be provided by the network the values of G' or T'. If G'≤Gmax' or T'≤Tmax', where Gmax' represents the maximum number of groups of SRIs/TPMIs that can be indicated and Tmax' is the maximum number of SRIs/TPMIs that can be indicated in a group, the UE could also be provided by the network the values of Gmax' or Tmax'. The G' groups of SRIs/TPMIs could be ordered according to a performance metric from high to low (or from low to high), wherein the performance metric could be throughput, radio link quality or error rate, specific to a group.

For instance, the UE could assume that the precoder(s) determined according to the first group of T' indicated SRIs/TPMIs to simultaneously transmit uplink channels/signals may result in the highest (or lowest) performance metric, the precoder(s) determined according to the second group of T' indicated SRIs/TPMIs to simultaneously transmit uplink channels/signals may result in the second highest (or second lowest) performance metric, and so on, and the precoder(s) determined according to the last (or the G'-th) group of T' indicated SRIs/TPMIs to simultaneously transmit uplink channels/signals may result in the lowest (or highest) performance metric.

The association between T'>1 SRIs/TPMIs in a group and the P>1 SRS resource configurations/settings could follow those specified in examples mentioned in the present disclosure by considering the T'>1 SRIs/TPMIs in a group instead of the T>1 Rel. 17 unified TCI states in a group. The association between the T'>1 SRIs/TPMIs in a group and the S>1 SRS resource sets could follow those specified in examples mentioned in the present disclosure by considering the T'>1 SRIs/TPMIs in a group instead of the T>1 Rel. 17 unified TCI states in a group. The association between the T'>1 SRIs/TPMIs in a group and the K>1 SRS resource groups could follow those specified in examples in the present disclosure by considering the T'>1 SRIs/TPMIs in a group instead of the T>1 Rel. 17 unified TCI states in a group.

Furthermore, the association between the T'>1 SRIs/TPMIs in a group and the one or more SRS resources in a SRS resource set could follow those specified in examples mentioned in the present disclosure by considering the T'>1 SRIs/TPMIs in a group instead of the T>1 Rel. 17 unified TCI states in a group.

Furthermore, one or more entity IDs/indexes could be indicated in the MAC CE or DCI format (e.g., DCI format 1_1 or 1_2 with or without DL assignment) for SRIs/TPMIs indication, wherein the G'>1 groups of SRIs/TPMIs with each group indicating/containing T'>1 SRIs/TPMIs are indicated. Each entity ID/index could be a PCI value, a CORESETPoolIndex value, a CORESETGroupIndex value, a PCI index pointing/corresponding to an entry in a list/set/pool of PCIs higher layer configured to the UE, a TRP ID/index value, a one-bit flag indicator or etc. Each entity ID/index could be associated with/to at least one of the T'>1 SRIs/TPMIs indicated in a group. For instance, T'>1 entity IDs/indexes corresponding to PCIs/PCI indexes/CORESETPoolIndex values/CORESETGroupIndex values could be indicated in the MAC CE or DCI for SRIs/TPMIs indication, wherein the G'>1 groups of SRIs/TPMIs with each group indicating/containing T'>1 SRIs/TPMIs are indicated. For this case, the u'-th entity ID/index or the u'-th lowest (or the u'-th highest) entity ID/index in the T'>1 entity IDs/indexes could be associated with/to the u'-th indicated Rel. 17 unified TCI state or the indicated Rel. 17 unified TCI state u' or the indicated Rel. 17 unified TCI state with the u'-th lowest (or the u'-th highest) TCI state ID/index in a group of T'>1 Rel. 17 unified TCI states, where u' ∈{1, . . . , T'}.

A UE could receive from the network a higher layer parameter denoted by groupBasedUplinkResourceIndicationSchemeA. The higher layer parameter groupBasedUplinkResourceIndicationSchemeA could be indicated in the MAC CE or DCI (e.g., DCI format 1_1 or 1_2 with or without DL assignment) for SRI/TPMI indication or SRS-Config or SRS-ResourceSet or SRS-Resource. If the groupBasedUplinkResourceIndicationSchemeA is set to "enabled," the UE may follow the group based SRI/TPMI indication format as described in mentioned examples to configure the transmit precoders for simultaneous multi-panel transmission.

In one embodiment, a UE could be provided/configured by the network, e.g., higher layer RRC signaling, MAC CE or DCI based signaling, Q'>1 groups of SRIs/TPMIs with each group indicating/containing V'>1 SRIs/TPMIs. For instance, the Q'>1 groups of SRIs/TPMIs could be indicated in the MAC CE or DCI format (e.g., DCI format 1_1 or 1_2 with or without DL assignment) for unified TCI state/beam indication. The UE could use the same or different precoders determined according to the SRIs/TPMIs indicated across different groups (e.g., across the Q'>1 groups) to simultaneously transmit various uplink channels/signals such as PUCCHs, PUSCHs or SRSs to the network/TRPs. The UE could be provided by the network the values of Q' or V'. If Q'≤Qmax' or V'≤Vmax', where Qmax' represents the maximum number of groups of SRIs/TPMIs that can be indicated in a MAC CE or DCI and Vmax' is the maximum number of SRIs/TPMIs that can be indicated in a group, the UE could also be provided by the network the values of Qmax' or Vmax'.

The association between Q'>1 groups of SRIs/TPMIs and the P>1 SRS resource configurations/settings could follow those specified in examples mentioned in the present disclosure by considering the Q'>1 groups of SRIs/TPMIs instead of the Q>1 groups of Rel. 17 unified TCI states or Q>1 TCI fields. The association between the Q'>1 groups of SRIs/TPMIs and the S>1 SRS resource sets could follow those specified in examples mentioned in the present disclosure by considering the Q'>1 groups of SRIs/TPMIs instead of the Q>1 groups of Rel. 17 unified TCI states or Q>1 TCI fields. The association between the Q'>1 groups of SRIs/TPMIs and the K>1 SRS resource groups could follow those specified in examples mentioned in the present disclosure by considering the Q'>1 groups of SRIs/TPMIs instead of the Q>1 groups of Rel. 17 unified TCI states or Q>1 TCI fields. Furthermore, the association between the Q'>1 groups of SRIs/TPMIs and the one or more SRS resources in a SRS resource set could follow those specified in examples mentioned in the present disclosure by considering the Q'>1 groups of SRIs/TPMIs instead of the Q>1 groups of Rel. 17 unified TCI states or Q>1 TCI fields.

Furthermore, one or more entity IDs/indexes could be indicated in the MAC CE or DCI format (e.g., DCI format 1_1 or 1_2 with or without DL assignment) for SRIs/TPMIs indication, wherein the Q'>1 groups of SRIs/TPMIs with each group indicating/containing V'>1 SRIs/TPMIs are indicated. Each entity ID/index could be a PCI value, a CORESETPoolIndex value, a CORESETGroupIndex value, a PCI index pointing/corresponding to an entry in a list/set/pool of PCIs higher layer configured to the UE, a TRP ID/index value, a one-bit flag indicator or etc. Each entity ID/index could be associated with/to at least one of the Q'>1 groups of SRIs/TPMIs.

For instance, Q'>1 entity IDs/indexes corresponding to PCIs/PCI indexes/CORESETPoolIndex values/CORESETGroupIndex values could be indicated in the MAC CE or DCI for SRIs/TPMIs indication, wherein the Q'>1 groups of SRIs/TPMIs with each group indicating/containing V'≥1 SRIs/TPMIs are indicated. For this case, the q'-th entity ID/index or the q'-th lowest (or the q'-th highest) entity ID/index in the Q'>1 entity IDs/indexes could be associated with/to the q'-th group of SRIs/TPMIs or the group q' of SRIs/TPMIs or the group of SRIs/TPMIs with the q'-th lowest (or the q'-th highest) group ID/index in the Q'>1 groups of SRIs/TPMIs, where q'∈{1, . . . , Q'}.

A UE could receive from the network a higher layer parameter denoted by groupBasedUplinkResourceIndicationSchemeB. The higher layer parameter groupBasedUplinkResourceIndicationSchemeB could be indicated in the MAC CE or DCI (e.g., DCI format 1_1 or 1_2 with or without DL assignment) for SRI/TPMI indication or SRS-Config or SRS-ResourceSet or SRS-Resource. If the groupBasedUplinkResourceIndicationSchemeA is set to "enabled," the UE may follow the group based SRI/TPMI indication format as described in examples to configure the transmit precoders for simultaneous multi-panel transmission.

To support simultaneous multi-panel transmission, various design options of uplink beam indication are considered in the present disclosure.

In one embodiment, a UE could be provided/configured by the network, e.g., via MAC CE or DCI (e.g., DCI format 1_1 or 1_2 with or without DL assignment) based signaling through the higher layer parameter TCI-State_r17, Q>1 groups of Rel. 17 unified TCI states with each group indicating/containing V≥1 Rel. 17 unified TCI states. For instance, the DCI format (e.g., DCI format 1_1 or 1_2 with or without DL assignment) for unified TCI state/beam indication could include a "transmission configuration indication" field containing one or more codepoints activated by a MAC CE activation command from a set/pool of codepoints. For this case, each codepoint could indicate Q>1 groups of Rel. 17 unified TCI states with each group indicating/containing V≥1 Rel. 17 unified TCI states.

Alternatively, the DCI format (e.g., DCI format 1_1 or 1_2 with or without DL assignment) for unified TCI state/beam indication could include Q>1 "transmission configuration indication" fields each containing at least one codepoint activated by a MAC CE activation command from a set/pool of codepoints. For this case, each codepoint could indicate a group of V≥1 Rel. 17 unified TCI states. Furthermore, the V≥1 Rel. 17 unified TCI states indicated in a group could correspond to V≥1 joint DL and UL TCI states, V≥1 separate UL TCI states or a combination of V≥1 joint DL and UL TCI states and separate UL TCI states. The UE could use the same or different spatial filters determined according to the reference signals (e.g., the spatial filters are spatially related to the reference signals) provided in the Rel. 17 unified TCI states indicated across different groups (e.g., across the Q>1 groups) to simultaneously transmit various uplink channels/signals such as PUCCHs, PUSCHs or SRSs to the network/TRPs. The UE could be provided by the network the values of Q or V. If Q≤Qmax or V≤Vmax, where Qmax represents the maximum number of groups of Rel. 17 unified TCI states or TCI fields that can be indicated in a MAC CE or DCI and Vmax is the maximum number of Rel. 17 unified TCI states that can be indicated in a group or a TCI field, the UE could also be provided by the network the values of Qmax or Vmax.

The Q>1 groups of indicated Rel. 17 unified TCI states or the Q>1 "transmission configuration indication" fields in a MAC CE or DCI indicating the Q>1 groups of Rel. 17 unified TCI states could be associated to one or more SRS resources, which could be configured according to examples mentioned in the present disclosure.

In one example, wherein the number of SRS resource configurations/settings configured/provided by the network is P>1 (e.g., P=2 for two antenna panels equipped at the UE) with each configured SRS resource configuration/setting associated with at least one antenna panel at the UE, following examples can be provided.

In one example, the first group of indicated Rel. 17 unified TCI states or the group of indicated Rel. 17 unified TCI states with the lowest (or highest) group ID/index in the Q>1 groups of Rel. 17 unified TCI states or the first "transmission configuration indication" field in the Q>1 "transmission configuration indication" fields in a MAC CE or DCI indicating the Q>1 groups of Rel. 17 unified TCI states or the TCI field with the lowest (or the highest) TCI field ID/index in the Q>1 TCI fields in a MAC CE or DCI indicating the Q>1 groups of Rel. 17 unified TCI states could be associated to the first SRS resource configuration/setting or the SRS resource configuration/setting with the lowest configuration ID/index in the P>1 SRS resource configurations/settings provided by SRS-Config, the second group of indicated Rel. 17 unified TCI states or the group of indicated Rel. 17 unified TCI states with the second lowest (or second highest) group ID/index in the Q>1 groups of Rel. 17 unified TCI states or the second "transmission configuration indication" field in the Q>1 "transmission configuration indication" fields in the MAC CE or DCI indicating the Q>1 groups of Rel. 17 unified TCI states or the TCI field with the second lowest (or second highest) TCI field ID/index in the Q>1 TCI fields in the MAC CE or DCI indicating the Q>1 groups of Rel. 17 unified TCI states could be associated to the second SRS resource configuration/setting or the SRS resource configuration/setting with the second lowest configuration ID/index in the P>1 SRS resource configurations/settings provided by SRS-Config, and so on, and the last (or the Q-th) group of indicated Rel. 17 unified TCI states or the group of indicated Rel. 17 unified TCI states with the highest (or lowest) group ID/index in the Q>1 groups of Rel. 17 unified TCI states or the last (or the Q-th) "transmission configuration indication" field in the Q>1 "transmission configuration indication" fields in the MAC CE or DCI indicating the Q>1 groups of Rel. 17 unified TCI states or the TCI field with the highest (or lowest) TCI field ID/index in the Q>1 TCI fields in the MAC CE or DCI indicating the Q>1 groups of Rel. 17 unified TCI states could be associated to the last (or the P-th) SRS resource configuration/setting or the SRS resource configuration/setting with the highest configuration ID/index in the P>1 SRS resource configurations/settings provided by SRS-Config, where Q could equal to P. That is, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields indicated in the MAC CE or DCI indicating the Q>1 groups of Rel. 17 unified TCI states could be associated to the p-th SRS resource configuration/setting or the SRS resource configuration/setting with the p-th lowest configuration ID/index in the P>1 SRS resource configurations/settings provided by SRS-Config, where $q \in \{1, \ldots, Q\}$, $p \in \{1, \ldots, P\}$ and Q could equal to P. For Q=2, P=2, the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration fields" in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource configuration/setting or the SRS resource configuration/setting with the lowest configuration ID/index in the P=2 SRS resource configurations/settings provided by SRS-Config, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource configuration/setting or the SRS resource configuration/setting with the highest configuration ID/index in the P=2 SRS resource configurations/settings provided by SRS-Config.

In another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the P>1 SRS resource configurations/settings provided by SRS-Config; this indication could be via RRC, MAC CE, or DCI based signaling.

For example, the UE could receive from the network, e.g., via higher layer RRC, MAC CE, or DCI based signaling, a set of Q>1 TCI state group IDs/indexes or Q>1 TCI field IDs/indexes each corresponding to a group of indicated Rel. 17 unified TCI states. For this case, the p-th SRS resource configuration/setting or the SRS resource configuration/setting with the p-th lowest (or highest) configuration ID/index in the P>1 SRS resource configurations/settings provided by SRS-Config could be associated to the group of indicated Rel. 17 unified TCI states with the group ID/index having the same value as the q-th entry in the set of Q>1 TCI state group IDs/indexes or the "transmission configuration indication" field indicating a group of Rel. 17 unified TCI states with the TCI field ID/index having the same value as the q-th entry in the set of Q>1 TCI field IDs/indexes, where q∈{1, . . . , Q}, p∈{1, . . . , P} and Q could equal to P. The set of Q>1 TCI state group IDs/indexes or the set of Q>1 TCI field IDs/indexes could be indicated in higher layer parameter BWP-UplinkDedicated or SRS-Config or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

For another example, the UE could receive from the network, e.g., via higher layer RRC, MAC CE, or DCI based signaling, a set of P>1 SRS resource configuration/setting IDs/indexes each corresponding to a configured SRS resource configuration/setting in the P>1 SRS resource configurations/settings provided by SRS-Config. For this case, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields in the MAC CE or DCI indicating the Q>1 groups of Rel. 17 unified TCI states could be associated to the SRS resource configuration/setting with the configuration ID/index having the same value as the p-th entry in the set of P>1 SRS resource configuration IDs/indexes, where q∈{1, . . . , Q}, p∈{1, . . . , P} and Q could equal to P. The set of P>1 SRS resource configuration IDs/indexes could be indicated in higher layer parameter BWP-UplinkDedicated or SRS-Config or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the P>1 SRS resource configurations/settings provided by SRS-Config; this indication could be via RRC, MAC CE, or DCI based signaling. For Q=2, P=2, the UE could receive from the network, e.g., via higher layer RRC, MAC CE, or DCI based signaling, a one-bit flag indicator.

For example, if the one-bit flag indicator is set to "1," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource configuration/setting or the SRS resource configuration/setting with the lowest configuration ID/index in the P=2 SRS resource configurations/settings provided by SRS-Config, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource configuration/setting or the SRS resource configuration/setting with the highest configuration ID/index in the P=2 SRS resource configurations/settings provided by SRS-Config, or vice versa. If the one-bit flag indicator is set to "0," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the second SRS resource configuration/setting or the SRS resource configuration/setting with the highest configuration ID/index in the P=2 SRS resource configurations/settings provided by SRS-Config, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the first SRS resource configuration/setting or the SRS resource configuration/setting with the lowest configuration ID/index in the P=2 SRS resource configurations/settings provided by SRS-Config, or vice versa. The one-bit flag indicator could be indicated in higher layer parameter BWP-UplinkDedicated or SRS-Config or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, a SRS resource configuration ID/index (e.g., provided by SRS-ConfigId) could be indicated/included in a group of indicated Rel. 17 unified TCI states, e.g., in a higher layer parameter TCI-State-Group, from the Q>1 groups of Rel. 17 unified TCI states. Alternatively, a SRS resource configuration ID/index (e.g., provided by SRS-ConfigId) could be indicated/included in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states. For this case, the group of Rel. 17 unified TCI state or the TCI field indicating a group of Rel. 17 unified TCI states is associated to the SRS resource configuration ID/index indicated therein, and therefore, the corresponding SRS resource configuration/setting provided by SRS-Config.

Alternatively, a TCI state group ID/index of a group of indicated Rel. 17 unified TCI states from the Q>1 groups of Rel. 17 unified TCI states or a TCI field ID/index of a "transmission configuration indication" field in the Q>1 "transmission configuration indication" fields in a MAC CE or DCI indicating the Q>1 groups of Rel. 17 unified TCI states could be indicated/included in a SRS resource configuration/setting, e.g., in the corresponding higher layer parameter SRS-Config, from the P>1 configured SRS resource configurations/settings. For this case, the SRS resource configuration/setting is associated to the TCI state group ID/index or the TCI field ID/index indicated therein, and therefore, the corresponding group of indicated Rel. 17 unified TCI states or the TCI field indicating the corresponding group of indicated Rel. 17 unified TCI states. Optionally, an entity ID/index could be indicated/included in a group of indicated Rel. 17 unified TCI states, e.g., in the higher layer parameter TCI-State-Group, from the Q>1 groups of Rel. 17 unified TCI states, or in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states, or in a SRS resource configuration/setting, e.g., in the corresponding higher layer parameter SRS-Config, from the P>1 configured SRS resource configurations/settings. A group of indicated Rel. 17 unified TCI states or a TCI field indicating a group of Rel. 17 unified TCI states is associated to a SRS resource configuration/setting if they are associated with a same entity ID/index. Here, an entity ID/index could be a one-bit flag indicator, a PCI value, a CORESETPoolIndex value, a TRP ID/index value, a CORESET ID/index value, and etc.

In one example, wherein the number of SRS resource sets configured/provided by the network is S>1 (e.g., S=2 for two antenna panels equipped at the UE) with each configured SRS resource set associated with at least one antenna panel at the UE, following examples can be provided.

In one example, the first group of indicated Rel. 17 unified TCI states or the group of indicated Rel. 17 unified TCI states with the lowest (or highest) group ID/index in the Q>1 groups of Rel. 17 unified TCI states or the first "transmission configuration indication" field in the Q>1 "transmission configuration indication" fields in a MAC CE or DCI indicating the Q>1 groups of Rel. 17 unified TCI states or the TCI field with the lowest (or the highest) TCI field ID/index in the Q>1 TCI fields in a MAC CE or DCI indicating the Q>1 groups of Rel. 17 unified TCI states could be associated to the first SRS resource set or the SRS resource set with the lowest set ID/index in the S>1 SRS resource sets provided by SRS-ResourceSet, the second group of indicated Rel. 17 unified TCI states or the group of indicated Rel. 17 unified TCI states with the second lowest (or second highest) group ID/index in the Q>1 groups of Rel. 17 unified TCI states or the second "transmission configuration indication" field in the Q>1 "transmission configuration indication" fields in the MAC CE or DCI indicating the Q>1 groups of Rel. 17 unified TCI states or the TCI field with the second lowest (or second highest) TCI field ID/index in the Q>1 TCI fields in the MAC CE or DCI indicating the Q>1 groups of Rel. 17 unified TCI states could be associated to the second SRS resource set or the SRS resource set with the second lowest set ID/index in the S>1 SRS resource sets provided by SRS-ResourceSet, and so on, and the last (or the Q-th) group of indicated Rel. 17 unified TCI states or the group of indicated Rel. 17 unified TCI states with the highest (or lowest) group ID/index in the Q>1 groups of Rel. 17 unified TCI states or the last (or the Q-th) "transmission configuration indication" field in the Q>1 "transmission configuration indication" fields in the MAC CE or DCI indicating the Q>1 groups of Rel. 17 unified TCI states or the TCI field with the highest (or lowest) TCI field ID/index in the Q>1 TCI fields in the MAC CE or DCI indicating the Q>1 groups of Rel. 17 unified TCI states could be associated to the last (or the S-th) SRS resource set or the SRS resource set with the highest set ID/index in the S>1 SRS resource sets provided by SRS-ResourceSet, where Q could equal to S.

That is, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields indicated in the MAC CE or DCI indicating the Q>1 groups of Rel. 17 unified TCI states could be associated to the s-th SRS resource set or the SRS resource set with the s-th lowest set ID/index in the S>1 SRS resource sets provided by SRS-ResourceSet, where $q \in \{1, \ldots, Q\}$, $s \in \{1, \ldots, S\}$ and Q could equal to S.

For Q=2, S=2, the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration fields" in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource set or the SRS resource set with the lowest set ID/index in the S=2 SRS resource sets provided by SRS-ResourceSet, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource set or the SRS resource set with the highest set ID/index in the S=2 SRS resource sets provided by SRS-ResourceSet.

In another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the S>1 SRS resource sets provided by SRS-ResourceSet; this indication could be via RRC, MAC CE, or DCI based signaling.

For example, the UE could receive from the network, e.g., via higher layer RRC, MAC CE, or DCI based signaling, a set of Q>1 TCI state group IDs/indexes or Q>1 TCI field IDs/indexes each corresponding to a group of indicated Rel. 17 unified TCI states. For this case, the s-th SRS resource set or the SRS resource set with the s-th lowest (or highest) set ID/index in the S>1 SRS resource sets provided by SRS-ResourceSet could be associated to the group of indicated Rel. 17 unified TCI states with the group ID/index having the same value as the q-th entry in the set of Q>1 TCI state group IDs/indexes or the "transmission configuration indication" field indicating a group of Rel. 17 unified TCI states with the TCI field ID/index having the same value as the q-th entry in the set of Q>1 TCI field IDs/indexes, where q∈{1, . . . , Q}, s∈{1, . . . , S} and Q could equal to S. The set of Q>1 TCI state group IDs/indexes or the set of Q>1 TCI field IDs/indexes could be indicated in higher layer parameter BWP-UplinkDedicated or SRS-ResourceSet or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

For another example, the UE could receive from the network, e.g., via higher layer RRC, MAC CE, or DCI based signaling, a set of S>1 SRS resource set IDs/indexes each corresponding to a configured SRS resource set in the S>1 SRS resource sets provided by SRS-ResourceSet. For this case, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields in the MAC CE or DCI indicating the Q>1 groups of Rel. 17 unified TCI states could be associated to the SRS resource set with the set ID/index having the same value as the s-th entry in the set of S>1 SRS resource set IDs/indexes, where q∈{1, . . . , Q}, s∈{1, . . . , S} and Q could equal to S. The set of S>1 SRS resource set IDs/indexes could be indicated in higher layer parameter BWP-UplinkDedicated or SRS-ResourceSet or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the S>1 SRS resource sets provided by SRS-ResourceSet; this indication could be via RRC, MAC CE, or DCI based signaling. For Q=2, S=2, the UE could receive from the network, e.g., via higher layer RRC, MAC CE, or DCI based signaling, a one-bit flag indicator. For example, if the one-bit flag indicator is set to "1," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource set or the SRS resource set with the lowest set ID/index in the S=2 SRS resource sets provided by SRS-ResourceSet, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource set or the SRS resource set with the highest set ID/index in the S=2 SRS resource sets provided by SRS-ResourceSet, or vice versa. If the one-bit flag indicator is set to "0," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the second SRS resource set or the SRS resource set with the highest set ID/index in the S=2 SRS resource sets provided by SRS-ResourceSet, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the first SRS resource set or the SRS resource set with the lowest set ID/index in the S=2 SRS resource sets provided by SRS-ResourceSet, or vice versa.

The one-bit flag indicator could be indicated in higher layer parameter BWP-UplinkDedicated or SRS-ResourceSet or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, a SRS resource set ID/index (e.g., provided by SRS-ResourceSetId) could be indicated/included in a group of indicated Rel. 17 unified TCI states, e.g., in a higher layer parameter TCI-State-Group, from the Q>1 groups of Rel. 17 unified TCI states. Alternatively, a SRS resource set ID/index (e.g., provided by SRS-ResourceSetId) could be indicated/included in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states.

For this case, the group of Rel. 17 unified TCI state or the TCI field indicating a group of Rel. 17 unified TCI states is associated to the SRS resource set ID/index indicated therein, and therefore, the corresponding SRS resource set provided by SRS-ResourceSet. Alternatively, a TCI state group ID/index of a group of indicated Rel. 17 unified TCI states from the Q>1 groups of Rel. 17 unified TCI states or a TCI field ID/index of a "transmission configuration Indication" field in the Q>1 "transmission configuration indication" fields in a MAC CE or DCI indicating the Q>1 groups of Rel. 17 unified TCI states could be indicated/included in a SRS resource set, e.g., in the corresponding higher layer parameter SRS-ResourceSet, from the S>1 configured SRS resource sets.

For this case, the SRS resource set is associated to the TCI state group ID/index or the TCI field ID/index indicated therein, and therefore, the corresponding group of indicated Rel. 17 unified TCI states or the TCI field indicating the corresponding group of Rel. 17 unified TCI states. Optionally, an entity ID/index could be indicated/included in a group of indicated Rel. 17 unified TCI states, e.g., in the higher layer parameter TCI-State-Group, from the Q>1 groups of Rel. 17 unified TCI states, or in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states, or in a SRS resource set, e.g., in the corresponding higher layer parameter SRS-ResourceSet, from the S>1 configured SRS resource sets. A group of indicated Rel. 17 unified TCI states or a TCI field indicating a group of Rel. 17 unified TCI states is associated to a SRS resource set if they are associated with a same entity ID/index. Here, an entity ID/index could be a one-bit flag indicator, a PCI value, a CORESETPoolIndex value, a TRP ID/index value, a CORESET ID/index value, and etc.

In one example, wherein the number of SRS resource groups configured/provided by the network is K>1 (e.g., K=2 for two antenna panels equipped at the UE) with each configured SRS resource group associated with at least one antenna panel at the UE, following examples can be provided.

In one example, the first group of indicated Rel. 17 unified TCI states or the group of indicated Rel. 17 unified TCI states with the lowest (or highest) group ID/index in the Q>1 groups of Rel. 17 unified TCI states or the first "transmission configuration indication" field in the Q>1 "transmission configuration indication" fields in a MAC CE or DCI indicating the Q>1 groups of Rel. 17 unified TCI states or the TCI field with the lowest (or the highest) TCI field ID/index in the Q>1 TCI fields in a MAC CE or DCI indicating the Q>1 groups of Rel. 17 unified TCI states could be associated to the first SRS resource group or the SRS resource group with the lowest group ID/index in the K>1 SRS resource groups provided by SRS-ResourceGroup, the second group of indicated Rel. 17 unified TCI states or the group of indicated Rel. 17 unified TCI states with the second lowest (or second highest) group ID/index in the Q>1 groups of Rel. 17 unified TCI states or the second "transmission configuration indication" field in the Q>1 "transmission configuration indication" fields in the MAC CE or DCI indicating the Q>1 groups of Rel. 17 unified TCI states or the TCI field with the second lowest (or second highest) TCI field ID/index in the Q>1 TCI fields in the MAC CE or DCI indicating the Q>1 groups of Rel. 17 unified TCI states could be associated to the second SRS resource group or the SRS resource group with the second lowest group ID/index in the K>1 SRS resource groups provided by SRS-ResourceGroup, and so on, and the last (or the Q-th) group of indicated Rel. 17 unified TCI states or the group of indicated Rel. 17 unified TCI states with the highest (or lowest) group ID/index in the Q>1 groups of Rel. 17 unified TCI states or the last (or the Q-th) "transmission configuration indication" field in the Q>1 "transmission configuration indication" fields in the MAC CE or DCI indicating the Q>1 groups of Rel. 17 unified TCI states or the TCI field with the highest (or lowest) TCI field ID/index in the Q>1 TCI fields in the MAC CE or DCI indicating the Q>1 groups of Rel. 17 unified TCI states could be associated to the last (or the K-th) SRS resource group or the SRS resource group with the highest group ID/index in the K>1 SRS resource groups provided by SRS-ResourceGroup, where Q could equal to K.

That is, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields indicated in the MAC CE or DCI indicating the Q>1 groups of Rel. 17 unified TCI states could be associated to the k-th SRS resource group or the SRS resource group with the k-th lowest group ID/index in the K>1 SRS resource groups provided by SRS-ResourceGroup, where $q \in \{1, \ldots, Q\}$, $k \in \{1, \ldots, K\}$ and Q could equal to K. For Q=2, K=2, the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration fields" in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource group or the SRS resource group with the lowest group ID/index in the K=2 SRS resource groups provided by SRS-ResourceGroup, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource group or the SRS resource group with the highest group ID/index in the K=2 SRS resource groups provided by SRS-ResourceGroup.

In another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the K>1 SRS resource groups provided by SRS-ResourceGroup; this indication could be via RRC, MAC CE, or DCI based signaling.

For example, the UE could receive from the network, e.g., via higher layer RRC, MAC CE, or DCI based signaling, a set of Q>1 TCI state group IDs/indexes or Q>1 TCI field IDs/indexes each corresponding to a group of indicated Rel. 17 unified TCI states. For this case, the k-th SRS resource group or the SRS resource group with the k-th lowest (or highest) group ID/index in the K>1 SRS resource groups provided by SRS-ResourceGroup could be associated to the group of indicated Rel. 17 unified TCI states with the group ID/index having the same value as the q-th entry in the set of Q>1 TCI state group IDs/indexes or the "transmission configuration indication" field indicating a group of Rel. 17 unified TCI states with the TCI field ID/index having the same value as the q-th entry in the set of Q>1 TCI field IDs/indexes, where q∈{1, . . . , Q}, k∈{1, . . . , K} and Q could equal to K. The set of Q>1 TCI state group IDs/indexes or the set of Q>1 TCI field IDs/indexes could be indicated in higher layer parameter BWP-UplinkDedicated or SRS-ResourceGroup or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

For another example, the UE could receive from the network, e.g., via higher layer RRC, MAC CE, or DCI based signaling, a set of S>1 SRS resource group IDs/indexes each corresponding to a configured SRS resource group in the S>1 SRS resource groups provided by SRS-ResourceGroup. For this case, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields in the MAC CE or DCI indicating the Q>1 groups of Rel. 17 unified TCI states could be associated to the SRS resource group with the group ID/index having the same value as the k-th entry in the set of K>1 SRS resource group IDs/indexes, where q∈{1, . . . , Q}, k∈{1, . . . , K} and Q could equal to K. The set of K>1 SRS resource group IDs/indexes could be indicated in higher layer parameter BWP-UplinkDedicated or SRS-ResourceGroup or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the K>1 SRS resource groups provided by SRS-ResourceGroup; this indication could be via RRC, MAC CE, or DCI based signaling. For Q=2, K=2, the UE could receive from the network, e.g., via higher layer RRC, MAC CE, or DCI based signaling, a one-bit flag indicator.

For example, if the one-bit flag indicator is set to "1," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource group or the SRS resource group with the lowest group ID/index in the K=2 SRS resource groups provided by SRS-ResourceGroup, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource group or the SRS resource group with the highest group ID/index in the K=2 SRS resource groups provided by SRS-Resource-Group, or vice versa. If the one-bit flag indicator is set to "0," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the second SRS resource group or the SRS resource group with the highest group ID/index in the K=2 SRS resource groups provided by SRS-ResourceGroup, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the first SRS resource group or the SRS resource group with the lowest group ID/index in the K=2 SRS resource groups provided by SRS-Resource-Group, or vice versa. The one-bit flag indicator could be indicated in higher layer parameter BWP-UplinkDedicated or SRS-ResourceGroup or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, a SRS resource group ID/index (e.g., provided by SRS-ResourceGroupId) could be indicated/included in a group of indicated Rel. 17 unified TCI states, e.g., in a higher layer parameter TCI-State-Group, from the Q>1 groups of Rel. 17 unified TCI states. Alternatively, a SRS resource group ID/index (e.g., provided by SRS-ResourceGroupId) could be indicated/included in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states.

For this case, the group of Rel. 17 unified TCI state or the TCI field indicating a group of Rel. 17 unified TCI states is associated to the SRS resource group ID/index indicated therein, and therefore, the corresponding SRS resource group provided by SRS-ResourceGroup. Alternatively, a TCI state group ID/index of a group of indicated Rel. 17 unified TCI states from the Q>1 groups of Rel. 17 unified TCI states or a TCI field ID/index of a "transmission configuration indication" field in the Q>1 "transmission configuration indication" fields in a MAC CE or DCI indicating the Q>1 groups of Rel. 17 unified TCI states could be indicated/included in a SRS resource group, e.g., in the corresponding higher layer parameter SRS-Resource-Group, from the K>1 configured SRS resource groups.

For this case, the SRS resource group is associated to the TCI state group ID/index or the TCI field ID/index indicated therein, and therefore, the corresponding group of indicated Rel. 17 unified TCI states or the TCI field indicating the corresponding group of Rel. 17 unified TCI states. Optionally, an entity ID/index could be indicated/included in a group of indicated Rel. 17 unified TCI states, e.g., in the higher layer parameter TCI-State-Group, from the Q>1 groups of Rel. 17 unified TCI states, or in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states, or in a SRS resource group, e.g., in the corresponding higher layer parameter SRS-ResourceGroup, from the K>1 configured SRS resource groups. A group of indicated Rel. 17 unified TCI states or a TCI field indicating a group of Rel. 17 unified TCI states is associated to a SRS resource group if they are associated with a same entity ID/index. Here, an entity ID/index could be a one-bit flag indicator, a PCI value, a CORESETPoolIndex value, a TRP ID/index value, a CORESET ID/index value, and etc.

In one example, wherein the number of SRS resources configured/provided by the network is R>1 (e.g., R=2 for two antenna panels equipped at the UE) with each configured SRS resource associated with at least one antenna panel at the UE, following examples can be provided.

In one example, the first group of indicated Rel. 17 unified TCI states or the group of indicated Rel. 17 unified TCI states with the lowest (or highest) group ID/index in the Q>1 groups of Rel. 17 unified TCI states or the first "transmission configuration indication" field in the Q>1 "transmission configuration indication" fields in a MAC CE or DCI indicating the Q>1 groups of Rel. 17 unified TCI states or the TCI field with the lowest (or the highest) TCI field ID/index in the Q>1 TCI fields in a MAC CE or DCI indicating the Q>1 groups of Rel. 17 unified TCI states could be associated to the first SRS resource or the SRS resource with the lowest resource ID/index in the R>1 SRS resources provided by SRS-Resource, the second group of indicated Rel. 17 unified TCI states or the group of indicated Rel. 17 unified TCI states with the second lowest (or second highest) group ID/index in the Q>1 groups of Rel. 17 unified TCI states or the second "transmission configuration indication" field in the Q>1 "transmission configuration indication" fields in the MAC CE or DCI indicating the Q>1 groups of Rel. 17 unified TCI states or the TCI field with the second lowest (or second highest) TCI field ID/index in the Q>1 TCI fields in the MAC CE or DCI indicating the Q>1 groups of Rel. 17 unified TCI states could be associated to the second SRS resource or the SRS resource with the second lowest resource ID/index in the R>1 SRS resources provided by SRS-Resource, and so on, and the last (or the Q-th) group of indicated Rel. 17 unified TCI states or the group of indicated Rel. 17 unified TCI states with the highest (or lowest) group ID/index in the Q>1 groups of Rel. 17 unified TCI states or the last (or the Q-th) "transmission configuration indication" field in the Q>1 "transmission configuration indication" fields in the MAC CE or DCI indicating the Q>1 groups of Rel. 17 unified TCI states or the TCI field with the highest (or lowest) TCI field ID/index in the Q>1 TCI fields in the MAC CE or DCI indicating the Q>1 groups of Rel. 17 unified TCI states could be associated to the last (or the R-th) SRS resource or the SRS resource with the highest resource ID/index in the R>1 SRS resources provided by SRS-Resource, where Q could equal to R. That is, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields indicated in the MAC CE or DCI indicating the Q>1 groups of Rel. 17 unified TCI states could be associated to the r-th SRS resource or the SRS resource with the r-th lowest resource ID/index in the R>1 SRS resources provided by SRS-Resource, where $q \in \{1, \ldots, Q\}$, $r \in \{1, \ldots, R\}$ and Q could equal to R. For Q=2, R=2, the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration fields" in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource or the SRS resource with the lowest resource ID/index in the R=2 SRS resources provided by SRS-Resource, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource or the SRS resource with the highest resource ID/index in the R=2 SRS resources provided by SRS-Resource.

In another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the R>1 SRS resources provided by SRS-Resource; this indication could be via RRC, MAC CE, or DCI based signaling. For example, the UE could receive from the network, e.g., via higher layer RRC, MAC CE, or DCI based signaling, a set of Q>1 TCI state group IDs/indexes or Q>1 TCI field IDs/indexes each corresponding to a group of indicated Rel. 17 unified TCI states.

For this case, the r-th SRS resource or the SRS resource with the r-th lowest (or highest) resource ID/index in the R>1 SRS resources provided by SRS-Resource could be associated to the group of indicated Rel. 17 unified TCI states with the group ID/index having the same value as the q-th entry in the set of Q>1 TCI state group IDs/indexes or the "transmission configuration indication" field indicating a group of Rel. 17 unified TCI states with the TCI field ID/index having the same value as the q-th entry in the set of Q>1 TCI field IDs/indexes, where q∈{1, . . . , Q}, r∈{1, . . . , R} and Q could equal to R. The set of Q>1 TCI state group IDs/indexes or the set of Q>1 TCI field IDs/indexes could be indicated in higher layer parameter BWP-UplinkDedicated or SRS-Resource or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

For another example, the UE could receive from the network, e.g., via higher layer RRC, MAC CE, or DCI based signaling, a set of R>1 SRS resource IDs/indexes each corresponding to a configured SRS resource in the R>1 SRS resources provided by SRS-Resource. For this case, the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields in the MAC CE or DCI indicating the Q>1 groups of Rel. 17 unified TCI states could be associated to the SRS resource with the resource ID/index having the same value as the r-th entry in the set of R>1 SRS resource IDs/indexes, where q∈{1, . . . , Q}, r∈{1, . . . , R} and Q could equal to R. The set of R>1 SRS resource IDs/indexes could be indicated in higher layer parameter BWP-UplinkDedicated or SRS-Resource or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, the UE could be indicated by the network the association/mapping between the Q>1 groups of Rel. 17 unified TCI states or the Q>1 "transmission configuration indication" fields in a MAC CE or DCI indicating the Q>1 groups of Rel. 17 unified TCI states and the R>1 SRS resources provided by SRS-Resource; this indication could be via RRC, MAC CE, or DCI based signaling.

For Q=2, R=2, the UE could receive from the network, e.g., via higher layer RRC, MAC CE, or DCI based signaling, a one-bit flag indicator. For example, if the one-bit flag indicator is set to "1," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the first SRS resource or the SRS resource with the lowest resource ID/index in the R=2 SRS resources provided by SRS-Resource, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the second SRS resource or the SRS resource with the highest resource ID/index in the R=2 SRS resources provided by SRS-Resource, or vice versa.

If the one-bit flag indicator is set to "0," the first group of indicated Rel. 17 unified TCI states or the group of indicated Rel. 17 unified TCI states with the lowest (or highest) group ID/index in the Q=2 groups of Rel. 17 unified TCI states or the first "transmission configuration indication" field in the Q=2 "transmission configuration indication" fields in a MAC CE or DCI indicating the Q=2 groups of Rel. 17 unified TCI states or the TCI field with the lowest (or highest) TCI field ID/index in the Q=2 TCI fields in the MAC CE or DCI indicating the Q=2 groups of Rel. 17 unified TCI states could be associated to the second SRS resource or the SRS resource with the highest resource ID/index in the R=2 SRS resources provided by SRS-Resource, and the second group of indicated Rel. 17 unified TCI states or the group of indicated Rel. 17 unified TCI states with the highest (or lowest) group ID/index in the Q=2 groups of Rel. 17 unified TCI states or the second "transmission configuration indication" field in the Q=2 "transmission configuration indication" fields in the MAC CE or DCI indicating the Q=2 groups of Rel. 17 unified TCI states or the TCI field with the highest (or lowest) TCI field ID/index in the Q=2 TCI fields in the MAC CE or DCI indicating the Q=2 groups of Rel. 17 unified TCI states could be associated to the first SRS resource or the SRS resource with the lowest resource ID/index in the R=2 SRS resources provided by SRS-Resource, or vice versa.

The one-bit flag indicator could be indicated in higher layer parameter BWP-UplinkDedicated or SRS-Resource or the DCI format (e.g., DCI format 1_1 or 1_2 with or without DL assignment) that indicates the corresponding Q>1 groups of Rel. 17 unified TCI states or the Q>1 TCI fields (e.g., provided by "transmission configuration indication") indicating the corresponding Q>1 groups of Rel. 17 unified TCI states in the DCI format (e.g., DCI format 1_1 or 1_2 with or without DL assignment).

In yet another example, a SRS resource ID/index (e.g., provided by SRS-Resource) could be indicated/included in a group of indicated Rel. 17 unified TCI states, e.g., in a higher layer parameter TCI-State-Group, from the Q>1 groups of Rel. 17 unified TCI states.

Alternatively, a SRS resource ID/index (e.g., provided by SRS-ResourceId) could be indicated/included in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states. For this case, the group of Rel. 17 unified TCI state or the TCI field indicating a group of Rel. 17 unified TCI states is associated to the SRS resource ID/index indicated therein, and therefore, the corresponding SRS resource provided by SRS-Resource.

Alternatively, a TCI state group ID/index of a group of indicated Rel. 17 unified TCI states from the Q>1 groups of Rel. 17 unified TCI states or a TCI field ID/index of a "transmission configuration indication" field in the Q>1 "transmission configuration indication" fields in a MAC CE or DCI indicating the Q>1 groups of Rel. 17 unified TCI states could be indicated/included in a SRS resource, e.g., in the corresponding higher layer parameter SRS-Resource, from the R>1 configured SRS resources.

For this case, the SRS resource is associated to the TCI state group ID/index or the TCI field ID/index indicated therein, and therefore, the corresponding group of indicated Rel. 17 unified TCI states or the TCI field indicating the corresponding group of Rel. 17 unified TCI states. Optionally, an entity ID/index could be indicated/included in a group of indicated Rel. 17 unified TCI states, e.g., in the higher layer parameter TCI-State-Group, from the Q>1 groups of Rel. 17 unified TCI states, or in a TCI field (e.g., in the corresponding "transmission configuration indication" field) indicating a group of Rel. 17 unified TCI states, from the Q>1 "transmission configuration indication" fields in a MAC CE or DCI indicating the Q>1 groups of Rel. 17 unified TCI states, or in a SRS resource, e.g., in the corresponding higher layer parameter SRS-Resource, from the R>1 configured SRS resources.

A group of indicated Rel. 17 unified TCI states or a TCI field indicating a group of Rel. 17 unified TCI states is associated to a SRS resource if they are associated with a same entity ID/index. Here, an entity ID/index could be a one-bit flag indicator, a PCI value, a CORESETPoolIndex value, a TRP ID/index value, a CORESET ID/index value, and etc.

Furthermore, one or more entity IDs/indexes could be indicated in the MAC CE or DCI format (e.g., DCI format 1_1 or 1_2 with or without DL assignment) for unified TCI state indication, wherein the Q>1 groups of Rel. 17 unified TCI states with each group indicating/containing V≥1 Rel. 17 unified TCI states are indicated. Each entity ID/index could be a PCI value, a CORESETPoolIndex value, a CORESETGroupIndex value, a PCI index pointing/corresponding to an entry in a list/set/pool of PCIs higher layer configured to the UE, a TRP ID/index value, a one-bit flag indicator or etc. Each entity ID/index could be associated with/to at least one of the Q>1 groups of Rel. 17 unified TCI states or Q>1 TCI fields.

For instance, Q>1 entity IDs/indexes corresponding to PCIs/PCI indexes/CORESETPoolIndex values/CORESETGroupIndex values could be indicated in the MAC CE or DCI for unified TCI state indication, wherein the Q>1 groups of Rel. 17 unified TCI states with each group indicating/containing V≥1 Rel. 17 unified TCI states are indicated. For this case, the q-th entity ID/index or the q-th lowest (or the q-th highest) entity ID/index in the Q>1 entity IDs/indexes could be associated with/to the q-th group of indicated Rel. 17 unified TCI states or the group q of indicated Rel. 17 unified TCI states or the group of indicated Rel. 17 unified TCI states with the q-th lowest (or the q-th highest) group ID/index in the Q>1 groups of Rel. 17 unified TCI states or the q-th "transmission configuration indication" field in the Q>1 "transmission configuration indication" fields in a MAC CE or DCI indicating the Q>1 groups of Rel. 17 unified TCI states or the TCI field with the q-th lowest (or the q-th highest) TCI field ID/index in the Q>1 TCI fields indicated in the MAC CE or DCI indicating the Q>1 groups of Rel. 17 unified TCI states, where $q \in \{1, \ldots, Q\}$.

A UE could follow the group based uplink beam indication format as described in mentioned examples to configure the spatial domain transmit filter(s) for simultaneous multi-panel transmission according to at least one of following examples.

In one example, the UE receives from the network a higher layer parameter denoted by groupBasedUplinkBeamIndicationSchemeB. The higher layer parameter groupBasedUplinkBeamIndicationSchemeB could be indicated in the MAC CE or DCI (e.g., DCI format 1_1 or 1_2 with or without DL assignment) for unified TCI state indication or SRS-Config or SRS-ResourceSet or SRS-Resource. If the groupBasedUplinkBeamIndicationSchemeB is set to "enabled," the UE may follow the group based uplink beam indication format as described in examples to configure the spatial domain transmit filter(s) for simultaneous multi-panel transmission.

In one embodiment, if the indicated Rel. 17 unified TCI states correspond to joint DL and UL TCI states, separate UL TCI states or a combination of joint DL and UL TCI states and separate UL TCI states, the UE may follow the group based uplink beam indication format as described in examples to configure the spatial domain transmit filter(s) for simultaneous multi-panel transmission.

In one embodiment, Ii the higher layer parameter groupBasedUplinkBeamIndicationSchemeB is set to "enabled" and the indicated Rel. 17 unified TCI states correspond to joint DL and UL TCI states, separate UL TCI states or a combination of joint DL and UL TCI states and separate UL TCI states, the UE may follow the group based uplink beam indication format as described in examples mentioned in the present disclosure to configure the spatial domain transmit filter(s) for simultaneous multi-panel transmission.

In one embodiment, a UE could receive from the network, e.g., G≥1 MAC CEs or DCIs (e.g., DCI format 1_1 or 1_2 with or without DL assignment), each indicating one or more Rel. 17 unified TCI states through the higher layer parameter TCI-State_r17. Each of the G≥1 MAC CEs or DCIs for unified TCI state indication could be associated with a different CORESETPoolIndex value (if provided by PDCCH-Config) configured for one or more CORESETs in a multi-DCI based multi-TRP system or a different PCI value or a different CORESETGroupIndex value (if provided by PDCCH-Config) configured for one or more CORESETs in a single-DCI based multi-TRP system. Furthermore, a MAC CE or DCI for unified TCI state indication could include one or more "transmission configuration indication" fields each containing one or more codepoints activated by a MAC CE activation command from a set/pool of codepoints.

Each codepoint could indicate one or more Rel. 17 unified TCI states, which, e.g., could correspond to joint DL and UL TCI states or separate UL TCI states or a combination of joint DL and UL TCI states and separate UL TCI states. An association indicator could be indicated in a MAC CE or DCI for unified TCI state indication.

Alternatively, an association indicator could be indicated in a TCI field, e.g., in the corresponding "transmission configuration indication" field. The UE could use the same or different spatial filters determined according to the reference signals (e.g., the spatial filters are spatially related to the reference signals) provided in the Rel. 17 unified TCI states indicated across different MAC CEs/DCIs for unified TCI state indication having the same value of association indicator or across different TCI fields—indicated in one or more MAC CEs/DCIs for unified TCI state indication—having the same value of association indicator.

When the association indicator is indicated in TCI fields, the association between W>1 TCI fields having the same value of association indicator and the P>1 SRS resource configurations/settings could follow those specified in examples mentioned in the present disclosure by considering the W>1 TCI fields having the same value of association indicator instead of the Q>1 TCI fields. The association between the W>1 TCI fields having the same value of association indicator and the S>1 SRS resource sets could follow those specified in examples mentioned in the present disclosure by considering the W>1 TCI fields having the same value of association indicator instead of the Q>1 TCI fields. The association between the W>1 TCI fields having the same value of association indicator and the K>1 SRS resource groups could follow those specified in examples mentioned in the present disclosure by considering the W>1 TCI fields having the same value of association indicator instead of the Q>1 TCI fields.

Furthermore, the association between the W>1 TCI fields having the same value of association indicator and the one or more SRS resources in a SRS resource set could follow those specified in examples mentioned in the present disclosure by considering the W>1 TCI fields having the same value of association indicator instead of the Q>1 TCI fields.

When the association indicator is indicated in MAC CEs/DCIs for unified TCI state indication, the G≥1 MAC CEs/DCIs for unified TCI state indication having the same value of association indicator could be associated to one or more SRS resources, which could be configured according examples mentioned in the present disclosure. Throughout the present disclosure, unless otherwise specified, a MAC CE/DCI for unified TCI state indication is from the G≥1 MAC CEs/DCIs for unified TCI state indication having the same value of association indicator.

In one example, wherein the number of SRS resource configurations/settings configured/provided by the network is P>1 (e.g., P=2 for two antenna panels equipped at the UE) with each configured SRS resource configuration/setting associated with at least one antenna panel at the UE, following examples can be provided.

In one example, the first MAC CE/DCI for unified TCI state indication or the MAC CE/DCI for unified TCI state indication associated with the lowest (or highest) entity ID/index in the G≥1 MAC CEs/DCIs for unified TCI state indication having the same value of association indicator could be associated to the first SRS resource configuration/setting or the SRS resource configuration/setting with the lowest configuration ID/index in the P>1 SRS resource configurations/settings provided by SRS-Config, the second MAC CE/DCI for unified TCI state indication or the MAC CE/DCI for unified TCI state indication associated with the second lowest (or second highest) entity ID/index in the G≥1 MAC CEs/DCIs for unified TCI state indication having the same value of association indicator could be associated to the second SRS resource configuration/setting or the SRS resource configuration/setting with the second lowest configuration ID/index in the P>1 SRS resource configurations/settings provided by SRS-Config, and so on, and the last (or G-th) MAC CE/DCI for unified TCI state indication or the MAC CE/DCI for unified TCI state indication associated with the highest (or lowest) entity ID/index in the G≥1 MAC CEs/DCIs for unified TCI state indication having the same value of association indicator could be associated to the last (or the P-th) SRS resource configuration/setting or the SRS resource configuration/setting with the highest configuration ID/index in the P>1 SRS resource configurations/settings provided by SRS-Config, where G could equal to P. That is, the g-th MAC CE/DCI for unified TCI state indication or the MAC CE/DCI for unified TCI state indication associated with the g-th lowest (or the g-th highest) entity ID/index in the G≥1 MAC CEs/DCIs for unified TCI state indication having the same value of association indicator could be associated to the p-th SRS resource configuration/setting or the SRS resource configuration/setting with the p-th lowest configuration ID/index in the P>1 SRS resource configurations/settings provided by SRS-Config, where g∈{1, . . . , G}, p∈{1, . . . , P} and G could equal to P. For G=2, P=2, the first MAC CE/DCI for unified TCI state indication or the MAC CE/DCI for unified TCI state indication associated with the lowest (or highest) entity ID/index in the G=2 MAC CEs/DCIs for unified TCI state indication having the same value of association indicator could be associated to the first SRS resource configuration/setting or the SRS resource configuration/setting with the lowest configuration ID/index in the P=2 SRS resource configurations/settings provided by SRS-Config, and the second MAC CE/DCI for unified TCI state indication or the MAC CE/DCI for unified TCI state indication associated with the highest (or lowest) entity ID/index in the G=2 MAC CEs/DCIs for unified TCI state indication having the same value of association indicator could be associated to the second SRS resource configuration/setting or the SRS resource configuration/setting with the highest configuration ID/index in the P=2 SRS resource configurations/settings provided by SRS-Config. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In another example, the UE could be indicated by the network the association/mapping between the G≥1 MAC CEs/DCIs for unified TCI state indication having the same value of association indicator and the P>1 SRS resource configurations/settings provided by SRS-Config; this indication could be via RRC, MAC CE, or DCI based signaling.

For example, the UE could receive from the network, e.g., via higher layer RRC, MAC CE, or DCI based signaling, a set of G≥1 entity IDs/indexes each corresponding to a MAC CE or DCI for unified TCI state indication from the G≥1 MAC CEs/DCIs for unified TCI state indication having the same value of association indicator. For this case, the p-th SRS resource configuration/setting or the SRS resource configuration/setting with the p-th lowest (or highest) configuration ID/index in the P>1 SRS resource configurations/settings provided by SRS-Config could be associated to the MAC CE/DCI for unified TCI state indication with the entity ID/index having the same value as the g-th entry in the set of G≥1 entity IDs/indexes, where g∈{1, . . . , G}, p∈{1, . . . , P} and G could equal to P.

The set of G≥1 entity IDs/indexes could be indicated in higher layer parameter BWP-UplinkDedicated or SRS-Config or one or more of the MAC CEs or DCI formats (e.g., DCI format 1_1 or 1_2 with or without DL assignment) for unified TCI state indication having the same value of association indicator or the TCI fields (e.g., provided by "transmission configuration indication") in one or more of the MAC CEs or DCI formats (e.g., DCI format 1_1 or 1_2 with or without DL assignment) for unified TCI state indication having the same value of association indicator.

For another example, the UE could receive from the network, e.g., via higher layer RRC, MAC CE, or DCI based signaling, a set of P>1 SRS resource configuration/setting IDs/indexes each corresponding to a configured SRS resource configuration/setting in the P>1 SRS resource configurations/settings provided by SRS-Config. For this case, the g-th MAC CE/DCI for unified TCI state indication or the MAC CE/DCI for unified TCI state indication associated with the g-th lowest (or the g-th highest) entity ID/index in the G≥1 MAC CEs/DCIs for unified TCI state indication having the same value of association indicator could be associated to the SRS resource configuration/setting with the configuration ID/index having the same value as the p-th entry in the set of P>1 SRS resource configuration IDs/indexes, where g∈{1, . . . , G}, p∈{1, . . . , P} and G could equal to P.

The set of P>1 SRS resource configuration IDs/indexes could be indicated in higher layer parameter BWP-UplinkDedicated or SRS-Config or one or more of the MAC CEs or DCI formats (e.g., DCI format 1_1 or 1_2 with or without DL assignment) for unified TCI state indication having the same value of association indicator or the TCI fields (e.g., provided by "transmission configuration indication") in one or more of the MAC CEs or DCI formats (e.g., DCI format 1_1 or 1_2 with or without DL assignment) for unified TCI state indication having the same value of association indicator. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In yet another example, the UE could be indicated by the network the association/mapping between the G≥1 MAC CEs/DCIs for unified TCI state indication having the same value of association indicator and the P>1 SRS resource configurations/settings provided by SRS-Config; this indication could be via RRC, MAC CE, or DCI based signaling. For G=2, P=2, the UE could receive from the network, e.g., via higher layer RRC, MAC CE, or DCI based signaling, a one-bit flag indicator.

For example, if the one-bit flag indicator is set to "1," the first MAC CE/DCI for unified TCI state indication or the MAC CE/DCI for unified TCI state indication associated with the lowest (or highest) entity ID/index in the G=2 MAC CEs/DCIs for unified TCI state indication having the same value of association indicator could be associated to the first SRS resource configuration/setting or the SRS resource configuration/setting with the lowest configuration ID/index in the P=2 SRS resource configurations/settings provided by SRS-Config, and the second MAC CE/DCI for unified TCI state indication or the MAC CE/DCI for unified TCI state indication associated with the highest (or lowest) entity ID/index in the G=2 MAC CEs/DCIs for unified TCI state indication having the same value of association indicator could be associated to the second SRS resource configuration/setting or the SRS resource configuration/setting with the highest configuration ID/index in the P=2 SRS resource configurations/settings provided by SRS-Config, or vice versa.

If the one-bit flag indicator is set to "0," the first MAC CE/DCI for unified TCI state indication or the MAC CE/DCI for unified TCI state indication associated with the lowest (or highest) entity ID/index in the G=2 MAC CEs/DCIs for unified TCI state indication having the same value of association indicator could be associated to the second SRS resource configuration/setting or the SRS resource configuration/setting with the highest configuration ID/index in the P=2 SRS resource configurations/settings provided by SRS-Config, and the second MAC CE/DCI for unified TCI state indication or the MAC CE/DCI for unified TCI state indication associated with the highest (or lowest) entity ID/index in the G=2 MAC CEs/DCIs for unified TCI state indication having the same value of association indicator could be associated to the first SRS resource configuration/setting or the SRS resource configuration/setting with the lowest configuration ID/index in the P=2 SRS resource configurations/settings provided by SRS-Config, or vice versa.

The one-bit flag indicator could be indicated in higher layer parameter BWP-UplinkDedicated or SRS-Config or one or more of the MAC CEs or DCI formats (e.g., DCI format 1_1 or 1_2 with or without DL assignment) for unified TCI state indication having the same value of association indicator or the TCI fields (e.g., provided by "transmission configuration indication") in one or more of the MAC CEs or DCI formats (e.g., DCI format 1_1 or 1_2 with or without DL assignment) for unified TCI state indication having the same value of association indicator. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In yet another example, a SRS resource configuration ID/index (e.g., provided by SRS-ConfigId) could be indicated/included in a MAC CE or DCI for unified TCI state indication. For instance, the SRS resource configuration ID/index (e.g., provided by SRS-ConfigId) could be indicated/included in a TCI field (e.g., in the corresponding "transmission configuration indication" field) in the MAC CE or DCI for unified TCI state indication. For this case, the MAC CE or DCI for unified TCI state indication is associated to the SRS resource configuration ID/index indicated therein, and therefore, the corresponding SRS resource configuration/setting provided by SRS-Config.

Alternatively, an entity ID/index associated to a MAC CE or DCI for unified TCI state indication could be indicated/included in a SRS resource configuration/setting, e.g., in the corresponding higher layer parameter SRS-Config, from the P>1 configured SRS resource configurations/settings. For this case, the SRS resource configuration/setting is associated to the entity ID/index indicated therein, and therefore, the corresponding MAC CE or DCI format for unified TCI state indication. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In one example, wherein the number of SRS resource sets configured/provided by the network is S>1 (e.g., S=2 for two antenna panels equipped at the UE) with each configured SRS resource set associated with at least one antenna panel at the UE, following examples can be provided.

In one example, the first MAC CE/DCI for unified TCI state indication or the MAC CE/DCI for unified TCI state indication associated with the lowest (or highest) entity ID/index in the G≥1 MAC CEs/DCIs for unified TCI state indication having the same value of association indicator could be associated to the first SRS resource set or the SRS resource set with the lowest set ID/index in the S>1 SRS resource sets provided by SRS-ResourceSet, the second MAC CE/DCI for unified TCI state indication or the MAC CE/DCI for unified TCI state indication associated with the second lowest (or second highest) entity ID/index in the G≥1 MAC CEs/DCIs for unified TCI state indication having the same value of association indicator could be associated to the second SRS resource set or the SRS resource set with the second lowest set ID/index in the S>1 SRS resource sets provided by SRS-ResourceSet, and so on, and the last (or G-th) MAC CE/DCI for unified TCI state indication or the MAC CE/DCI for unified TCI state indication associated with the highest (or lowest) entity ID/index in the G≥1 MAC CEs/DCIs for unified TCI state indication having the same value of association indicator could be associated to the last (or the S-th) SRS resource set or the SRS resource set with the highest set ID/index in the S>1 SRS resource sets provided by SRS-ResourceSet, where G could equal to S. That is, the g-th MAC CE/DCI for unified TCI state indication or the MAC CE/DCI for unified TCI state indication associated with the g-th lowest (or the g-th highest) entity ID/index in the G≥1 MAC CEs/DCIs for unified TCI state indication having the same value of association indicator could be associated to the s-th SRS resource set or the SRS resource set with the s-th lowest set ID/index in the S>1 SRS resource sets provided by SRS-ResourceSet, where g∈{1, . . . , G}, s∈{1, . . . , S} and G could equal to S. For G=2, S=2, the first MAC CE/DCI for unified TCI state indication or the MAC CE/DCI for unified TCI state indication associated with the lowest (or highest) entity ID/index in the G=2 MAC CEs/DCIs for unified TCI state indication having the same value of association indicator could be associated to the first SRS resource set or the SRS resource set with the lowest set ID/index in the S=2 SRS resource sets provided by SRS-ResourceSet, and the second MAC CE/DCI for unified TCI state indication or the MAC CE/DCI for unified TCI state indication associated with the highest (or lowest) entity ID/index in the G=2 MAC CEs/DCIs for unified TCI state indication having the same value of association indicator could be associated to the second SRS resource set or the SRS resource set with the highest set ID/index in the S=2 SRS resource sets provided by SRS-ResourceSet. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In another example, the UE could be indicated by the network the association/mapping between the G≥1 MAC CEs/DCIs for unified TCI state indication having the same value of association indicator and the S>1 SRS resource sets provided by SRS-ResourceSet; this indication could be via RRC, MAC CE, or DCI based signaling.

For example, the UE could receive from the network, e.g., via higher layer RRC, MAC CE, or DCI based signaling, a set of G≥1 entity IDs/indexes each corresponding to a MAC CE or DCI for unified TCI state indication from the G≥1 MAC CEs/DCIs for unified TCI state indication having the same value of association indicator. For this case, the s-th SRS resource set or the SRS resource set with the s-th lowest (or highest) set ID/index in the S>1 SRS resource sets provided by SRS-ResourceSet could be associated to the MAC CE/DCI for unified TCI state indication with the entity ID/index having the same value as the g-th entry in the set of G≥1 entity IDs/indexes, where g∈{1, . . . , G}, s∈{1, . . . , S} and G could equal to S.

The set of G≥1 entity IDs/indexes could be indicated in higher layer parameter BWP-UplinkDedicated or SRS-ResourceSet or one or more of the MAC CEs or DCI formats (e.g., DCI format 1_1 or 1_2 with or without DL assignment) for unified TCI state indication having the same value of association indicator or the TCI fields (e.g., provided by "transmission configuration indication") in one or more of the MAC CEs or DCI formats (e.g., DCI format 1_1 or 1_2 with or without DL assignment) for unified TCI state indication having the same value of association indicator.

For another example, the UE could receive from the network, e.g., via higher layer RRC, MAC CE, or DCI based signaling, a set of S>1 SRS resource set IDs/indexes each corresponding to a configured SRS resource set in the S>1 SRS resource sets provided by SRS-ResourceSet. For this case, the g-th MAC CE/DCI for unified TCI state indication or the MAC CE/DCI for unified TCI state indication associated with the g-th lowest (or the g-th highest) entity ID/index in the G≥1 MAC CEs/DCIs for unified TCI state indication having the same value of association indicator could be associated to the SRS resource set with the set ID/index having the same value as the s-th entry in the set of S>1 SRS resource set IDs/indexes, where g∈{1, . . . , G}, s∈{1, . . . , S} and G could equal to S. The set of S>1 SRS resource set IDs/indexes could be indicated in higher layer parameter BWP-UplinkDedicated or SRS-ResourceSet or one or more of the MAC CEs or DCI formats (e.g., DCI format 1_1 or 1_2 with or without DL assignment) for unified TCI state indication having the same value of association indicator or the TCI fields (e.g., provided by "transmission configuration indication") in one or more of the MAC CEs or DCI formats (e.g., DCI format 1_1 or 1_2 with or without DL assignment) for unified TCI state indication having the same value of association indicator. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In yet another example, the UE could be indicated by the network the association/mapping between the G≥1 MAC CEs/DCIs for unified TCI state indication having the same value of association indicator and the S>1 SRS resource sets provided by SRS-ResourceSet; this indication could be via RRC, MAC CE, or DCI based signaling. For G=2, S=2, the UE could receive from the network, e.g., via higher layer RRC, MAC CE, or DCI based signaling, a one-bit flag indicator.

For example, if the one-bit flag indicator is set to "1," the first MAC CE/DCI for unified TCI state indication or the MAC CE/DCI for unified TCI state indication associated with the lowest (or highest) entity ID/index in the G=2 MAC CEs/DCIs for unified TCI state indication having the same value of association indicator could be associated to the first SRS resource set or the SRS resource set with the lowest set ID/index in the S=2 SRS resource sets provided by SRS-ResourceSet, and the second MAC CE/DCI for unified TCI state indication or the MAC CE/DCI for unified TCI state indication associated with the highest (or lowest) entity ID/index in the G=2 MAC CEs/DCIs for unified TCI state indication having the same value of association indicator could be associated to the second SRS resource set or the SRS resource set with the highest set ID/index in the S=2 SRS resource sets provided by SRS-ResourceSet, or vice versa.

If the one-bit flag indicator is set to "0," the first MAC CE/DCI for unified TCI state indication or the MAC CE/DCI for unified TCI state indication associated with the lowest (or highest) entity ID/index in the G=2 MAC CEs/DCIs for unified TCI state indication having the same value of association indicator could be associated to the second SRS resource set or the SRS resource set with the highest set ID/index in the S=2 SRS resource sets provided by SRS-ResourceSet, and the second MAC CE/DCI for unified TCI state indication or the MAC CE/DCI for unified TCI state indication associated with the highest (or lowest) entity ID/index in the G=2 MAC CEs/DCIs for unified TCI state indication having the same value of association indicator could be associated to the first SRS resource set or the SRS resource set with the lowest set ID/index in the S=2 SRS resource sets provided by SRS-ResourceSet, or vice versa.

The one-bit flag indicator could be indicated in higher layer parameter BWP-UplinkDedicated or SRS-ResourceSet or one or more of the MAC CEs or DCI formats (e.g., DCI format 1_1 or 1_2 with or without DL assignment) for unified TCI state indication having the same value of association indicator or the TCI fields (e.g., provided by "transmission configuration indication") in one or more of the MAC CEs or DCI formats (e.g., DCI format 1_1 or 1_2 with or without DL assignment) for unified TCI state indication having the same value of association indicator. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In yet another example, a SRS resource set ID/index (e.g., provided by SRS-ResourceSetId) could be indicated/included in a MAC CE or DCI for unified TCI state indication. For instance, the SRS resource set ID/index (e.g., provided by SRS-ResourceSetId) could be indicated/included in a TCI field (e.g., in the corresponding "transmission configuration indication" field) in the MAC CE or DCI for unified TCI state indication. For this case, the MAC CE or DCI for unified TCI state indication is associated to the SRS resource set ID/index indicated therein, and therefore, the corresponding SRS resource set provided by SRS-ResourceSet.

Alternatively, an entity ID/index associated to a MAC CE or DCI for unified TCI state indication could be indicated/included in a SRS resource set, e.g., in the corresponding higher layer parameter SRS-ResourceSet, from the S>1 configured SRS resource sets. For this case, the SRS resource set is associated to the entity ID/index indicated therein, and therefore, the corresponding MAC CE or DCI format for unified TCI state indication. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In one example, wherein the number of SRS resource groups configured/provided by the network is K>1 (e.g., K=2 for two antenna panels equipped at the UE) with each configured SRS resource group associated with at least one antenna panel at the UE, following examples can be provided.

In one example, the first MAC CE/DCI for unified TCI state indication or the MAC CE/DCI for unified TCI state indication associated with the lowest (or highest) entity ID/index in the G≥1 MAC CEs/DCIs for unified TCI state indication having the same value of association indicator could be associated to the first SRS resource group or the SRS resource group with the lowest group ID/index in the K>1 SRS resource groups provided by SRS-ResourceGroup, the second MAC CE/DCI for unified TCI state indication or the MAC CE/DCI for unified TCI state indication associated with the second lowest (or second highest) entity ID/index in the G≥1 MAC CEs/DCIs for unified TCI state indication having the same value of association indicator could be associated to the second SRS resource group or the SRS resource group with the second lowest group ID/index in the K>1 SRS resource groups provided by SRS-ResourceGroup, and so on, and the last (or G-th) MAC CE/DCI for unified TCI state indication or the MAC CE/DCI for unified TCI state indication associated with the highest (or lowest) entity ID/index in the G≥1 MAC CEs/DCIs for unified TCI state indication having the same value of association indicator could be associated to the last (or the K-th) SRS resource group or the SRS resource group with the highest group ID/index in the K>1 SRS resource groups provided by SRS-ResourceGroup, where G could equal to K. That is, the g-th MAC CE/DCI for unified TCI state indication or the MAC CE/DCI for unified TCI state indication associated with the g-th lowest (or the g-th highest) entity ID/index in the G≥1 MAC CEs/DCIs for unified TCI state indication having the same value of association indicator could be associated to the k-th SRS resource group or the SRS resource group with the k-th lowest group ID/index in the K>1 SRS resource groups provided by SRS-ResourceGroup, where g∈{1, . . . , G}, k∈{1, . . . , K} and G could equal to K. For G=2, K=2, the first MAC CE/DCI for unified TCI state indication or the MAC CE/DCI for unified TCI state indication associated with the lowest (or highest) entity ID/index in the G=2 MAC CEs/DCIs for unified TCI state indication having the same value of association indicator could be associated to the first SRS resource group or the SRS resource group with the lowest group ID/index in the K=2 SRS resource groups provided by SRS-ResourceGroup, and the second MAC CE/DCI for unified TCI state indication or the MAC CE/DCI for unified TCI state indication associated with the highest (or lowest) entity ID/index in the G=2 MAC CEs/DCIs for unified TCI state indication having the same value of association indicator could be associated to the second SRS resource group or the SRS resource group with the highest group ID/index in the K=2 SRS resource groups provided by SRS-ResourceGroup. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In another example, the UE could be indicated by the network the association/mapping between the G>1 MAC CEs/DCIs for unified TCI state indication having the same value of association indicator and the K>1 SRS resource groups provided by SRS-ResourceGroup; this indication could be via RRC, MAC CE, or DCI based signaling.

For example, the UE could receive from the network, e.g., via higher layer RRC, MAC CE, or DCI based signaling, a set of G>1 entity IDs/indexes each corresponding to a MAC CE or DCI for unified TCI state indication from the G>1 MAC CEs/DCIs for unified TCI state indication having the same value of association indicator. For this case, the k-th SRS resource group or the SRS resource group with the k-th lowest (or highest) group ID/index in the K>1 SRS resource groups provided by SRS-ResourceGroup could be associated to the MAC CE/DCI for unified TCI state indication with the entity ID/index having the same value as the g-th entry in the set of G>1 entity IDs/indexes, where g∈{1, . . . , G}, k∈{1, . . . , K} and G could equal to K. The set of G>1 entity IDs/indexes could be indicated in higher layer parameter BWP-UplinkDedicated or SRS-ResourceGroup or one or more of the MAC CEs or DCI formats (e.g., DCI format 1_1 or 1_2 with or without DL assignment) for unified TCI state indication having the same value of association indicator or the TCI fields (e.g., provided by "transmission configuration indication") in one or more of the MAC CEs or DCI formats (e.g., DCI format 1_1 or 1_2 with or without DL assignment) for unified TCI state indication having the same value of association indicator.

For another example, the UE could receive from the network, e.g., via higher layer RRC, MAC CE, or DCI based signaling, a set of K>1 SRS resource group IDs/indexes each corresponding to a configured SRS resource group in the K>1 SRS resource groups provided by SRS-ResourceGroup. For this case, the g-th MAC CE/DCI for unified TCI state indication or the MAC CE/DCI for unified TCI state indication associated with the g-th lowest (or the g-th highest) entity ID/index in the G>1 MAC CEs/DCIs for unified TCI state indication having the same value of association indicator could be associated to the SRS resource group with the group ID/index having the same value as the k-th entry in the set of K>1 SRS resource group IDs/indexes, where g∈{1, . . . , G}, k∈{1, . . . , K} and G could equal to K. The set of K>1 SRS resource group IDs/indexes could be indicated in higher layer parameter BWP-UplinkDedicated or SRS-ResourceGroup or one or more of the MAC CEs or DCI formats (e.g., DCI format 1_1 or 1_2 with or without DL assignment) for unified TCI state indication having the same value of association indicator or the TCI fields (e.g., provided by "transmission configuration indication") in one or more of the MAC CEs or DCI formats (e.g., DCI format 1_1 or 1_2 with or without DL assignment) for unified TCI state indication having the same value of association indicator. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In yet another example, the UE could be indicated by the network the association/mapping between the G>1 MAC CEs/DCIs for unified TCI state indication having the same value of association indicator and the K>1 SRS resource groups provided by SRS-ResourceGroup; this indication could be via RRC, MAC CE, or DCI based signaling. For G=2, K=2, the UE could receive from the network, e.g., via higher layer RRC, MAC CE, or DCI based signaling, a one-bit flag indicator.

For example, if the one-bit flag indicator is set to "1," the first MAC CE/DCI for unified TCI state indication or the MAC CE/DCI for unified TCI state indication associated with the lowest (or highest) entity ID/index in the G=2 MAC CEs/DCIs for unified TCI state indication having the same value of association indicator could be associated to the first SRS resource group or the SRS resource group with the lowest group ID/index in the K=2 SRS resource groups provided by SRS-ResourceGroup, and the second MAC CE/DCI for unified TCI state indication or the MAC CE/DCI for unified TCI state indication associated with the highest (or lowest) entity ID/index in the G=2 MAC CEs/DCIs for unified TCI state indication having the same value of association indicator could be associated to the second SRS resource group or the SRS resource group with the highest group ID/index in the K=2 SRS resource groups provided by SRS-ResourceGroup, or vice versa.

If the one-bit flag indicator is set to "0," the first MAC CE/DCI for unified TCI state indication or the MAC CE/DCI for unified TCI state indication associated with the lowest (or highest) entity ID/index in the G=2 MAC CEs/DCIs for unified TCI state indication having the same value of association indicator could be associated to the second SRS resource group or the SRS resource group with the highest group ID/index in the K=2 SRS resource groups provided by SRS-ResourceGroup, and the second MAC CE/DCI for unified TCI state indication or the MAC CE/DCI for unified TCI state indication associated with the highest (or lowest) entity ID/index in the G=2 MAC CEs/DCIs for unified TCI state indication having the same value of association indicator could be associated to the first SRS resource group or the SRS resource group with the lowest group ID/index in the K=2 SRS resource groups provided by SRS-ResourceGroup, or vice versa.

The one-bit flag indicator could be indicated in higher layer parameter BWP-UplinkDedicated or SRS-ResourceGroup or one or more of the MAC CEs or DCI formats (e.g., DCI format 1_1 or 1_2 with or without DL assignment) for unified TCI state indication having the same value of association indicator or the TCI fields (e.g., provided by "transmission configuration indication") in one or more of the MAC CEs or DCI formats (e.g., DCI format 1_1 or 1_2 with or without DL assignment) for unified TCI state indication having the same value of association indicator. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In yet another example, a SRS resource group ID/index (e.g., provided by SRS-ResourceGroupId) could be indicated/included in a MAC CE or DCI for unified TCI state indication. For instance, the SRS resource group ID/index (e.g., provided by SRS-ResourceGroupId) could be indicated/included in a TCI field (e.g., in the corresponding "transmission configuration indication" field) in the MAC CE or DCI for unified TCI state indication. For this case, the MAC CE or DCI for unified TCI state indication is associated to the SRS resource group ID/index indicated therein, and therefore, the corresponding SRS resource group provided by SRS-ResourceGroup.

Alternatively, an entity ID/index associated to a MAC CE or DCI for unified TCI state indication could be indicated/included in a SRS resource group, e.g., in the corresponding higher layer parameter SRS-ResourceGroup, from the K>1 configured SRS resource groups. For this case, the SRS resource group is associated to the entity ID/index indicated therein, and therefore, the corresponding MAC CE or DCI format for unified TCI state indication. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In one example, wherein the number of SRS resources configured/provided by the network is R>1 (e.g., R=2 for two antenna panels equipped at the UE) with each configured SRS resource associated with at least one antenna panel at the UE, following examples can be provided.

In one example, the first MAC CE/DCI for unified TCI state indication or the MAC CE/DCI for unified TCI state indication associated with the lowest (or highest) entity ID/index in the G>1 MAC CEs/DCIs for unified TCI state indication having the same value of association indicator could be associated to the first SRS resource or the SRS resource with the lowest resource ID/index in the R>1 SRS resources provided by SRS-Resource, the second MAC CE/DCI for unified TCI state indication or the MAC CE/DCI for unified TCI state indication associated with the second lowest (or second highest) entity ID/index in the G>1 MAC CEs/DCIs for unified TCI state indication having the same value of association indicator could be associated to the second SRS resource or the SRS resource with the second lowest resource ID/index in the R>1 SRS resources provided by SRS-Resource, and so on, and the last (or G-th) MAC CE/DCI for unified TCI state indication or the MAC CE/DCI for unified TCI state indication associated with the highest (or lowest) entity ID/index in the G>1 MAC CEs/DCIs for unified TCI state indication having the same value of association indicator could be associated to the last (or the R-th) SRS resource or the SRS resource with the highest resource ID/index in the R>1 SRS resources provided by SRS-Resource, where G could equal to R.

That is, the g-th MAC CE/DCI for unified TCI state indication or the MAC CE/DCI for unified TCI state indication associated with the g-th lowest (or the g-th highest) entity ID/index in the G>1 MAC CEs/DCIs for unified TCI state indication having the same value of association indicator could be associated to the r-th SRS resource or the SRS resource with the r-th lowest resource ID/index in the R>1 SRS resources provided by SRS-Resource, where $g \in \{1, \ldots, G\}$, $r \in \{1, \ldots, R\}$ and G could equal to R. For G=2, R=2, the first MAC CE/DCI for unified TCI state indication or the MAC CE/DCI for unified TCI state indication associated with the lowest (or highest) entity ID/index in the G=2 MAC CEs/DCIs for unified TCI state indication having the same value of association indicator could be associated to the first SRS resource or the SRS resource with the lowest resource ID/index in the R=2 SRS resources provided by SRS-Resource, and the second MAC CE/DCI for unified TCI state indication or the MAC CE/DCI for unified TCI state indication associated with the highest (or lowest) entity ID/index in the G=2 MAC CEs/DCIs for unified TCI state indication having the same value of association indicator could be associated to the second SRS resource or the SRS resource with the highest resource ID/index in the R=2 SRS resources provided by SRS-Resource. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In another example, the UE could be indicated by the network the association/mapping between the G>1 MAC CEs/DCIs for unified TCI state indication having the same value of association indicator and the R>1 SRS resources provided by SRS-Resource; this indication could be via RRC, MAC CE, or DCI based signaling.

For example, the UE could receive from the network, e.g., via higher layer RRC, MAC CE, or DCI based signaling, a set of G>1 entity IDs/indexes each corresponding to a MAC CE or DCI for unified TCI state indication from the G>1 MAC CEs/DCIs for unified TCI state indication having the same value of association indicator. For this case, the r-th SRS resource or the SRS resource with the r-th lowest (or highest) resource ID/index in the R>1 SRS resources provided by SRS-Resource could be associated to the MAC CE/DCI for unified TCI state indication with the entity ID/index having the same value as the g-th entry in the set of G>1 entity IDs/indexes, where $g \in \{1, \ldots, G\}$, $r \in \{1, \ldots, R\}$ and G could equal to R. The set of G>1 entity IDs/indexes could be indicated in higher layer parameter BWP-UplinkDedicated or SRS-Resource or one or more of the MAC CEs or DCI formats (e.g., DCI format 1_1 or 1_2 with or without DL assignment) for unified TCI state indication having the same value of association indicator or the TCI fields (e.g., provided by "transmission configuration indication") in one or more of the MAC CEs or DCI formats (e.g., DCI format 1_1 or 1_2 with or without DL assignment) for unified TCI state indication having the same value of association indicator.

For another example, the UE could receive from the network, e.g., via higher layer RRC, MAC CE, or DCI based signaling, a set of R>1 SRS resource IDs/indexes each corresponding to a configured SRS resource in the R>1 SRS resources provided by SRS-Resource. For this case, the g-th MAC CE/DCI for unified TCI state indication or the MAC CE/DCI for unified TCI state indication associated with the g-th lowest (or the g-th highest) entity ID/index in the G>1 MAC CEs/DCIs for unified TCI state indication having the same value of association indicator could be associated to the SRS resource with the resource ID/index having the same value as the r-th entry in the set of R>1 SRS resource IDs/indexes, where $g \in \{1, \ldots, G\}$, $r \in \{1, \ldots, R\}$ and G could equal to R. The set of R>1 SRS resource IDs/indexes could be indicated in higher layer parameter BWP-UplinkDedicated or SRS-Resource or one or more of the MAC CEs or DCI formats (e.g., DCI format 1_1 or 1_2 with or without DL assignment) for unified TCI state indication having the same value of association indicator or the TCI fields (e.g., provided by "transmission configuration indication") in one or more of the MAC CEs or DCI formats (e.g., DCI format 1_1 or 1_2 with or without DL assignment) for unified TCI state indication having the same value of association indicator. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In yet another example, the UE could be indicated by the network the association/mapping between the G>1 MAC CEs/DCIs for unified TCI state indication having the same value of association indicator and the R>1 SRS resources provided by SRS-Resource; this indication could be via RRC, MAC CE, or DCI based signaling. For G=2, R=2, the UE could receive from the network, e.g., via higher layer RRC, MAC CE, or DCI based signaling, a one-bit flag indicator. For example, if the one-bit flag indicator is set to "1," the first MAC CE/DCI for unified TCI state indication or the MAC CE/DCI for unified TCI state indication associated with the lowest (or highest) entity ID/index in the G=2 MAC CEs/DCIs for unified TCI state indication having the same value of association indicator could be associated to the first SRS resource or the SRS resource with the lowest resource ID/index in the R=2 SRS resources provided by SRS-Resource, and the second MAC CE/DCI for unified TCI state indication or the MAC CE/DCI for unified TCI state indication associated with the highest (or lowest) entity ID/index in the G=2 MAC CEs/DCIs for unified TCI state indication having the same value of association indicator could be associated to the second SRS resource or the SRS resource with the highest resource ID/index in the R=2 SRS resources provided by SRS-Resource, or vice versa. If the one-bit flag indicator is set to "0," the first MAC CE/DCI for unified TCI state indication or the MAC CE/DCI for unified TCI state indication associated with the lowest (or highest) entity ID/index in the G=2 MAC CEs/DCIs for unified TCI state indication having the same value of association indicator could be associated to the second SRS resource or the SRS resource with the highest resource ID/index in the R=2 SRS resources provided by SRS-Resource, and the second MAC CE/DCI for unified TCI state indication or the MAC CE/DCI for unified TCI state indication associated with the highest (or lowest) entity ID/index in the G=2 MAC CEs/DCIs for unified TCI state indication having the same value of association indicator could be associated to the first SRS resource or the SRS resource with the lowest resource ID/index in the R=2 SRS resources provided by SRS-Resource, or vice versa.

The one-bit flag indicator could be indicated in higher layer parameter BWP-UplinkDedicated or SRS-Resource or one or more of the MAC CEs or DCI formats (e.g., DCI format 1_1 or 1_2 with or without DL assignment) for unified TCI state indication having the same value of association indicator or the TCI fields (e.g., provided by "transmission configuration indication") in one or more of the MAC CEs or DCI formats (e.g., DCI format 1_1 or 1_2 with or without DL assignment) for unified TCI state indication having the same value of association indicator. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

In yet another example, a SRS resource ID/index (e.g., provided by SRS-ResourceId) could be indicated/included in a MAC CE or DCI for unified TCI state indication. For instance, the SRS resource ID/index (e.g., provided by SRS-ResourceId) could be indicated/included in a TCI field (e.g., in the corresponding "transmission configuration indication" field) in the MAC CE or DCI for unified TCI state indication. For this case, the MAC CE or DCI for unified TCI state indication is associated to the SRS resource ID/index indicated therein, and therefore, the corresponding SRS resource provided by SRS-Resource.

Alternatively, an entity ID/index associated to a MAC CE or DCI for unified TCI state indication could be indicated/included in a SRS resource, e.g., in the corresponding higher layer parameter SRS-Resource, from the R>1 configured SRS resources. For this case, the SRS resource is associated to the entity ID/index indicated therein, and therefore, the corresponding MAC CE or DCI format for unified TCI state indication. Here, the entity ID/index could correspond to a CORESETPoolIndex value, a CORESETGroupIndex value, a PCI value, a PCI index pointing/corresponding to an entry in a list/set/pool of PCIs higher layer configured to the UE, and etc.

A UE could follow the non-group based uplink beam indication format as described in examples to configure the spatial domain transmit filter(s) for simultaneous multi-panel transmission according to at least one of following examples.

In one example, the UE receives from the network a higher layer parameter denoted by nongroupBasedUplinkBeamIndicationSchemeA. The higher layer parameter nongroupBasedUplinkBeamIndicationSchemeA could be indicated in one or more MAC CEs or DCIs (e.g., DCI format 1_1 or 1_2 with or without DL assignment) for unified TCI state indication or SRS-Config or SRS-ResourceSet or SRS-Resource. If the nongroupBasedUplinkBeamIndicationSchemeA is set to "enabled," the UE may follow the non-group based uplink beam indication format as described in examples to configure the spatial domain transmit filter(s) for simultaneous multi-panel transmission.

In another example, if the indicated Rel. 17 unified TCI states correspond to joint DL and UL TCI states, separate UL TCI states or a combination of joint DL and UL TCI states and separate UL TCI states, the UE may follow the non-group based uplink beam indication format as described in examples to configure the spatial domain transmit filter(s) for simultaneous multi-panel transmission.

In yet another example, if the higher layer parameter nongroupBasedUplinkBeamIndicationSchemeA is set to "enabled" and the indicated Rel. 17 unified TCI states correspond to joint DL and UL TCI states, separate UL TCI states or a combination of joint DL and UL TCI states and separate UL TCI states, the UE may follow the non-group based uplink beam indication format as described in examples to configure the spatial domain transmit filter(s) for simultaneous multi-panel transmission.

To support simultaneous multi-panel transmission, various design options of SRI/TPMI indication are considered in the present disclosure.

In one embodiment, a UE could be provided/configured by the network, e.g., higher layer RRC signaling, MAC CE or DCI based signaling, Q'>1 groups of SRIs/TPMIs with each group indicating/containing V'≥1 SRIs/TPMIs. For instance, the Q'>1 groups of SRIs/TPMIs could be indicated in the MAC CE or DCI format (e.g., DCI format 1_1 or 1_2 with or without DL assignment) for unified TCI state/beam indication. The UE could use the same or different precoders determined according to the SRIs/TPMIs indicated across different groups (e.g., across the Q'>1 groups) to simultaneously transmit various uplink channels/signals such as PUCCHs, PUSCHs or SRSs to the network/TRPs. The UE could be provided by the network the values of Q' or V'. If Q'≤Qmax' or V'≤Vmax', where Qmax' represents the maximum number of groups of SRIs/TPMIs that can be indicated in a MAC CE or DCI and Vmax' is the maximum number of SRIs/TPMIs that can be indicated in a group, the UE could also be provided by the network the values of Qmax' or Vmax'.

The association between Q'>1 groups of SRIs/TPMIs and the P>1 SRS resource configurations/settings could follow those specified in examples mentioned in the present disclosure by considering the Q'>1 groups of SRIs/TPMIs instead of the Q>1 groups of Rel. 17 unified TCI states or Q>1 TCI fields. The association between the Q'>1 groups of SRIs/TPMIs and the S>1 SRS resource sets could follow those specified in examples mentioned in the present disclosure by considering the Q'>1 groups of SRIs/TPMIs instead of the Q>1 groups of Rel. 17 unified TCI states or Q>1 TCI fields. The association between the Q'>1 groups of SRIs/TPMIs and the K>1 SRS resource groups could follow those specified in examples mentioned in the present disclosure by considering the Q'>1 groups of SRIs/TPMIs instead of the Q>1 groups of Rel. 17 unified TCI states or Q>1 TCI fields. Furthermore, the association between the Q'>1 groups of SRIs/TPMIs and the one or more SRS resources in a SRS resource set could follow those specified in examples mentioned in the present disclosure by considering the Q'>1 groups of SRIs/TPMIs instead of the Q>1 groups of Rel. 17 unified TCI states or Q>1 TCI fields.

Furthermore, one or more entity IDs/indexes could be indicated in the MAC CE or DCI format (e.g., DCI format 1_1 or 1_2 with or without DL assignment) for SRIs/TPMIs indication, wherein the Q'>1 groups of SRIs/TPMIs with each group indicating/containing V'>1 SRIs/TPMIs are indicated. Each entity ID/index could be a PCI value, a CORESETPoolIndex value, a CORESETGroupIndex value, a PCI index pointing/corresponding to an entry in a list/set/pool of PCIs higher layer configured to the UE, a TRP ID/index value, a one-bit flag indicator or etc. Each entity ID/index could be associated with/to at least one of the Q'>1 groups of SRIs/TPMIs. For instance, Q'>1 entity IDs/indexes corresponding to PCIs/PCI indexes/CORESETPoolIndex values/CORESETGroupIndex values could be indicated in the MAC CE or DCI for SRIs/TPMIs indication, wherein the Q'>1 groups of SRIs/TPMIs with each group indicating/containing V'>1 SRIs/TPMIs are indicated. For this case, the q'-th entity ID/index or the q'-th lowest (or the q'-th highest) entity ID/index in the Q'>1 entity IDs/indexes could be associated with/to the q'-th group of SRIs/TPMIs or the group q' of SRIs/TPMIs or the group of SRIs/TPMIs with the q'-th lowest (or the q'-th highest) group ID/index in the Q'>1 groups of SRIs/TPMIs, where q'∈{1, . . . , Q'}.

A UE could receive from the network a higher layer parameter denoted by groupBasedUplinkResourceIndicationSchemeB. The higher layer parameter groupBasedUplinkResourceIndicationSchemeB could be indicated in the MAC CE or DCI (e.g., DCI format 1_1 or 1_2 with or without DL assignment) for SRI/TPMI indication or SRS-Config or SRS-ResourceSet or SRS-Resource. If the groupBasedUplinkResourceIndicationSchemeA is set to "enabled," the UE may follow the group based SRI/TPMI indication format as described in examples in the present disclosure to configure the transmit precoders for simultaneous multi-panel transmission.

In one embodiment, a UE could receive from the network, e.g., G'>1 MAC CEs or DCIs (e.g., DCI format 1_1 or 1_2 with or without DL assignment), each indicating one or more SRIs/TPMIs. The G'≥1 MAC CEs or DCIs for SRIs/TPMIs indication could be the same as the G≥1 MAC CEs or DCIs for unified TCI state indication discussed in examples in the present disclosure. Each of the G'≥1 MAC CEs or DCIs for SRIs/TPMIs indication could be associated with a different CORESETPoolIndex value (if provided by PDCCH-Config) configured for one or more CORESETs in a multi-DCI based multi-TRP system or a different PCI value or a different CORESETGroupIndex value (if provided by PDCCH-Config) configured for one or more CORESETs in a single-DCI based multi-TRP system. An association indicator could be indicated in a MAC CE or DCI for SRIs/TPMIs indication. The UE could use the same or different precoders determined according to the SRIs/TPMIs indicated across different MAC CEs/DCIs for SRIs/TPMIs indication having the same value of association indicator.

The association between G'≥1 MAC CEs/DCIs for SRIs/TPMIs indication having the same value of association indicator and the P>1 SRS resource configurations/settings could follow those specified in in examples mentioned in the present disclosure by considering the G'≥1 MAC CEs/DCIs for SRIs/TPMIs indication having the same value of association indicator instead of the G≥1 MAC CEs/DCIs for unified TCI state indication having the same value of association indicator. The association between the G'≥1 MAC CEs/DCIs for SRIs/TPMIs indication having the same value of association indicator and the S>1 SRS resource sets could follow those specified in examples mentioned in the present disclosure by considering the G'≥1 MAC CEs/DCIs for SRIs/TPMIs indication having the same value of association indicator instead of the G≥1 MAC CEs/DCIs for unified TCI state indication having the same value of association indicator.

The association between the G'≥1 MAC CEs/DCIs for SRIs/TPMIs indication having the same value of association indicator and the K>1 SRS resource groups could follow those specified in examples mentioned in the present disclosure by considering the G'≥1 MAC CEs/DCIs for SRIs/TPMIs indication having the same value of association indicator instead of the G≥1 MAC CEs/DCIs for unified TCI state indication having the same value of association indicator.

Furthermore, the association between the G'≥1 MAC CEs/DCIs for SRIs/TPMIs indication having the same value of association indicator and the one or more SRS resources in a SRS resource set could follow those specified in examples mentioned in the present disclosure by considering the G'≥1 MAC CEs/DCIs for SRIs/TPMIs indication having the same value of association indicator instead of the G≥1 MAC CEs/DCIs for unified TCI state indication having the same value of association indicator.

A UE could receive from the network a higher layer parameter denoted by nongroupBasedUplinkResourceIndicationSchemeA. The higher layer parameter nongroupBasedUplinkResourceIndicationSchemeA could be indicated in one or more MAC CEs or DCIs (e.g., DCI format 1_1 or 1_2 with or without DL assignment) for SRI/TPMI indication or SRS-Config or SRS-ResourceSet or SRS-Resource. If the nongroupBasedUplinkResourceIndicationSchemeA is set to "enabled," the UE may follow the non-group based SRI/TPMI indication format as described in examples to configure the transmit precoders for simultaneous multi-panel transmission.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:

a transceiver configured to receive:

a carrier indicator field in a configuration for a first control resource set (CORESET) in a serving carrier of the UE, wherein:

the carrier indicator field indicates another carrier that is different from the serving carrier, and the first CORESET corresponds to a transmission configuration indication (TCI) state that is associated with both the serving carrier and the other carrier, and first information indicating beam failure detection (BFD) reference signals (RSs) for the serving carrier; and a processor operably coupled with the transceiver, the processor configured to:

determine, based on the carrier indicator field and the first information, one or more BFD RSs from the BFD RSs for the serving carrier to monitor the other carrier, and determine, based on monitoring the one or more BFD RSs for the other carrier, whether to declare a beam failure for the other carrier.

2. The UE of claim 1, wherein:

the transceiver is further configured to receive:

second information including a list of one or more carriers other than the serving carrier, and third information including a configuration for a second CORESET in the serving carrier, wherein the second CORESET corresponds to a TCI state associated with both the serving carrier and the one or more other carriers; and the processor is further configured to:

determine, based on the first, second, and third information, one or more BFD RSs of the BFD RSs for the serving carrier to monitor the one or more other carriers; and determine, based on monitoring the one or more BFD RSs for the one or more other carriers, whether to declare beam failures for the one or more other carriers.

3. The UE of claim 1, wherein the processor is further configured to:

identify, based on the carrier indicator field in the configuration of the first CORESET, RSs in the TCI state for the first CORESET as the one or more BFD RSs for the other carrier, and monitor for the beam failure on the other carrier based on the identified one or more BFD RSs for the other carrier.

4. The UE of claim 1, wherein the processor is further configured to:

identify, based on the carrier indicator field in the configuration of the first CORESET, the one or more BFD RSs of the other carrier from the BFD RSs for the serving carrier as having same values as RSs in the TCI state for the first CORESET, and monitor for the beam failure on the other carrier based on the identified one or more BFD RSs for the other carrier.

5. The UE of claim 1, wherein, in response to detection of a beam failure instance (BFI) based on the one or more BFD RSs determined for the other carrier, the processor is further configured to send, to higher layers, the BFI.

6. The UE of claim 5, wherein, at the higher layers, the processor is further configured to:

increment, based on receipt of the BFI, a first BFI counter for the serving carrier and a second BFI counter for the other carrier, start or continue, based on receipt of the BFI, a first BFI timer for the serving carrier and a second BFI timer for the other carrier, determine whether to declare the beam failure for the serving carrier based on the first BFI counter and the first BFI timer, and determine whether to declare the beam failure for the other carrier based on the second BFI counter and the second BFI timer.

7. The UE of claim 1, wherein:

the first information further includes one or more new beam identification (NBI) RSs for beam failure recovery (BFR) on the serving carrier, and the processor is further configured to:

determine, based on the carrier indicator field, to use one or more of the NBI RSs for BFR on the other carrier, and in response to declaration of the beam failure on the other carrier, identify one or more new beams to recover from the beam failure on the other carrier based on the one or more NBI RSs determined for BFR on the other carrier.

8. The UE of claim 1, wherein the transceiver is further configured to:

in response to declaration of the beam failure on at least one of the serving carrier and the other carrier, transmit a link recovery request (LRR) on a resource configured for a BFR recovery request (BFRQ) for BFR on either or both of the serving carrier and the other carrier, and transmit, in response to an uplink grant based on the LRR, a media access control-control channel (MAC CE) including indexes of the at least one of the serving carrier and the other carrier for which the beam failure was declared.

9. A base station (BS), comprising:

a processor; and a transceiver operably coupled with the processor, the transceiver configured to transmit:

a carrier indicator field in a configuration for a first control resource set (CORESET) in a serving carrier of a user equipment (UE), wherein:

the carrier indicator field indicates another carrier that is different from the serving carrier, and the first CORESET corresponds to a transmission configuration indication (TCI) state that is associated with both the serving carrier and the other carrier, and first information indicating beam failure detection (BFD) reference signals (RSs) for the serving carrier; and wherein the carrier indicator field and the first information indicate one or more BFD RSs from the BFD RSs for the serving carrier to monitor the other carrier, and wherein a beam failure for the other carrier is based on the one or more BFD RSs for the other carrier.

10. The BS of claim 9, wherein:

the transceiver is further configured to transmit:

second information including a list of one or more carriers other than the serving carrier, and third information including a configuration for a second CORESET in the serving carrier;

the second CORESET corresponds to an TCI state associated with both the serving carrier and the one or more other carriers;

the first, second, and third information, indicate one or more BFD RSs of the BFD RSs for the serving carrier to monitor the one or more other carriers; and beam failures for the one or more other carriers are based on the one or more BFD RSs for the one or more other carriers.

11. The BS of claim 9, wherein the carrier indicator field in the configuration of the first CORESET indicates RSs in the TCI state for the first CORESET thar are the one or more BFD RSs for the other carrier.

12. The BS of claim 9, wherein the carrier indicator field in the configuration of the first CORESET indicates the one or more BFD RSs of the other carrier from the BFD RSs for the serving carrier as having same values as RSs in the TCI state for the first CORESET.

13. The BS of claim 9, wherein:

the serving carrier and the other carrier have separate beam failure indicator (BFI) counters and BFI timers, and the BFI counters are incremented, and the BFI timers are started or continued, based on a BFI on one of the serving carrier and the other carrier.

14. The BS of claim 9, wherein:

the first information further includes one or more new beam identification (NBI) RSs for beam failure recovery (BFR) on the serving carrier, and the carrier indicator field indicates one or more of the NBI RSs for BFR on the other carrier for recovery from the beam failure on the other carrier.

15. The BS of claim 9, wherein the transceiver is further configured to:

receive, in response to declaration of the beam failure on at least one of the serving carrier and the other carrier, a link recovery request (LRR) on a resource configured for a BFR recovery request (BFRQ) for BFR on either or both of the serving carrier and the other carrier, and receive, in response to an uplink grant based on the LRR, a media access control-control channel (MAC CE) including indexes of the at least one of the serving carrier and the other carrier for which the beam failure was declared.

16. A method for operating a user equipment (UE), the method comprising:

receiving a carrier indicator field in a configuration for a first control resource set (CORESET) in a serving carrier of the UE, wherein:

the carrier indicator field indicates another carrier that is different from the serving carrier, and the first CORESET corresponds to a transmission configuration indication (TCI) state that is associated with both the serving carrier and the other carrier;

receiving first information indicating beam failure detection (BFD) reference signals (RSs) for the serving carrier;

determining, based on the carrier indicator field and the first information, one or more BFD RSs from the BFD RSs for the serving carrier to monitor the other carrier; and determining, based on monitoring the one or more BFD RSs for the other carrier, whether to declare a beam failure for the other carrier.

17. The method of claim 16, further comprising:

receiving second information including a list of one or more carriers other than the serving carrier;

receiving third information including a configuration for a second CORESET in the serving carrier, wherein the second CORESET corresponds to an TCI state associated with both the serving carrier and the one or more other carriers;

determining, based on the first, second, and third information, one or more BFD RSs of the BFD RSs for the serving carrier to monitor the one or more other carriers; and determining, based on monitoring the one or more BFD RSs for the one or more other carriers, whether to declare beam failures for the one or more other carriers.

18. The method of claim 16, wherein:

determining the one or more BFD RSs to monitor the other carrier further comprises identifying, based on the carrier indicator field in the configuration of the first CORESET, RSs in the TCI state for the first CORESET as the one or more BFD RSs for the other carrier, and the method further comprises monitoring for the beam failure on the other carrier based on the identified one or more BFD RSs for the other carrier.

19. The method of claim 16, wherein:

determining the one or more BFD RSs to monitor the other carrier further comprises identifying, based on the carrier indicator field in the configuration of the first CORESET, the one or more BFD RSs of the other carrier from the BFD RSs for the serving carrier as having same values as RSs in the TCI state for the first CORESET, and the method further comprises monitoring for the beam failure on the other carrier based on the identified one or more BFD RSs for the other carrier.

20. The method of claim 16, further comprising:

in response to detection of a beam failure instance (BFI) based on the one or more BFD RSs determined for the other carrier, sending, to higher layers, the BFI; and at the higher layers:

incrementing, based on receipt of the BFI, a first BFI counter for the serving carrier and a second BFI counter for the other carrier, starting or continuing, based on receipt of the BFI, a first BFI timer for the serving carrier and a second BFI timer for the other carrier, determining whether to declare the beam failure for the serving carrier based on the first BFI counter and the first BFI timer, and determining whether to declare the beam failure for the other carrier based on the second BFI counter and the second BFI timer.

* * * * *